United States Patent [19]

Opittek et al.

[11] 4,053,946
[45] Oct. 11, 1977

[54] MODULAR PROGRAMMABLE DIGITAL SCAN CONVERTER

[75] Inventors: Eugene W. Opittek, Santa Ana; James L. Heard, Torrance, both of Calif.; Bruce W. Keller, Scotland, Ark.; Michael D. Pruznick, Huntington Beach; Thomas A. Bosseler, Westminster, both of Calif.

[73] Assignee: Hughes Aircraft Company, Culver City, Calif.

[21] Appl. No.: 634,711

[22] Filed: Nov. 24, 1975

[51] Int. Cl.² .............................................. G06F 3/05
[52] U.S. Cl. .............................................. 364/200
[58] Field of Search .................. 340/172.5; 445/1; 178/DIG. 22, DIG. 38; 364/200, 900

[56] References Cited

U.S. PATENT DOCUMENTS

| | | | |
|---|---|---|---|
| 3,553,358 | 1/1971 | Lauer | 178/DIG. 22 X |
| 3,697,956 | 10/1972 | Goldman et al. | 340/172.5 |
| 3,745,532 | 7/1973 | Erwin | 340/172.5 |
| 3,760,377 | 9/1973 | Attridge | 340/172.5 |
| 3,781,816 | 12/1973 | Coleman et al. | 340/172.5 |
| 3,810,174 | 5/1974 | Heard et al. | 178/DIG. 22 X |
| 3,813,485 | 5/1974 | Arps | 178/DIG. 22 X |
| 3,898,377 | 8/1975 | Fairbairn et al. | 178/DIG. 22 X |

*Primary Examiner*—Harvey E. Springborn
*Attorney, Agent, or Firm*—Lawrence V. Link, Jr.; W. H. MacAllister

[57] ABSTRACT

A digital scan converter which comprises modular video processing units and modular memory and output units is adapted for processing applied sensor data of various formats so as to provide output data suitable for display on a common indicator. Parameters for processing operations, such as analog-to-digital converting, integrating and detecting, are implemented by the video processing modules in response to digital "set-up" and address words applied from a programmed microprocessor controller. The storage and readout format of the memory and output modules is also controlled by "set-up" and address words applied from the programmed controller.

10 Claims, 58 Drawing Figures

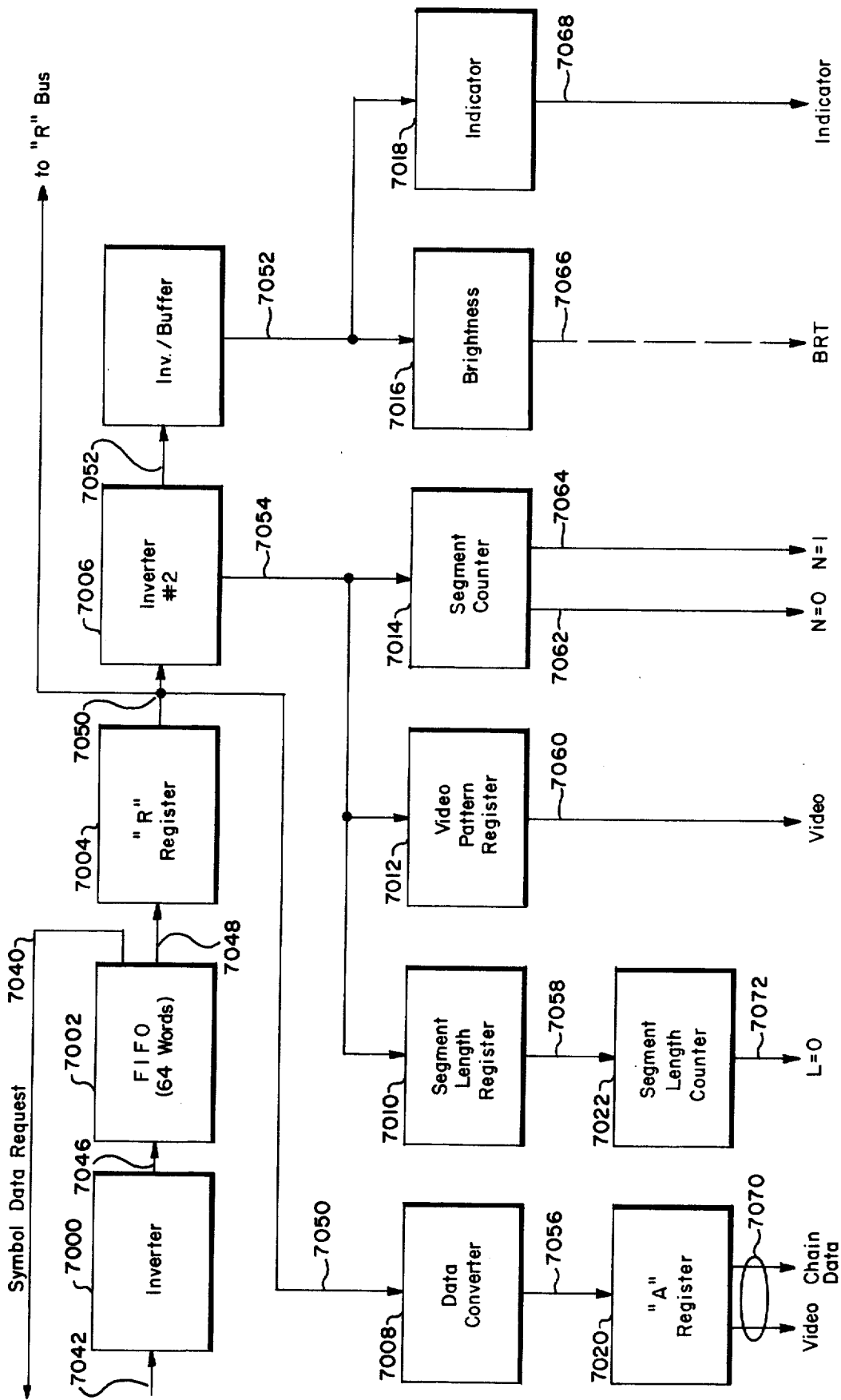
Fig. 28. Symbol Interface Buffer

Fig. 34.

Module Connection Table TABLE 1

WRITE — ADDRESS COUNTER'S

| MEMORY ADDRESS | | 2 BYTES | | 4 BYTES | | 8 BYTES | | 12 BYTES | 16 BYTES | |
|---|---|---|---|---|---|---|---|---|---|---|
| 525 | 1:1 | 512X128 | 256X256 | 512X256 | 256X512 | 512X512 | 256X1024 | 768X512 | 1024X512 | 512X1024 |
|  | 3:4 | 480X120 | 240X240 | 480X240 | 240X480 | 480X480 | 240X960 |  |  | 480X960 |
| 875 | 1:1 |  | 240X160 | 480X160 | 240X320 | 480X320 | 240X640 |  |  | 480X640 |
|  | 3:4 | 404X101 | 202X202 | 404X202 | 202X404 | 404X404 | 202X808 | 768X384 | 808X404 | 404X808 |
| 1023 | 1:1 | 404X128 | 202X256 | 404X256 | 202X512 | 404X512 | 202X1024 | 769X512 | 808X512 | 404X1024 |
|  | 3:4 | 472X118 | 236X236 | 472X236 | 236X472 | 472X472 | 236X944 |  | 944X472 | 472X944 |
|  |  |  |  | 472X158 | 236X316 | 472X316 | 236X632 |  | 944X316 | 472X632 |
| CS1 | | $X_1$ | $X_1$ | $X_1$ | $X_1$ | $X_1$ | $X_1$ | $X_1$ | $X_1$ | $X_1$ |
| CS2 | | $X_2$ | $X_2$ | $X_2$ | $X_2$ | $X_2$ | $X_2$ | $X_2$ | $X_2$ | $X_2$ |
| CS3 | | $X_3$ | $X_3$ | $X_3$ | $X_3$ | $X_3$ | $X_3$ | $X_3$ | $X_3$ | $X_3$ |
| BYTE 1-2 | | $X_4$ | $X_4$ |  |  |  |  |  |  |  |
| BYTE 1-4 | | | | $X_4, X_5$ | $X_4, X_5$ |  |  |  |  |  |
| BYTE 1-8 | | | | | | $X_4, X_5, X_6$ | $X_4, X_5, X_6$ |  |  |  |
| BYTE 1-16 | | | | | | | | $X_4, X_5, X_9, X_{10}$ | $X_4, X_5, X_6, X_7$ | $X_4, X_5, X_6, X_7$ |
| RA1 | | $X_5$ | $X_5$ | $X_6$ | $X_6$ | $X_7$ | $X_7$ | $X_6$ | $X_8$ | $X_8$ |
| RA2 | | $X_6$ | $X_6$ | $X_7$ | $X_7$ | $X_8$ | $X_8$ | $X_7$ | $X_9$ | $X_9$ |
| RA3 | | $X_7$ | $X_7$ | $X_8$ | $X_8$ | $X_9$ | $X_9$ | $X_8$ | $Y_2$ | $Y_2$ |
| RA4 | | $Y_2$ | $Y_2$ | $Y_2$ | $Y_2$ | $Y_2$ | $Y_2$ | $X_9$ | $Y_3$ | $Y_3$ |
| RA5 | | $Y_3$ | $Y_3$ | $Y_3$ | $Y_3$ | $Y_3$ | $Y_3$ | $Y_2$ | $Y_4$ | $Y_4$ |
| RA6 | | $Y_4$ | $Y_4$ | $Y_4$ | $Y_4$ | $Y_4$ | $Y_4$ | $Y_3$ | $Y_5$ | $Y_5$ |
| CA1 | | $Y_5$ | $Y_5$ | $Y_5$ | $Y_5$ | $Y_5$ | $Y_5$ | $Y_4$ | $Y_6$ | $Y_6$ |
| CA2 | | $Y_6$ | $Y_6$ | $Y_6$ | $Y_6$ | $Y_6$ | $Y_6$ | $Y_5$ | $Y_7$ | $Y_7$ |
| CA3 | | $Y_7$ | $Y_7$ | $Y_7$ | $Y_7$ | $Y_7$ | $Y_7$ | $Y_6$ | $Y_8$ | $Y_8$ |
| CA4 | | $Y_8$ | $Y_8$ | $Y_8$ | $Y_8$ | $Y_8$ | $Y_8$ | $Y_7$ | $Y_9$ | $Y_9$ |
| CA5 | | $Y_9$ | $X_8$ | $X_9$ | $X_9$ | $Y_9$ | $X_{10}$ | $Y_8$ | $Y_{10}$ | $X_{10}$ |
| CA6 | | $Y_1$ | $Y_1$ | $Y_1$ | $Y_1$ | $Y_1$ | $Y_1$ | $Y_1$ | $Y_1$ | $Y_1$ |

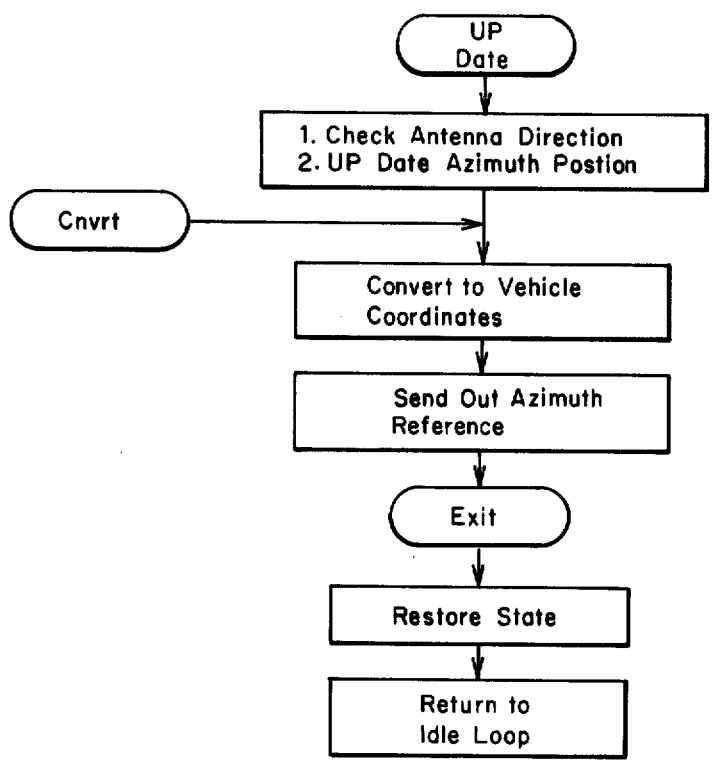
Fig. 45.
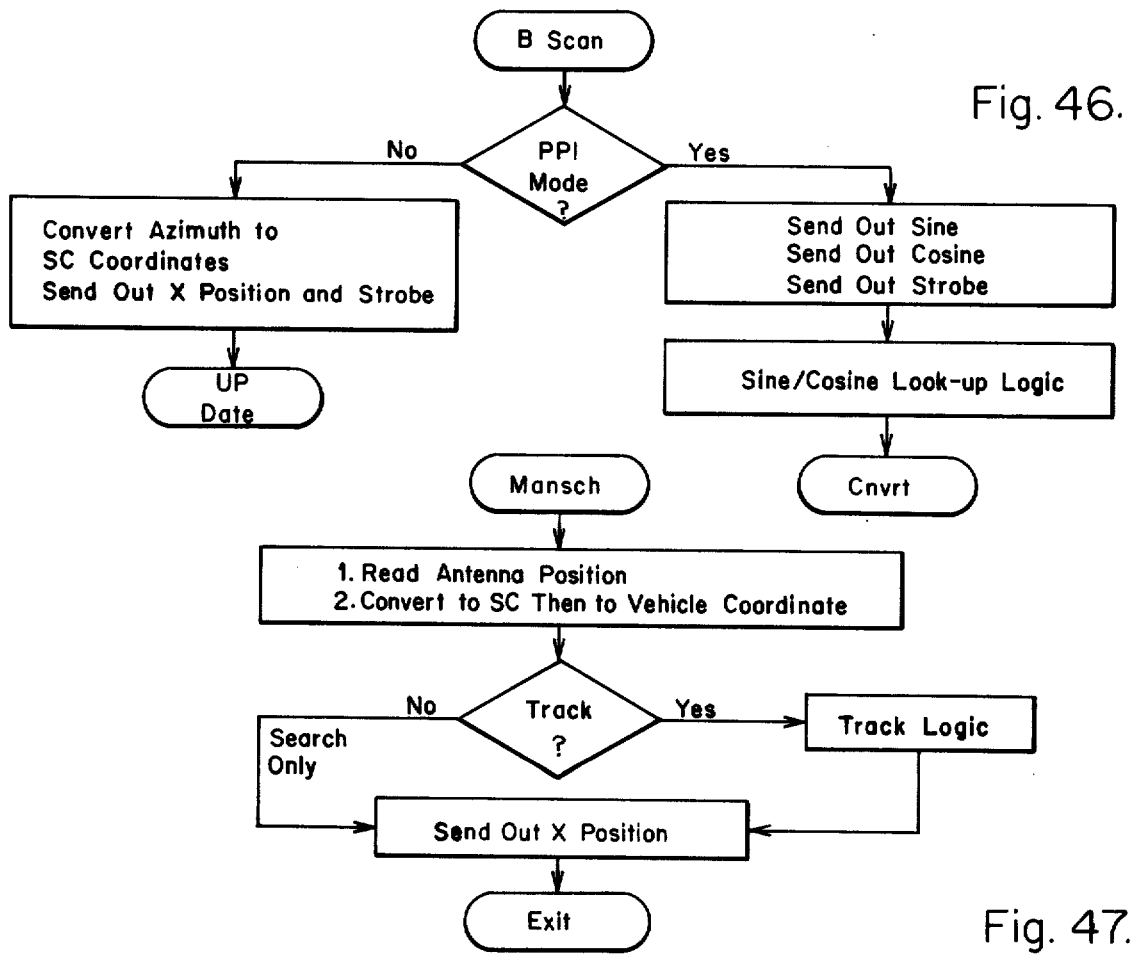
Fig. 46.
Fig. 47.

MODULAR PROGRAMMABLE DIGITAL SCAN CONVERTER

The invention herein described was made in the course of or under a Contract or Subcontract thereunder with the Department of the Air Force.

BACKGROUND OF THE INVENTION

1. Field of the Invention

This invention relates generally to digital scan conversion techniques and more particularly to modular programmable digital scan converters responsive to a variety of types of sensor inputs.

2. Description of the Prior Art

The exploration of the problem of the display of data from a variety of sensors having different data rates and formats on a common indicator has resulted in the development over the past several years of a progression of multi-mode display systems ranging from dual-persistence cathode-ray tubes (CRT) to direct view storage tubes, analog scan converter tubes and digital scan conversion techniques. Numerous studies and applications have shown that a scan conversion function along with a high performance television compatible CRT display provides the best potential performance and flexibility. However, experience with analog scan conversion in field applications has demonstrated an inherent low reliability, poor performance and high cost of ownership. The reality of implementing a totally digital scan converter has awaited developments in digital technology, particularly in solid state memories and in MSI/LSI packaging density. Prior art digital scan converter/display systems have required an inordinate amount of development time, have been comparatively unreliable and have presented a high cost factor.

It would thus be a great advantage to the art to provide a digital scan converter system comprising basic building-block modules. It would also be a great advantage to the art to provide these basic modules in reduced volume and weight configurations. It would be a further advantage to the art to provide basic core modules from which various systems could be configured as required. Another advantage to the art would be realized by the implementation of a digital scan converter system operable under the control of micro-processor controllers. Changing of modes, parameters and growth achieved by reprogramming the memory of the controllers without necessitating any hardware changes would represent another significant advantage to the art. Achievement of readout in standard television raster format providing composite video interface and easy recording on video tape with superposition of symbology would represent an additional desirable advantage to the art.

SUMMARY OF THE INVENTION

The modular digital scan converter display system of the invention comprises five basic subsections:
1. Input Video Processing
2. Memory and Output Video Processing
3. Interface and Control
4. Symbol Generation, and
5. Display Indication.

These five basic subsystems are interconnected and cooperate through Central Data Bus Architecture. These basic subsystems contain standardized modules that have become known as core modules. These core modules may form parts of any modification of the Modular Digital Scan Converter Display System of the invention. In general the input video processing subsystem will contain the analog-to-digital converters, the integrator and peak detector, integrator address generator and special clock generator core modules. The memory and output processing subsystem will contain the composite sync generator and video mixer, a memory, a memory write address generator, a TV address generator, an output clock generator and may contain an external TV video and sync processor. The interface and control subsystem will contain an interface module, a controller module, analog multiplex and analog-to-digital module, and may contain program memory modules. The symbol generator subsystem will contain a symbol interface buffer, an executive control module, a chain generator module and may contain symbol in-raster processor modules. The display indicator subsystem will contain video and sync stripper modules, vertical deflection modules, geometric correction modules, a CRT assembly module and horizontal resonant deflection modules. The Central Data Bus may also interconnect built-in test (BIT) fault isolation modules. These modules accept and supply to the Central Data Bus, external test stimuli and provide test results to an external computer. These modules may also generate and select test stimuli and store logic status. The BIT program may operate under the control of a central controller that may supply sequence test stimuli, interrogate module logic status, evaluate test responses, generate test result messages, and generate discrete failure outputs. A symbol generator may be employed to generate a symbol test pattern and to generate alpha/numeric test messages. The display indicator subsystem may be used to display these generator test patterns on a CRT and also the alpha/numeric test messages and to display discrete failures on indicator lamps. Each module provides a complete function such as analog-to-digital conversion, address generation, clock generation, or memory and so forth. This arrangement simplifies built-in test and maintenance procedures. The specific performance parameters of each module are established by "set-up" and "control" words which are latched into data registers on the module. These words are generated under software program control and transmitted to the modules over a common data bus. The set-up words establish the clock rates, number of analog-to-digital bits, number of video samples, video processing parameters, memory address initial conditions, television line standards, and other parameters necessary for processing the data. The set-up words also enable the addition of new modes and sensors to a system with no hardware changes in the display system, thus utilizing only software changes. Functions, where added capability is relatively expensive, are partitioned to provide minimum performance consistent with common usage. For example, in high speed analog-to-digital converters, each additional bit of dynamic range doubles circuit complexity and essentially doubles the cost of the converter. For instance, a majority of systems may require only three to four bits of dynamic range and since a 4-bit, 40 MHz analog-to-digital converter can be implemented in a standard 1 inch × 2 inches hybrid package, the basic analog-to-digital module utilized is a 4-bit unit. In the event that a specific system would require an A/D converter of greater capacity, a second or third or fourth A/D module could be added to provide the extra bits. This arrangement permits the implementation of any degree of performance required without increasing the cost for systems not requiring high performance. The same guideline is applied to modular memory partitioning to provide a minimum memory size and architecture consistent with common usage. There are a minimum number of special modules that are limited to interface modules and special clock generation and blanking functions. These modules are necessary, due to the wide variety of input signals available in various systems and due to the special non-linear clock functions used in certain data collecting formats.

The following is a brief summary of core and special modules of the invention.

1. Receiver and A/D Converter: — Accepts analog video inputs selectable under program control. Provides analog-to-digital conversion with variable quantization levels under program control. Provides automatic gain control (AGC) and linear or preset non-linear amplitude transfer functions selectable under program control.

2. Input Video Processor: — Provides video integration with fractional feedback constants selectable under program control, video peak detection (range bin collapsing) and video amplitude compression with programmable transfer function. Provides hit/miss threshold control or video amplitude threshold. Also provides programmable fade erase control or "aging".

3. Composite Sync Generator and Video Mixer: — Generates standard Electronic Industries Association (EIA) composite syncs, performs output video digital-to-analog conversion, sync and symbol mixing and external electro-optical video input selection.

4. Integrator Address Generator: — Generates gated clocks for analog-to-digital converter and video integrator/peak detector. Analog-to-digital conversion command clock is variable in steps. External clocks are selectable under program control. Clock start delay with respect to PRF trigger variable to provide offset for ground range sweep correction or expanded sweep formats. Also generates video integrator memory addresses selectable under program control.

5. Special Clock Generator: — Generates variable clock rates for transfer of data from video integrator to main memory to perform special non-linear functions such as ground range sweep correction and terrain following expanded elevation displays.

6. Output Clock Generator: — Generates basic timing clocks for all modules including output shift clock, basic memory read/write cycle timing, and controller interrupt timing. The output shift clock is selectable under program control. The basic memory read/write cycle is selectable based on mode.

7. Write Address Generator: — Provides memory write address sequences as a function of controller inputs. Accepts any X and Y initial position and any slope for addressing sequence. Converts general X and Y addresses to specific memory compatible addresses such as byte enable, chip enable, row and column addresses. Accommodates various memory configurations, resolution and aspect ratios with external wiring of module interface with memory.

8. TV Address Generator: — Provides memory read address sequences to produce television raster compatible video. Accepts any X and Y initial position from the controller to implement passing scene and motion compensated presentations. Also generates out-of-scan edge blanking to inhibit display of old data in memory outside sensor scan limits.

9. TV Video and Sync Processor: — Performs sync stripping and AGC of external TV signals. A phase locked loop is used to provide a stable synchronization signal. This module is required when a TV freeze mode is needed or when symbology must be mixed with an external TV image.

10. Memory: — Modular memory units are used for sensor and symbol display refresh memory. Modules can be combined to provide greater capacity up to a preset maximum. Includes output parallel-to-serial conversion for high data rate serial output to the output video processor.

11. Symbol Interface Buffer: — Provides buffer storage for display symbol control words and performs interface and housekeeping tasks for the symbol generator modules.

12. Symbol Executive Control: — Decodes the symbol instruction and data words and supplies the chain generator control signals.

13. Symbol Chain Generator: — These modules provide X and Y addresses to symbol refresh memory modules for storing symbol data in a television raster format.

14. Special Symbol Processor: — Processes output of symbol refresh memory to provide brightness distribution of symbol elements to temper the edge sharpness of digitally derived symbology. Decodes symbol intensity code to position centroid of symbol line. Performs digital-to-analog conversion of symbol intensity code and provides analog symbol video to composite sync generator and video mixer for mixing with sensor video.

15. Special Symbol Timing: — Generates read/write memory cycle timing for symbol refresh memory and symbol generator modules.

16. Programmable Controller: — Provides arithmetic, logic, registers, interface control, bus allocation, interrupt control and program decode control for the scan converter and symbol generator modules. Includes a microprogram memory.

17. Programmable Controller Memory: — Provides storage for all system control programs. Mode and system parameter modifications can be made by reprogramming this module. The basic memory configuration consists of a combination of read only memory and random access memory.

18. 28 VDC Discrete Conditioner: — Converts 28 VDC mode control input signals to digital words for mode control.

19. DC Analog Multiplexer and Analog-to-Digital Converter: — Provides selection of input analog signals and conversion to digital words. Input selection and data conversion controlled by the programmable controller.

20. Antenna Azimuth Position Logic: — Converts antenna azimuth analog signals to digital words. Compares antenna azimuth position with incremental update azimuth position from controller to generate data load command interrupts. Detects antenna turnaround and performs data smoothing. Performs other special processing required for each particular interface.

OBJECTS

It is an object of this invention to provide a digital scan converter system capable of accepting data from a variety of sensors having different data rates and formats and to display such data on a common indicator.

It is a further object of the invention to provide a system displaying all sensor and symbol video in a standard television raster format, thus providing a simple composite TV signal for display and recording purposes.

It is an additional object of the invention to utilize a parallel data bus control architecture with system modules controlled by means of the bus, thus providing easy configuration and control of system modules.

It is a still further object of the invention to utilize a programmable microprocessor controller to set up and control all system timing and control functions thus providing software modification of all modes and formats employed in the system.

A still further object of the invention is to provide an optimum modular digital scan converter display system, matched to sensor performance and which does not exceed the ability of the observer and which is produced at minimum cost.

BRIEF DESCRIPTION OF THE DRAWINGS

FIG. 28 is a functional block diagram of the symbol interface buffer module 72 of FIG. 3.

FIG. 29 is a functional block diagram of the executive control module 74 of FIG. 3.

FIG. 31 is a functional block diagram of the special symbol processor module 78 of FIG. 3.

FIGS. 34 and 35 are tables helpful in effecting physical connections of modules in configurations affording different resolutions.

FIG. 42b is a continuation of FIG. 42a.

FIG. 45 is a functional flow chart of a subroutine that might be used in the routine shown in FIG. 44a.

FIG. 46 is a functional flow chart of a subroutine that might be used in the routines shown in FIG. 44a and FIG. 44b.

FIG. 47 is a functional flow chart of a subroutine that might be used in the routines shown in FIG. 44a and FIG. 44b.

DESCRIPTION OF THE PREFERRED EMBODIMENTS

Although specific embodiment of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
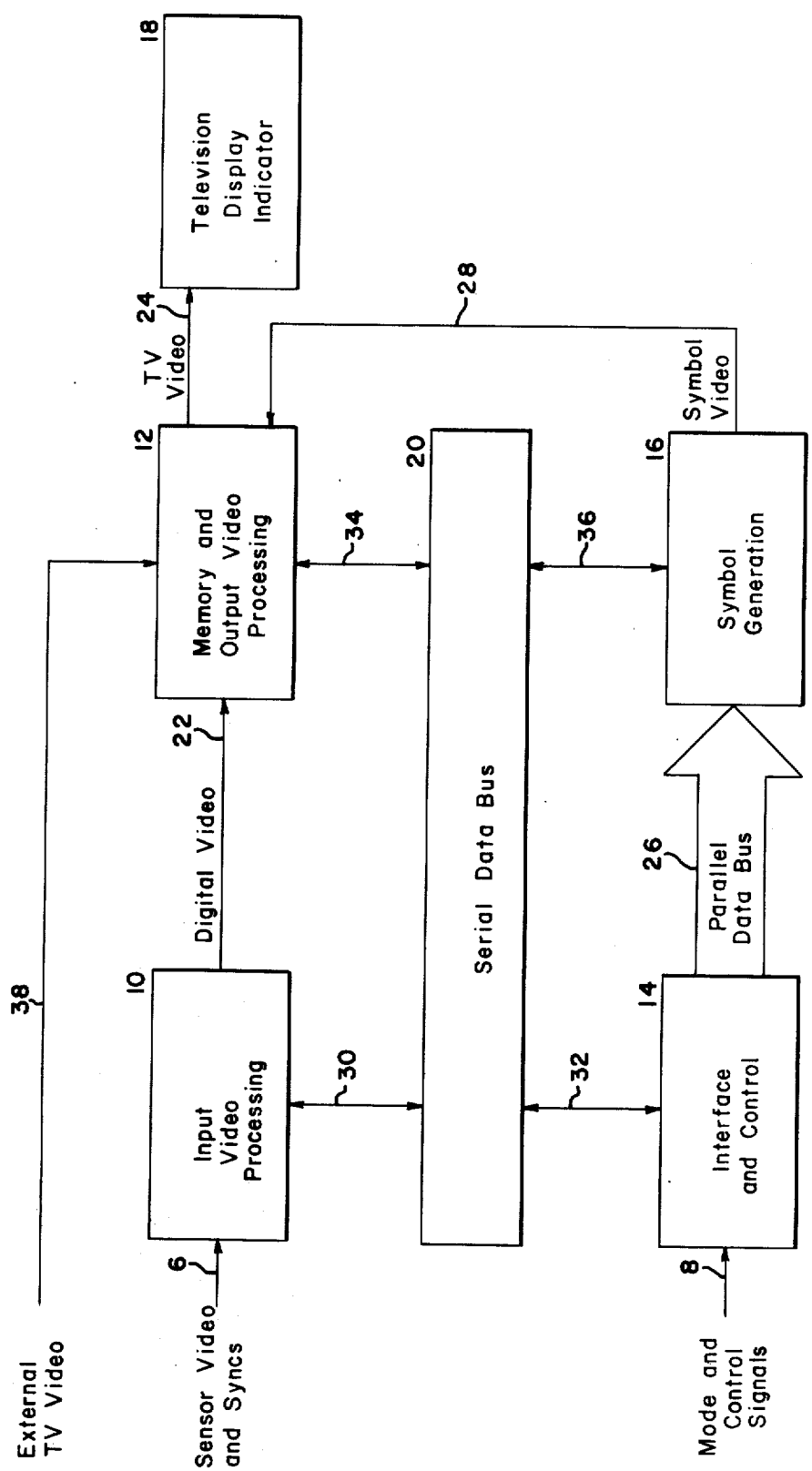
FIG. 1 is a functional block diagram of the modular digital scan converter of the invention.

Referring to FIG. 1, the input video processing subsystem 10 receives signal input in the form of sensor video and synchronizing signals on a lead 6. Signal information as output from the input video processing subsystem 10 is available at serial data bus 20 by means of composite lead 30 which also provides required internal signals to input video processing subsystem 10. Processed digital video information is fed by means of composite lead 22 from input video processing subsystem 10 to memory and output video processing subsystem 12. Memory and output video processing subsystem 12 also receives signal input in the form of external TV video by means of composite lead 38; required internal signals by means of composite lead 34 from serial data bus 20; and symbol video signals from symbol generation subsystem 16 by way of composite lead 28. Memory and output video processing subsystem 12 outputs TV video signal to television display indicator 18 by way of composite lead 24. Mode and control signals are received by interface and control subsystem 14 on a lead 8 and are available by means of composite lead 32 at serial data bus 20. After processing by interface and control subsystem 14, mode and control signals are fed by way of parallel data bus 26 into symbol generation subsystem 16. Symbol generation subsystem 16 communicates with serial data bus 20 by means of composite lead 36.

Figure 2:
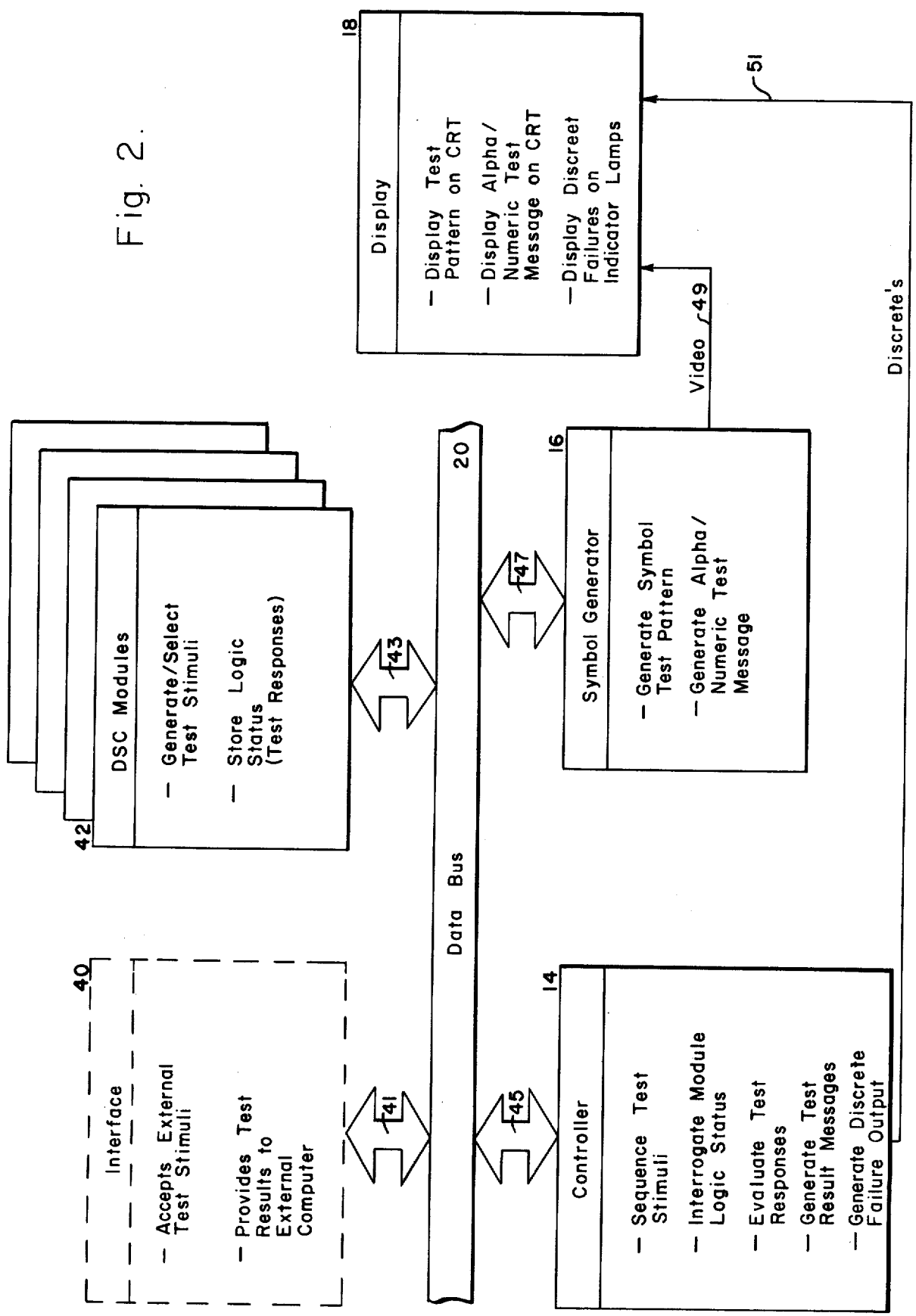
FIG. 2 illustrates the BIT-fault isolation concept of the programmable modular digital scan converter.

The built-in-test (BIT) fault isolation concept of the overall system is illustrated by FIG. 2. Serial data bus 20 receives and furnishes inputs from and to interface 40 which accepts external stimuli and provides test results to an external computer. Digital scan control modules 42 generate and select test stimuli and store logic status. Controller 14 and symbol generator 16 have outputs incident upon display unit 18.

As indicated, interface 40 which accepts external test stimuli and provides test results to an external computer, communicates with data bus 20 by means of composite lead 41. The digital scan control modules 42, which generate and/or select test stimuli and store logic status as test responses, communicate with data bus 20 by means of composite lead 43. Controller 14, preforming functions as formulation of sequence test stimuli, interrogation of module logic status for a given module, evaluation of test responses, generation of test result messages including discrete failure output messages, communicates with data bus 20 by means of composite lead 45. Finally, symbol generator 16 which generates symbol test patterns and alpha-numeric test messages, communicates with data bus 20 by means of composite lead 47. Display system 18 which processes and displays test patterns and alpha-numeric test messages on a cathode ray tube in addition to displaying discrete failures on indicator lamps, receives its input signals from symbol generator 16 and controller 14 by means of leads 49 and 51 respectively.

Figure 3:
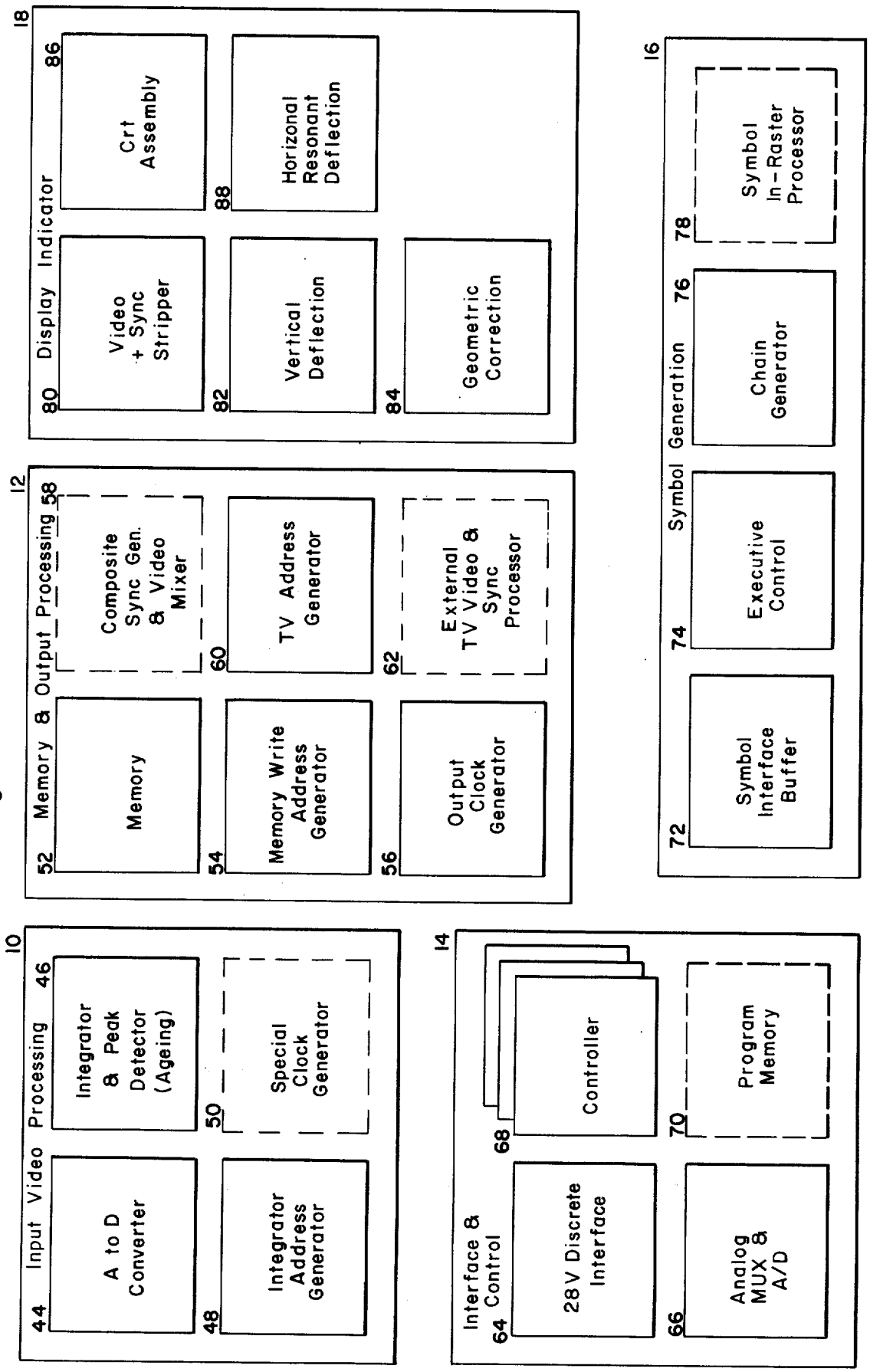
FIG. 3 illustrates a logical grouping of core modules into the main subsystems of the invention.

FIG. 3 illustrates the grouping of core modules into practical subsystems. It will be noted that the input video processing subsystem 10 includes an analog-to-digital converter system 44; an integrator and peak detector system 46; an integrator address generator 48; and a special clock generator 50. The memory and output processing subsystem 12 comprises a memory 52; a composite synchronizing generator and video mixer 58; a memory write address generator 54; a TV address generator 60; an output clock generator 56; and an external TV video and sync processor 62. The interface and control subsystem 14 comprises the 28 volt discrete interface 64; a controller system 68, an analog multiplexer and analog-to-digital converter 66; and the program memory 70. The symbol generation subsystem 16 comprises a symbol interface buffer 72; an executive control unit 74; a chain generator 76; and a symbol in-raster processor 78. The display indicator subsystem 18 comprises a video and sync stripper 80; vertical deflection unit 82; a horizontal resonant deflection unit 88; a geometric correction system 84; and a CRT assembly 86.

Figure 4:
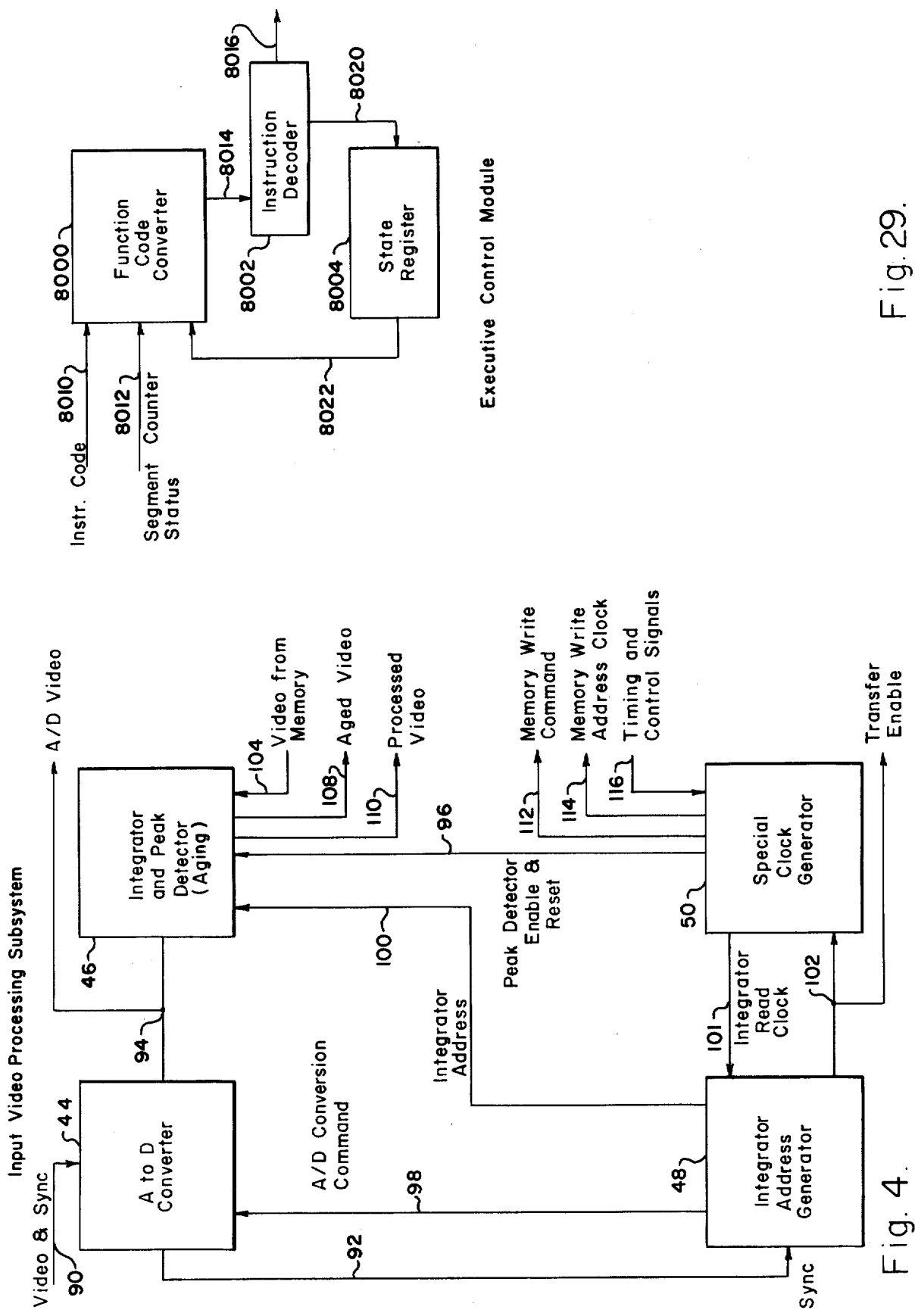
FIG. 4 is a functional block diagram of the input video processing subsystem.

Referring now to FIG. 4, analog-to-digital converter 44 receives video and synchronization signal inputs over composite lead 90. After processing, these signals are furnished to integrator address generator 48 by means of composite lead 92 and to integrator and peak detector subsystem 46 by means of composite lead 94 which also supplies the analog-to-digital converted video signal to the memory and output video processing subsystem. Analog-to-digital converter 44 also receives an analog-to-digital conversion command by means of composite lead 98. Integrator address generator 48 also receives input from special clock generator 50 by means of composite lead 101. Integrator address generator 48 outputs an integrator address signal to integrator and peak detector subsystem 46 by way of composite lead 100 and also integrator address generator 48 outputs signal information to special clock generator 50 by means of composite lead 102 which also provides a transfer enable signal to the overall system. Special clock generator 50 receives timing and control signal input by means of composite lead 116. Special clock generator 50 also outputs memory write command and memory write address clock signals by means of composite output leads 112 and 114 respectively. Special clock generator 50 also outputs a peak detector enable and reset signal to integrator and peak detector system 46 by means of composite lead 96. Integrator and peak detector system 46 receives video signal information from memory by means of composite lead 104 and outputs processed video signal and aged video signal by means of composite leads 110 and 108 respectively.

Figure 5:
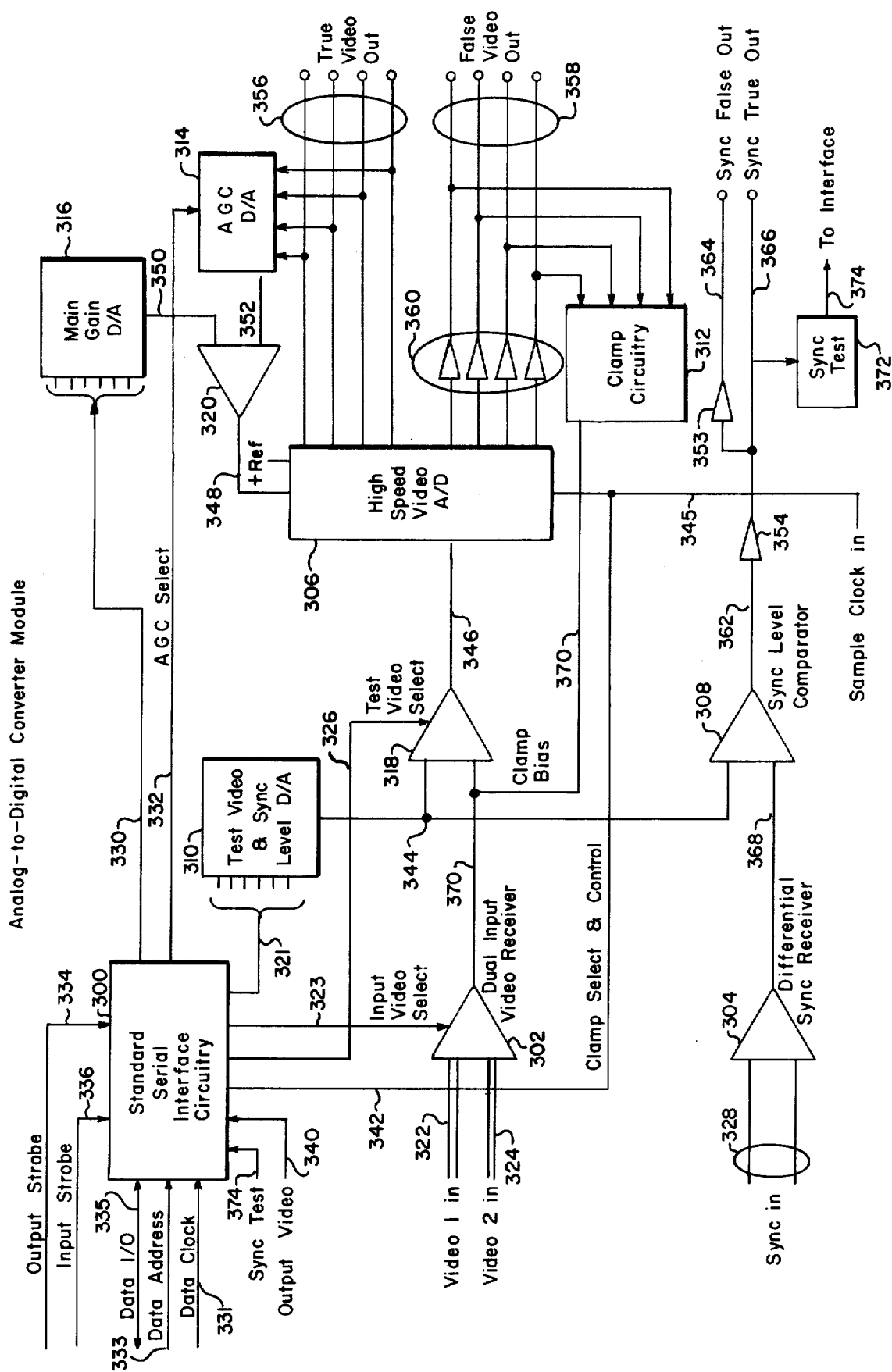
FIG. 5 is a functional block diagram of the analog-to-digital converter module 44 of FIG. 3.

Referring now to FIG. 5 the analog-to-digital converter module 44 of FIG. 3 is considered in stricter detail.

The video analog-to-digital converter in the preferred embodiment digitizes input analog video to 4 bits. Two external sources, for example, radar or TV, or one internal test signal can be selected by proper operation of the two dual input video amplifier circuits. The high-speed, 40 MHz hybrid digitizer is implemented with ECL logic necessitating output conversion to TTL levels for operation with the balance of the system. The analog-to-digital converter 44 also receives and processes the input synchronization signal, for example, radar pulse repetition frequency. This signal is differentially received and compared with a preselected level to define the sync pulse. Both polarities are output for use in the system as required.

Two other functions are performed in this module; base level video clamping and video automatic gain control. These functions can be independently selected under system program control. The purpose of the base level clamp is to compensate the bias into the video analog-to-digital converter for input signal drift. The clamp function is particularly desirable in the low pulse repetition frequency air-to-air modes where it is desirable to set the video cut-off point optimally in the noise. This is achieved by sensing the regularity of the zero state of the video analog-to-digital output. A digital gate is utilized to decode the all-zero state out of the analog-to-digital converter and the resultant pulse train is integrated. The integrator has two input components, the zero pulse train and a DC off-set which is the output of a very sensitive digital-to-analog converter. If the duty factor and peak pulse amplitude of the zero pulse train do not exactly balance the DC off-set from the digital-to-analog converter, the bias level of the analog-to-digital converter input signal will be shifted until these two components cancel providing a stable condition. For example, if it is desired to maintain a 0.20 duty factor, the equivalent DC off-set must be 1/5 the peak pulse amplitude. The digital-to-analog converted reference signal from the controller determines at what level in the noise the video is to be clamped. It can be programmably modified dependent on the video characteristics of the individual system mode. A relatively long time constant is employed in this loop to insure sensitivity only in a long term drift and not changes in information content of the video signal itself.

The automatic gain control loop is employed to vary the upper reference point of the analog-to-digital converter. Assuming proper base level clamping, this loop insures that the 16 states of the analog-to-digital converter are optimally distributed over the range of the input video. The video analog-to-digital signal output is digital-to-analog converted and integrated over a relatively long time constant to adjust the upper reference level of the analog-to-digital converter. Therefore, if the output signal contains high level video which would tend to saturate the analog-to-digital converter, that is, leave it in the all ones state, the upper reference would automatically track to the high state to insure optimal encoding. Conversly, a predominately small signal amplitude would reduce the upper reference down close to the low reference to increase the analog-to-digital sensitivity. The manually adjusted input video gain is added with its feedback signal to set the upper analog-to-digital reference point. Other circuitry on this module includes the standard serial data interface and BIT circuitry. Video channel BIT is provided by introducing various DC video levels and sensing the final digital output. Sync channel BIT is performed by setting a test flip-flop and sensing that its state has changed when a known sync pulse is present.

Dual input video receiver 302, a dual gate controlled amplifier manufactured by Motorola as part number MC1545L, receives dual video inputs at 322 and 324 and may also receive an input video select signal from standard serial interface circuitry 300, to be more fully described hereinafter at FIG. 6, by way of a lead 323. Output signal from dual input video receiver 302 is input to video amplifier 318, which comprises another dual gate controlled amplifier manufactured by Motorola as part number MC1545L and a fast FET operational amplifier manufactured by National Semiconductor as part number LH0032G. Video Amplifier 318 may also receive signal input from standard serial interface circuitry 300 by means of a lead 326, and a signal from test video and sync level digital-to-analog converter 310, manufactured by Precision Monolithic as part number DAC01BP, by means of lead 344. Clamp bias voltage is supplied to video amplifier 318 from clamp circuitry 312 by means of lead 370. Clamp circuitry such as indicated at 312, utilized to alter signal level between logic systems, is well-known in the art and will not be further described herein. Output signal from video amplifier 318 is furnished as input signal to high-speed video analog-to-digital converter 306, to be more fully described hereinafter at FIG. 7, by means of a lead 346. Reference voltages are supplied to high-speed video analog-to-digital converter 306 as shown at + Ref and by means of a lead 348 from reference voltage amplifier 320, a DIP dual operational amplifier manufactured by Fairchild as part number 747DM. Signal input to reference voltage amplifier 320 is furnished from Automatic Gain Control digital-to-analog converter 314, a 5-bit comparator manufactured by Motorola as part number MC10166L, by means of lead 352 and from manual gain digital-to-analog converter 316, a digital-to-analog converter manufactured by Precision Monolithic as part number DAC01BP, by means of lead 350. Signal inputs to manual gain digital-to-analog converter 316 and automatic gain control digital-to-analog converter 314 are furnished from standard serial interface circuitry 300 by means of leads 330 and 332 respectively. High-speed video analog-to-digital converter 306 receives a clock signal from systems clocks by means of a lead 345.

Synchronization input signal is received by differential sync receiver 304, an operational amplifier manufactured by National Semiconductor as part number LM118H, by means of dual input leads 328. Signal output from differential sync receiver 304 is furnished as signal input to sync level comparator 308, a comparator manufactured by National Semiconductor as part number LM111H, by means of lead 368. An alternative comparator manufactured by AMD as part number AM111H has been used successfully in this application. Signal output from sync level comparator 308 is furnished to DIP HEX inverter 354, manufactured by Texas Instruments as part nummber SN5404J, by means of a lead 362. Output from inverter 354 is furnished to an additional identical inverter 353, and to sync test flip-flop 372, a dual J/K flip-flop manufactured by Texas Instruments as part number SN54109J. The output from sync test flip-flop 372 is furnished to the interface circuitry by means of lead 374. The output signal from inverter 354 appearing on lead 366 is the sync true output signal while the output signal from inverter 353 appearing on lead 364 is the sync false output signal.

High-speed video analog-to-digital converter 306 outputs a quantized true video output signal to the system by means of quad lead 356, which signal output is also furnished to automatic gain control digital-to-analog converter 314. A quantized false video output signal is also furnished to the system by means of inverter 360, a quad level translator manufactured by Motorola as part number MC10125L, by way of quad lead 358, which signal output is also furnished to the clamp circuitry 312.

Standard serial interface circuitry 300 receives as input signals from the system, input and output strobe signals on leads 336 and 334 respectively, data address information on lead 333, system clock timing on lead 331, sync test information on lead 374, output video signal on lead 340 and also inputs and outputs data on a composite lead 335. In addition to the output signals already noted, standard serial interface circuitry 300 outputs signal information to test video and sync level digital-to-analog converter 310 by means of composite lead 321.

Figure 6:
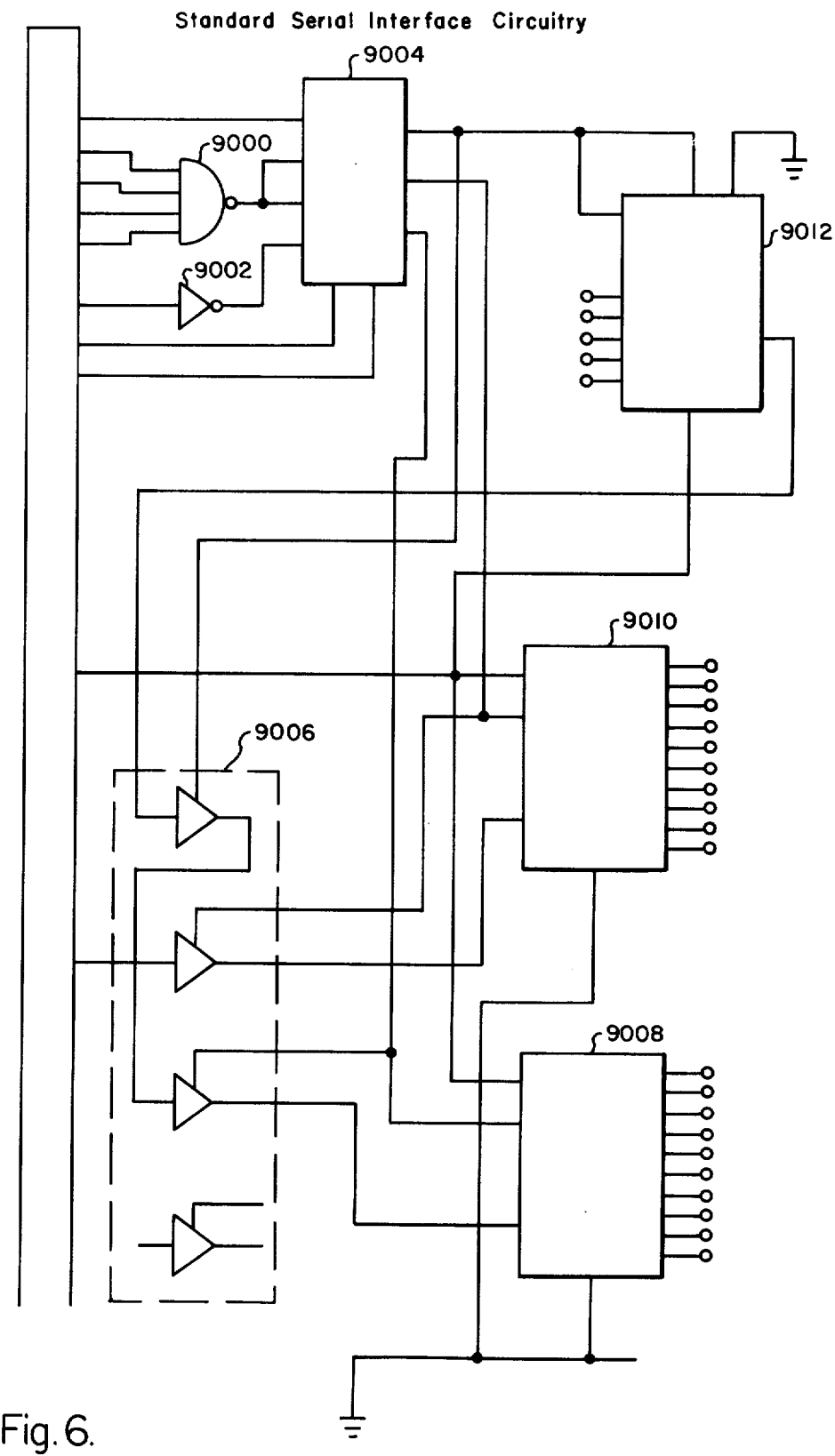
FIG. 6 illustrates in more detail the standard serial interface circuitry 300 of FIG. 5.

Referring to FIG. 6, standard serial interface circuitry 300 comprises a DIP dual 4-input gate 9000 part number SN54S20J, a HEX Inverter 9002 part number SN5404J, a DIP Dual Decoder/Demux 9004 part number SN54LS155J, a DIP shift register 9012 part number SN54165J, all manufactured by Texas Instruments, a quad tri-state buffer 9006 manufactured by National Semiconductor as part number DM7093J and two identical shift registers, 9008 and 9010 manufactured by Signetics as part number S8273F. The standard serial interface circuitry functions to send data from the controller, to be described infra, to analog-to-digital converter module 44 and BIT test and then back to the module. Under the control of the controller, the standard interface circuitry 300 selects the operating mode for the analog-to-digital converter 44, selecting proper inputs, gains and signal offsets, for example, selecting automatic gain control or manual gain control.

Figure 7:
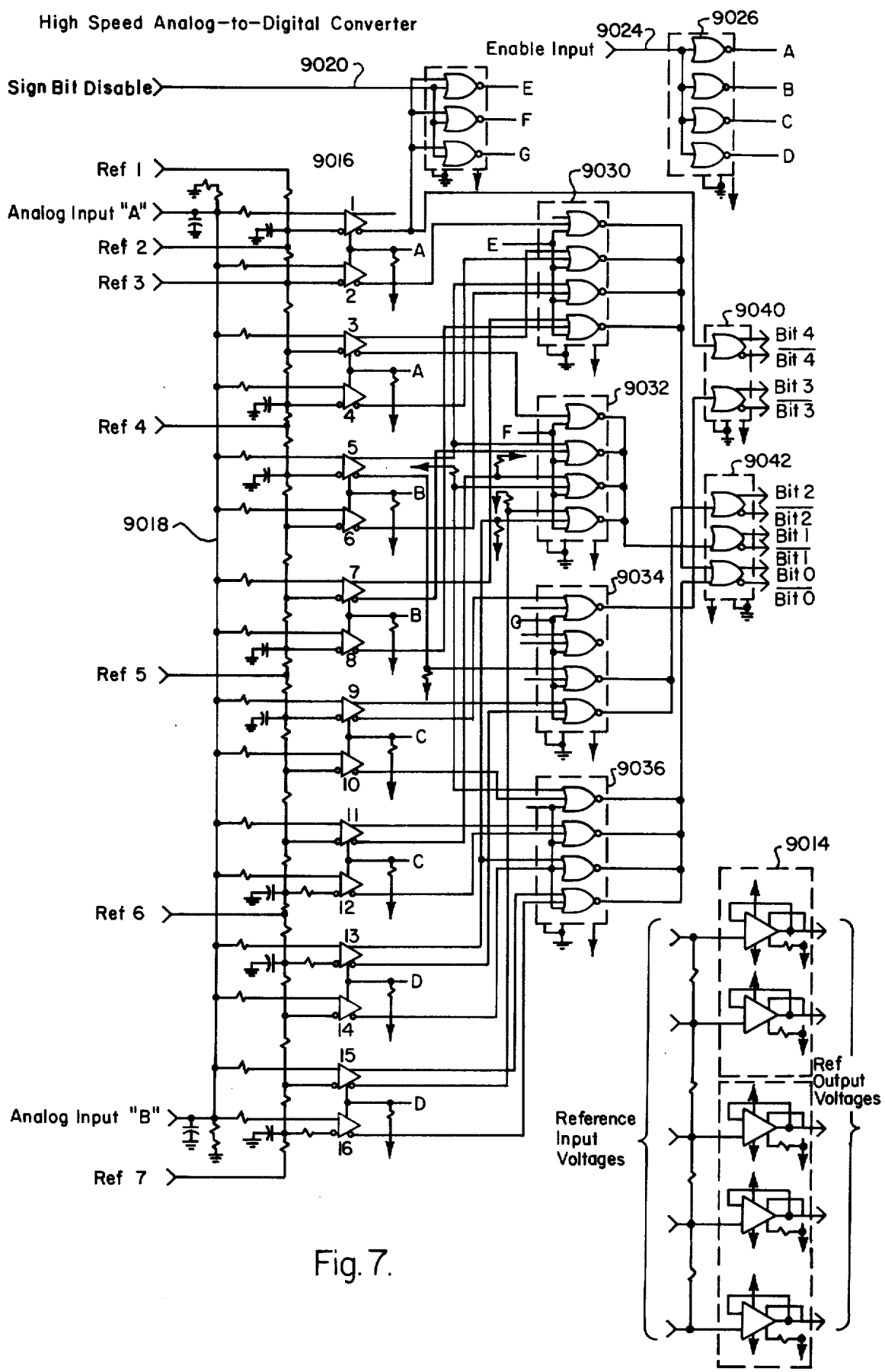
FIG. 7 is a schematic and logic diagram of the high speed video analog-to-digital converter 306 of FIG. 5.

Referring now to FIG. 7, the High Speed Video Analog-to-Digital Converter 306 of FIG. 5, will be explained in greater detail. There is illustrated an adaptive quantizer utilized as a 4-bit encoder. The quantizer is adaptive in the sense that it can adjust to the references applied to the encoder depending on the range of the incident video inputs. The encoder, as shown in the preferred embodiment, takes an analog input and quantizes it, giving a 4-bit binary output. References such as Ref. 1, Ref. 2, ..., Ref. 7 are fed from operational amplifiers such as are indicated at (9014). Prior art effectuations have developed reference voltages for comparators in like situations by means of a straight resistive network. The indicated scheme has been implemented to decrease voltage errors and to improve the basic linearity of the encoder. It will be noted that there are actually five bits output, i.e., Bit 0 through Bit 4. This configuration results from the design of this particular encoder as a general piece of hardware, usable in several analog-to-digital converters operable at different speeds. The illustrated encoder has been operated at speeds up to 75 MHz and has the capability of being operated at speeds up to 100 MHz. The encoder comprises basically a string of 16 comparators and associated decoding logic that accepts the code output of the comparators and converts it to a 4-bit binary output. There is provided a divider string of resistors (9016) such that a specific reference is supplied to each comparator by means of reference voltages Ref. 1 through Ref. 7 thus referencing each comparator to a different quantum level. The comparators thus make decisions in regard to the reference voltage supplied to each one. There are $2^N - 1$ comparators needed to provide a N-bit binary output, therefore a 4-bit encoder requires $2^4 - 1 = 15$ comparators. It will be noted that there are 16 comparators in the illustrated configuration. On Occasion it is desired to stack these encoders and make 5-bit or 6-bit full parallel analog-to-digital converters. If we wanted to obtain a 5-bit encoder we would need $2^5 - 1 = 31$ comparators and stacking two 15- comparator configurations would leave us with a configuration that is one short of the requisite number, i.e., only 30 comparators. Extension to higher orders is immediately apparent. The analog input comes into the encoder on a 50-ohm stripline (9018) and is connected to the input of each comparator through an input resistor. The logic utilized is entirely emitter coupled logic (ECL). The comparators are manufactured by Advanced Micro Devices as part number AM685. All points designated by the same capital letter not in quotes, connect internally. Upward pointing solid arrows indicate positive operating voltages others indicate negative operating voltages. A sign bit disable signal is provided on a lead (9020) to logic system (9022) and an enable input signal is supplied on a lead (9024) to logic system (9026). An analog input signal may be accepted either at analog input "A" or at analog input "B". These inputs are then processed through comparators 1 through 16 which are set up in quantum levels through a resistor string denoted generally at (1916) and the reference output voltages furnished from operational amplifier configuration (9014). Resulting coded signals output from the comparators 1 through 16, are then input to logic systems 9030, 9032, 9034 and 9036. The resulting output signals from logic systems 9030, 9032, 9034 and 9036 then form the four binary outputs denoted as Bit 0, Bit 1, Bit 2 and Bit 3 by way of logic systems 9040 and 9042. It is to be noted that the inverse of these bits is also formed and output for system use. The output signal from comparator 1 goes to form Bit 4 and its inverse. This output is utilized when it is desired to stack encoders for some other applications as already mentioned. Bit 4 and its inverse are merely ignored in the illustrated configuration in the preferred embodiment. Thus analog inputs at analog input "A" or "B" have been quantized to form a 4-bit binary code.

Figure 8:
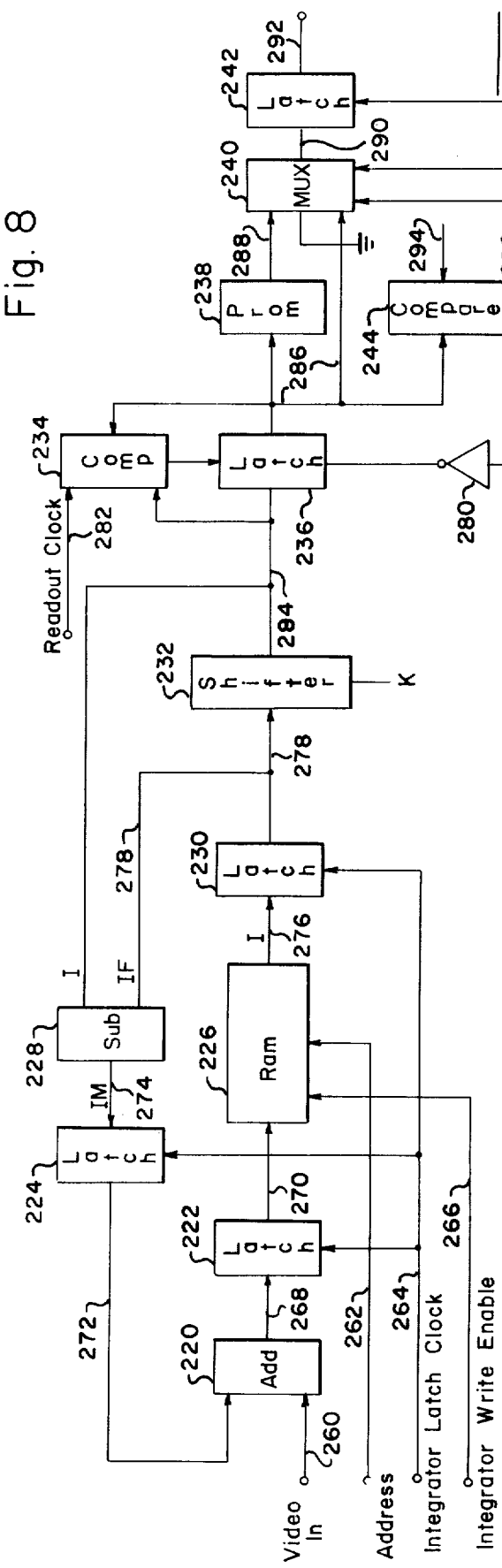
FIG. 8 is a functional block diagram of the integrator and peak detector 46 of FIG. 3.
Figure 8A:
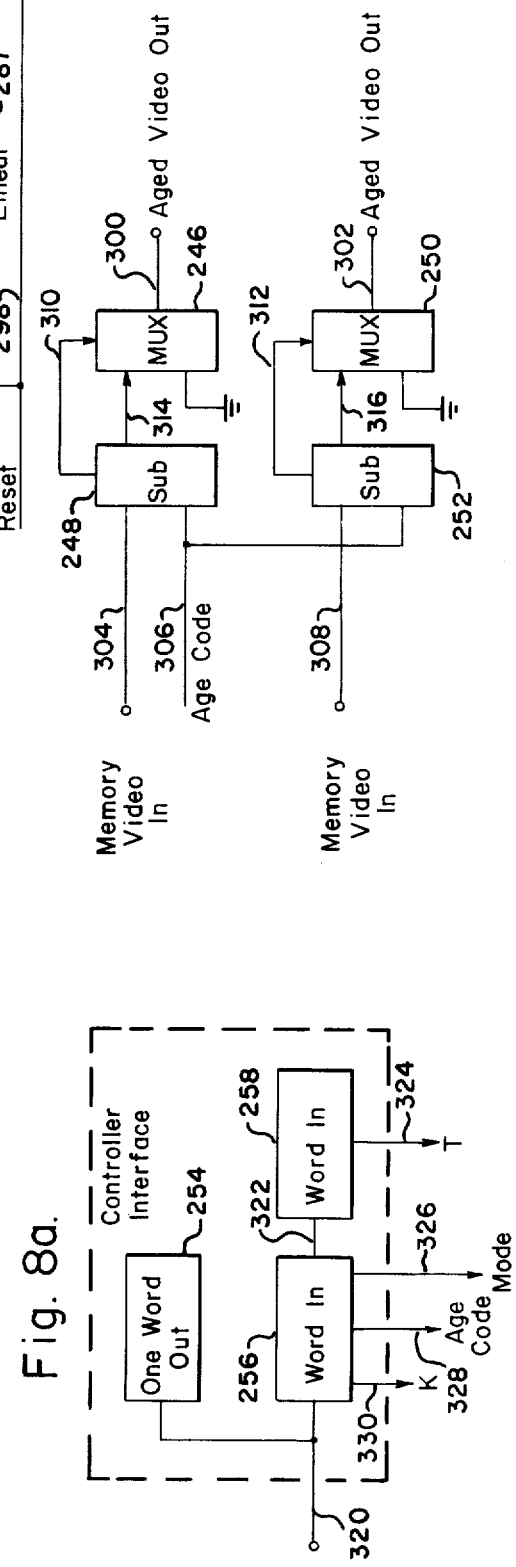
FIG. 8a is a functional block diagram of the controller and interplace units 68 and 64, respectively shown in FIG. 3.

Referring now to FIG. 8 the peak detector/integrator subsystem 46 of FIG. 3 will be considered in greater detail.

This module performs 4 basic functions, first sweep-to-sweep integration, second peak detection, that is, range collapsing, third intensity compression, and fourth aging.

INTEGRATION

The integration mode sums a percentage of the previous radar sweeps to the current sweep. The percentage is determined by the value of the feed-back constant from the controller, for example, K = 0, ¼, ½, 7/8, 15/16, and 1. The optimal value of the feed-back constant K is a function of the radar mode.

The integrated video from the previous sweeps, I, is read out of the integrator memory and stored in a latch. This value is multiplied by K by subtracting a shifted I from itself. Since binary shifting is equivalent to dividing by two for each shift, the result is $I - \frac{1}{2}I = \frac{1}{2}I$, or $I - \frac{1}{4}I = \frac{3}{4}I$ to $I - 1/16I = 15/16I$. The shifting is performed by multiplexing. The I multiplied by K is also latched and then added to the new video value from the analog-to-digital converter. This last is also latched and stored in the original location in memory. This produce occurs for each pulse repetition frequency input sample.

Either destructive or nondestructive readout of the integrator can be selected by the controller. In the nondestructive readout mode the memory is read and the output latch is clocked to allow the video to reach the peak detector portion of the card. For destructive readout, the memory input latch is reset and the memory write enable is activated to replace all data. read by zeros.

PEAK DETECTION

The peak detector performs range compression on the integrated video sweeps. The procedure starts with resetting a latch and then comparing the output of the integrator with the latch. If the value in the latch is larger than the integrator video, the input is disregarded. If the integrator video is larger than the latch, the integrator video is then loaded in the latch. The process is continued until the next reset.

INTENSITY COMPRESSION

The latched value is truncated by a programmable read only memory (PROM) and a multiplexer at the output selects either of two truncated functions or the four most significant bits (MSBs) of the latch. The reset clock is also used to trasnfer the output to a latch on the memory card.

A submode of the intensity compression function is thresholding. There are two threshold modes in the peak detector, hit/miss and video/miss. The peak value in the latch is compared to a threshold received through the controller interface. When the peak value is less than the threshold the output is replaced by a zero. If the threshold is exceeded, the output is forced to all ones in the hit/miss mode. In the video/miss mode the actual video is output when the threshold is exceeded. Either the truncated or linear video can be selected. The output can also be forced to all ones or all zeros by the controller. All ones are selected by disabling the PROM and selecting the truncation mode. All zeros are selected by disabling the output multiplexer.

AGING

Aging is implemented by subtracting a constant from the video output from the memory. If the subtraction underflows the output is forced to zero by a multiplexer. The "aged" value is transferred back to the memory. The controller determines the subtraction constant which is then transmitted over the serial data interface.

The integrator and peak detector 46 receives video signal input by means of composite lead 260 into adder 220 which comprises three integrated circuits manufactured by Texas Instruments under part number SN54283J; address information over composite lead 262 into random access memory (RAM) 226 comprising 10 integrated circuits manufactured by Signetics as part number S82S11FJ; a clock signal over a lead 264 into latch 222 comprising two integrated circuits manufactured by Texas Instruments as part number SN54S174J, latch 224 comprising three integrated circuits manufactured by Texas Instruments also as part number SN54S174J and latch 230 comprising two integrated circuits identical to those used in latch 222 and 224; and an integrator write-enable signal by means of lead 266 into RAM 226. Adder 220 furnishes its signal output by means of composite lead 268 to latch 222 which in turn furnishes signal input to RAM 226 by means of composite lead 270. RAM 226 furnishes input to latch 230 by means of composite lead 276. Shifter 232 and subtractor 228, comprising eight integrated circuits manufactured by Texas Instruments as part number SN54S151J; and three integrated circuits manufactured by Texas Instruments as part number SN54283J respectively, receive signal input from latch 230 by means of composite lead 278. Shifter 232 furnishes its output to the peak detector section of the integrator peak detector module 46 by means of composite lead 284 and also to subtractor 228 which in turn furnishes input signal to latch 224 by means of lead 274. The signal thus derived through latch 224 is furnished to adder 220 by means of lead 272.

Peak detection is accomplished in latch 236 and comparator 234 comprising two integrated circuits manufactured by Texas Instruments as part numbers SN54S174J and two integrated circuits manufactured by Fairchild as part number 9324DM. Latch 236 and comparator 234 receive signal input from shifter 232 by means of a composite lead 284; comparator 234 receives a readout clock signal by means of lead 282 and the output signal from latch 236 by means of lead 286. Latch 236 receives a reset signal by means of a lead 298 by way of an integrated circuit 280 manufactured by Texas Instruments as part number SN5404J. The signal output from latch 236 is furnished also to PROM 238, an integrated circuit manufactured by Mono Mem as part number MM5306J; multiplexer 240 an integrated circuit manufactured by Texas Instruments as part number SN54S157J; and comparator 244 comprising two integrated circuits manufactured by Fairchild as part number 9324DM, by means of composite lead 286. Comparator 244 receives a threshold reference signal by means of a lead 294 and furnishes its output on a lead 296. Multiplexer 240 receives signal input by means of lead 296 from comparator 244 and from PROM 238 by means of composite lead 288 and also a linear signal input on a lead 287. Signal output from multiplexer 240 is furnished to latch 242 by means of a lead 290; latch 242 also receives a reset signal by means of lead 298. Latch 242 which furnishes a video output signal on a lead 292, is an integrated circuit manufactured by Texas Instruments as part number SN54S174J.

The aging function is accomplished in subtractors 248 and 252, integrated circuits manufactured by Texas Instruments as part number SN5428J, and multiplexers 246 and 250 also manufactured by Texas Instruments as part number SN54S157J. Subtractors 248 and 252 receive video signal input from memory on composite leads 304 and 308 respectively, receiving also an age code on lead 306. Output signal from subtractors 248 and 252 is furnished to multiplexers 246 and 250 by means of composite leads 314, 310 and 316, 312 respectively. Aged video output signal from multiplexers 246 and 250 appears on composite leads 300 and 302 respectively.

The controller interface comprises a word-in function 256 comprising an integrated circuit manufactured by Texas Instruments as part number SN54LS155J, and two integrated circuits manufactured by Signetics as part number S8273FJ; a word-in function 258, an integrated circuit manufactured by Signetics as part number S8273FJ, and a one-word-out function 254 an integrated circuit manufactured by Texas Instruments as part number SN54165J. The controller interface communicates with the system by means of input-output lead 320 into word-in function 256 and one-word-out function 254. Word-in function 256 outputs a feedback constant K on lead 330, an age code on lead 328, a mode signal on lead 326 and an input signal to word-in function 258 on lead 322 which in turn outputs a threshold signal T on lead 324.

The integrator address generator 48 of FIG. 3, generates the timing and control signals for the integrator/peak detector module, and the clock conversion command for the video analog-to-digital converter.

Figure 9:
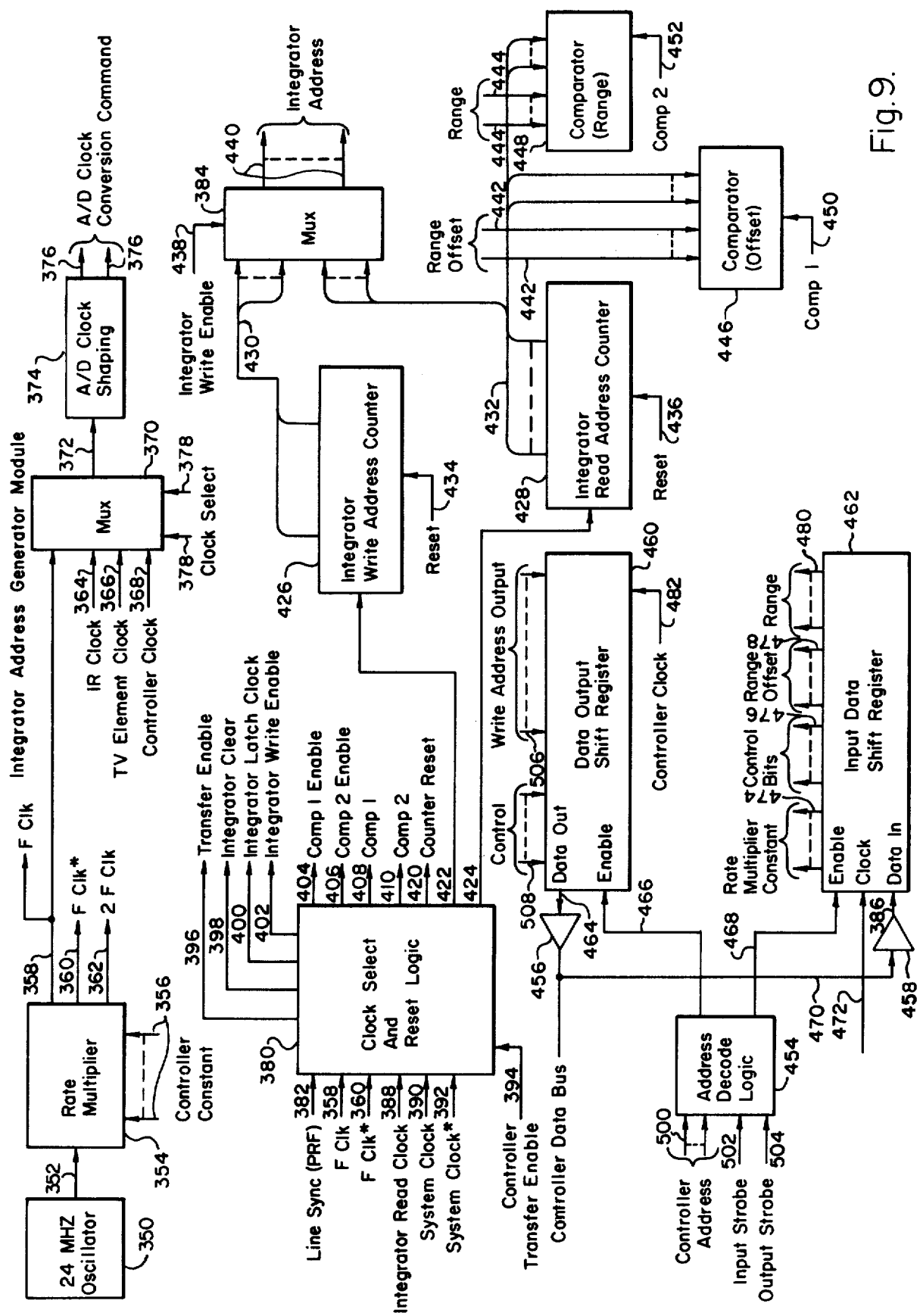
FIG. 9 is a functional block diagram of the integrator address generator 48 of FIG. 3.

Referring now to FIG. 9, a 24 MHz crystal oscillator in the preferred embodiment is the basic timing source for the clocks used to sample the incoming analog radar video. The 24 MHz crystal oscillator is input to a rate multiplier whose constant is set up by the controller and ranges from 0/64 to 63/64. The combination of the oscillator frequency and multiplier constants allows the six sample rates required by the system to be generated accurately.

Receipt of a line sync that is a pulse repetition frequency pulse resets the module control logic and initiates the generation of analog to digital converter clocks, and integrator clocks and read/write addresses. The read address counter is used to perform two functions. If a range off-set has been programmed by the controller, that counter first counts up to the value of the offset. When coincidence is reached, the counter is reset and this enables the integrator clocks and write address counters which run until the read address counter reaches coincidence with the value of the number of range samples that have been programmed by the controller. At that time, all clocking is inhibited until another PRF pulse arrives, or until a transfer command is received.

The controller determines when the proper number of range sweeps has been integrated and transmits transfer enable signal to the integrator address generator. After the current range sweep has been completed, the logic switches to operate from the memory timing, and clocks and read addresses only are output to the integrator. Again the read address counter runs until it reaches coincidence with the range value, the logic is inhibited and waits for the next line sync.

Referring still to FIG. 9, 24 MHz oscillator 350 manufactured by Q-Tech Corporation as part number QT1T9 furnishes its output to rate multiplier 354 which comprises an integrated circuit manufactured as part number SN54S174J; two integrated circuits manufactured as part number SN54S157J; and two integrated circuits manufactured as part number SN54283J all by Texas Instruments by means of a lead 352. Rate multiplier 354 also receives a controller constant input signal on composite lead 356. Rate multiplier 354 furnishes clock outputs on leads 358, 360 and 362. Signal output from rate multiplier 354 is incident to multiplexer 370, an integrated circuit manufactured by Texas Instruments as part number SN54S153J, by means of the lead 358. Multiplexer 370 also receives signal input by means of leads 364, 366, 368 and 378 as shown, and furnishes its output by means of lead 372 to analog-to-digital clock shaping circuit 374 comprising an integrated circuit manufactured by Texas Instruments as part number SN54S112J and a 15 nano-second delay line manufactured by Q-Tech Corporation as part number TQZA3-10. Output from analog-to-digital clock shaping circuit 374 is furnished by means of a composite lead 376.

Clock select and reset logic circuits 380 accept signal inputs as shown on leads 382, 358, 360, 388, 390, 392, 394, 408 and 410 and furnish the indicated output signals on leads 396, 398, 400, 402, 404, 406, 420, 422 and 424. In particular, output signal from clock select and reset logic circuits 380 is furnished respectively by means of leads 422 and 424 to integrator write address counter 426 comprising three integrated circuits manufactured by Texas Instruments as part number SN54S163J and integrator read address counter 428 comprising three integrated circuits, manufactured by the same company as the same part number. Integrator write address counter 426 and integrator read address counter receive reset signals by means of leads 434 and 436 respectively. Output signal from integrator write address counter 426 is furnished to multiplexer 384, comprising three integrated circuits manufactured by Texas Instruments as part number SN54S157J, by means of composite lead 430. Multiplexer 384 also receives an integrator write enable signal by means of lead 438. Integrator read address counter 428 furnishes signal output to multiplexer 384, range offset comparator 446 comprising two integrated circuits manufactured by Fairchild as part number 9324DM and range comparator 448 comprising two identical Fairchild integrated circuits, by means of composite lead 432. Offset comparator 446 also receives range offset information by means of composite lead 442 while range comparator 448 receives range information on composite lead 444. The address decode logic 454, an integrated circuit manufactured by Texas Instruments as part number SN54155J, receives controller address information by means of composite lead 500 and input and output strobe signals on leads 502 and 504 respectively. Output signal from the address decode logic 454 is furnished to data output shift register 460 comprising two integrated circuits manufactured by Texas Instruments as part number SN54165J by means of a lead 466 and to input data shift register 462 comprising three integrated circuits manufactured by Signetics as part number S8273F by means of a lead 468. Data output shift register 460 also receives control information by means of composite lead 508 and write address output signal information on composite lead 506 plus a controller clock signal on a lead 482. Output from data output shift register 460 is accomplished by means of lead 464 to amplifier 456 and thence to the controller data bus and amplifier 458 by means of lead 470. Input data shift register 462 receives input signal from amplifier 458 by means of a lead 386 and a controller clock signal by means of lead 472. Output signals from input data shift register 462 appear on composite leads 474, 476, 478 and 480 as shown.

Figure 10:
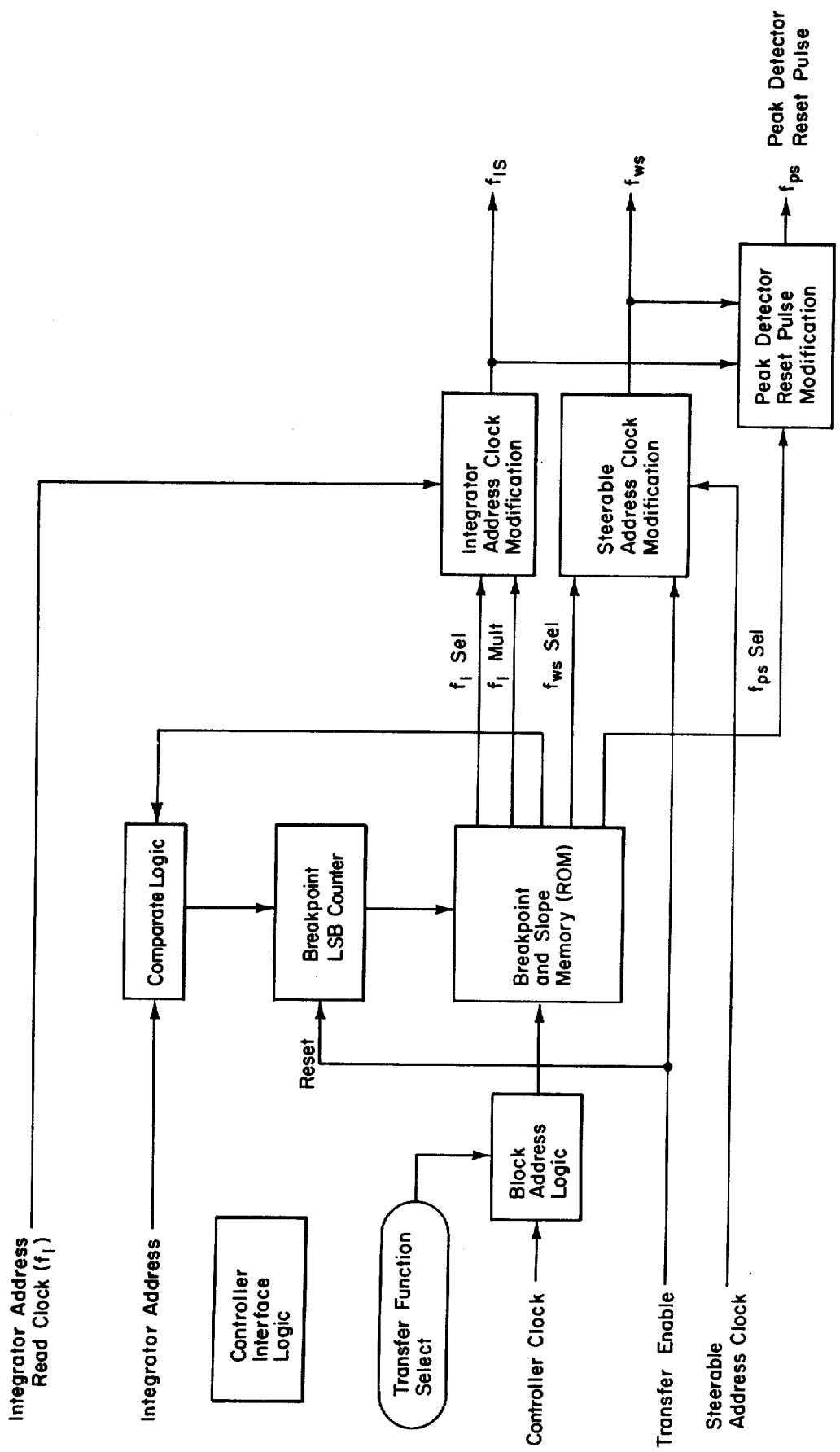
FIG. 10 is a functional block diagram of a special clock generator 50 of FIG. 3.

The special clock generator FIG. 10, provides variable frequencies and timing signals for the ground range sweep correction and the terrain following radar displays.

The module includes a set of read only memories (ROMs) which are used to store all data of breakpoints and slopes. The transfer function is selected by the software and the comparator logic is designed to compare a 10-bit integrator address to the output of the ROM continuously. When these two addresses are equal, it means that a breakpoint is reached and the 3-bit breakpoint least significant bit (LSB) counter is advanced and the ROM provides the next slope data.

The integrator address clock modification consists of a 6-bit rate multiplier and multiplexers. The input clock, $f_b$, is modified by the slope data, $f_i$MULT, from the ROM. The outgoing integrator address clock, $f_{i'}$ then provides the desired nonlinear frequency function per selected slopes.

The memory write clock modification consists of a frequency divider. In the preferred embodiment, this is a divide by 32 and a multiplexer. The desired write address clock $f_{wa}$ is generated, for different modes under program control.

The peak detector reset pulse generator is used to select the desired peak detector reset pulse according to the condition of $f_{wa}/f_{ls}$ as follows:

$$f_{pa} = f_{ls} \text{ if } f_{wa}/f_{ls} \geq 1$$

$$f_{pa} = f_{wa} \text{ if } f_{wa}/f_{ls} < 1,$$

that is, take the smaller of $f_{wa}$ and $f_{ls}$ unless they are equal, in which case $f_{ls}$ will be selected.

Figure 11:
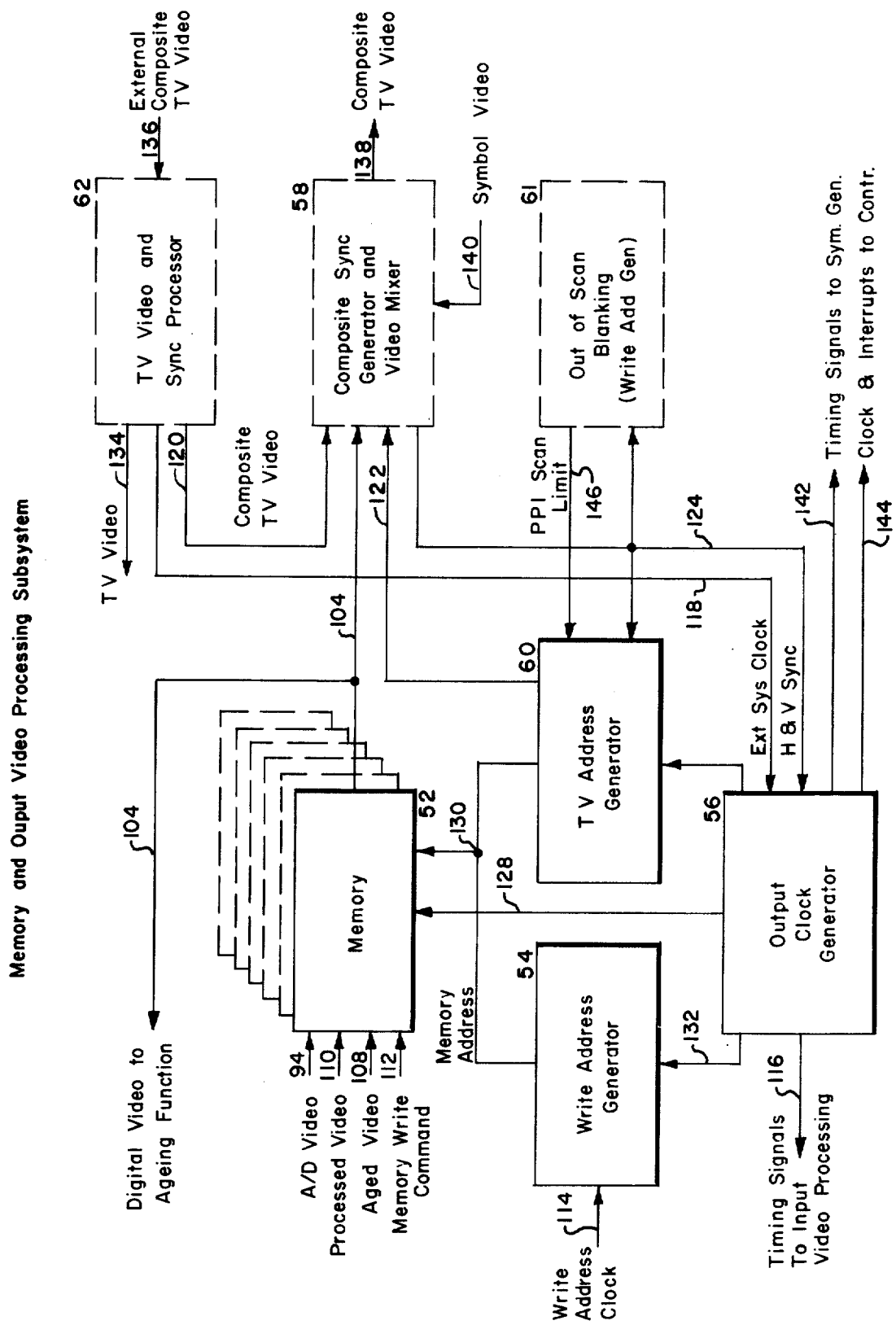
FIG. 11 is a functional block diagram of the memory and output video processing subsystem.

Referring now to FIG. 11 the memory and output video processing subsystem will be considered in greater detail. The memory module 52 accepts analog-to-digital video; processed video; aged video; and memory write command signals by way of leads 94, 110, 108 and 112 respectively. The memory module also accepts memory address signals from write address generator 54 and TV address generator 60 over composite lead 130. An additional input to the memory module comes from output clock generator 56 by supply lead 128. The memory module 52 provides digital video signal output on lead 104 to the aging function and to composite sync generator and video mixer 58. The write address generator 54 receives write address clock information on lead 114 and a signal from output clock generator 56 on lead 132. The output clock generator 56 also receives signal input from TV video and sync processor 62 by way of lead 118 and horizontal and vertical sync information from composite sync generator and video mixer 58 by way of lead 124. Output clock generator 56 also outputs timing signals to the symbol generator by way of lead 142 and clock and interrupt signal to the controller by means of lead 144. Out-of-scan blanking circuit 61 supplies PPI scan limit signals to TV address generator 60 by way of lead 146 and also supplies and receives horizontal and vertical sync information to and from TV address generator 60 by means of lead 124. Composite sync generator and video mixer 58 receives a composite TV video signal input from TV video and sync processor 62 by way of lead 120, memory signal information by way of lead 104, and TV address generator signal by means of lead 122. Symbol video is also supplied to composite sync generator and video mixer 58 by means of lead 140. Composite sync and video mixer 58 outputs composite TV video signal by means of lead 138. TV video and sync processor 62 receives external composite TV video by means of lead 136 and outputs TV video by means of lead 134.

The memory module 52 forms the core of the display refresh memory and symbol generator buffer memory. 4K × 1 dynamic RAMs are used, 24 per card for a total of 96K bits ($K = 1024$). In addition to the RAMs, the card contains input data multiplexers and shift registers, chip enable decoding logic, and output shift registers.

Data in 8-bit bytes are entered into the memory input shift registers through data select multiplexers either serially or in parallel. Data entered serially include the aged data, built in test data, and digitized TV video. Only the radar data are entered in parallel, however, capability is provided for entering parallel data from two different sources. Once in the shift register, the data are transferred to a latch, required due to the high serial data rate encountered in the TV freeze mode. All 8-bits of serially entered data, in the preferred embodiment, are loaded into main memory during one memory write cycle. A single paralle bit of data appear at all 8 outputs of the latch, however, only one chip is selected during the parallel mode, and the single parallel bit is loaded into only one location in memory. Memory timing is generated in the output clock generator 56; the addresses are generated in the memory write address generator 54. Six address lines, 3 control lines, and 6 chip select lines are input to the module to control the memory read/write operation. The memory timing cycle is held independent of system mode at 880 nanoseconds in the preferred embodiment. To conserve power, the chip select is held low and the chip select function is accomplished by gating the row address strobe to the selected chip.

COMPOSITE SYNC GENERATOR AND VIDEO MIXER 4-bit digital scan converter (DSC) video is digital-to-analog converted and fed to the video mixer 58 where it may be combined with symbol video. The video mixer bandwidth is in excess of 10 MHz in the preferred embodiment.

External TV for viewing on a monitor is routed through the video mixer. When TV freeze is selected, the TV video is electronically switched from external TV to DSC TV for viewing continuity.

Counters keep track of the CRT beam position and generate composite sync and other timing signals for synthesizing the DSC video into EIA standard formatted composite sync.

A clock pulse from the output clock generator is used to generate all the timing waveform. When TV freeze is selected, this clock is locked in phase to the external TV signal to assure non-smear analog-to-digital conversion of the TV signal.

Controller interface circuitry is provided for fault isolation and mode control.

MEMORY WRITE ADDRESS MODULE

The function of the memory write address module, 54 is to generate the write addresses which allow data to be written into the display refresh memory.

The card has an X and a Y address generator, each consisting of a rate multiplier followed by an up-down counter. Inputs from the controller set up the rate multiplier constants and the X and Y counter start points. The address generator clocks originate at the output clock generator, are gated through the special clock generator, and input to the address generators. To provide maximum flexibility allowing for different memory organizations, the X and Y counter address outputs are brought to the card connector pins. The card connector wiring routes them back onto the card as required, into data multiplexers and decoders controlled by the address enable signal and row address strobe which come from the output clock generator. The output of the multiplexers are tri-state buffered to be tied with the row/column read addresses from the TV address generator at the memory. The three most significant bits of the X address generator become the three memory chip enable signals and the decoder outputs are the memory byte enables.

Four 8-bit bytes (32 bits) are readout from a combination of any two memory cards during TV readout. The data are strobed into patallel-to-serial output shift registers and shifted out at the TV line element rate.

In the built-in-test mode the controller serially loads the input shift registers through a data multiplexer. The data are written into memory, readout of memory into the output shift registers, and shifted out onto the controller data bus back to the controller for comparison.

TV ADDRESS GENERATOR

The TV address generator 60 consists, in the preferred embodiment, of a 10-bit X counter and a 10-bit Y counter. Its major function is to generate DSC memory read addresses. It also generates out-of-scan blanking to the TV mixer module 58. The output shift clock, that is, the element clock and the horizontal sync are used to clock the X and Y counters respectively. By presetting these two counters from the controller, the programmer may select any location in the DSC memory as the start point for the TV raster. This enables a "passing scene" or motion compensated presentation. Expanded readout of the memory can also be selected to provide a magnified image on the TV indicator. In the preferred embodiment the expansion can be either 2 to 1, 4 to 1, 8 to 1 or 16 to 1. To provide maximum flexibility allowing for different memory organizations, the X and Y counter address outputs are brought to the module connector pins. The module connector wiring routes them back onto the module as required, into data multiplexers and decoders controlled by the row address strobe and row/column select which come from the output clock generator. The output addresses are buffered through tri-state buffers enabled by the TV address enable signal so that the outputs can be tied to the write address lines at the memory. Tables I and II, FIGS. 34 and 35, indicate connection schemes.

Figure 35:
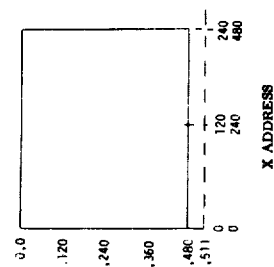

A key feature of the modular digital scan converter is the capability to add additional memory modules to accommodate various display resolutions. This is made possible by the fact that the interconnections of the basic X and Y address counters on both the write and read circuit modules are interconnected to the actual memory address lines by wiring on the card interconnect base plate. Therefore when additional memory is added, the circuit cards are not changed but the base plate wiring is changed. The attached tables, Table 1 and Table 2 of FIGS. 34 and 35, show the proper wiring connections between X and Y address counters and the memory address lines; Row Address (RA), Column Address (CA); Byte Enable and Chip Select (CS). The various display resolutions attainable with different amounts of memory are indicated across the top of each table.

The edge blanking consists of two comparators which compare the X count with the right and left scan edge received from the controlled.

OUTPUT CLOCK GENERATOR

The output clock generator 56 under program control, developes clock pulses, enable signals and read-/write sequence to perform the timing and synchronizing functions in the display refresh memory, integrator address generator, write address generator, symbol generator and the controlled. The major functions in this module are:

1. The controller interface logic receives and buffers the mode control words. The first input word includes 16-bits which is required to select system clocks, output shift clock, the ratio of read/write cycle and different modes. The second input word is a transfer pulse to issue the write/aging command to the system.

2. By the selection of the controller, the system clock logic and the output shift clock logic generate system clock signal ($f_s$) from 12.096 MHz to 18.144 MHz and output shift clock from 2.268 MHz to 18.144 MHz to accommodate TV rasters of 525 and 875 lines in the preferred embodiment. External system clock is designed for TV freeze mode.

3. The memory timing generator provides the basic memory cycle timing, row/column address strobes and enable signals for Mostek 4K RAM. The memory cycle may be either 882 nanoseconds, 992 nanoseconds or 1,323 nanoseconds for different modes in one embodiment. A 4-bit binary counter is used to divide the memory cycle into 16 phase clocks to develop different phases for different signals.

4. The memory read/write aging sequence generator includes a set of counters and registers and is so designed that the programmer may vary the read/write/-write-aging sequence for the requirement of different modes.

5. Interrupt logic is used to generate interrupt requests to the controlled and the erase command to the symbol generator.

TV VIDEO AND SYNC PROCESSOR

The basic function of this module 62 is to sync a voltage controlled oscillator (VCO) to the external TV signal for analog-to-digital conversion and to provide an automatic gain control to provide TV signal of the proper level.

Figure 12:
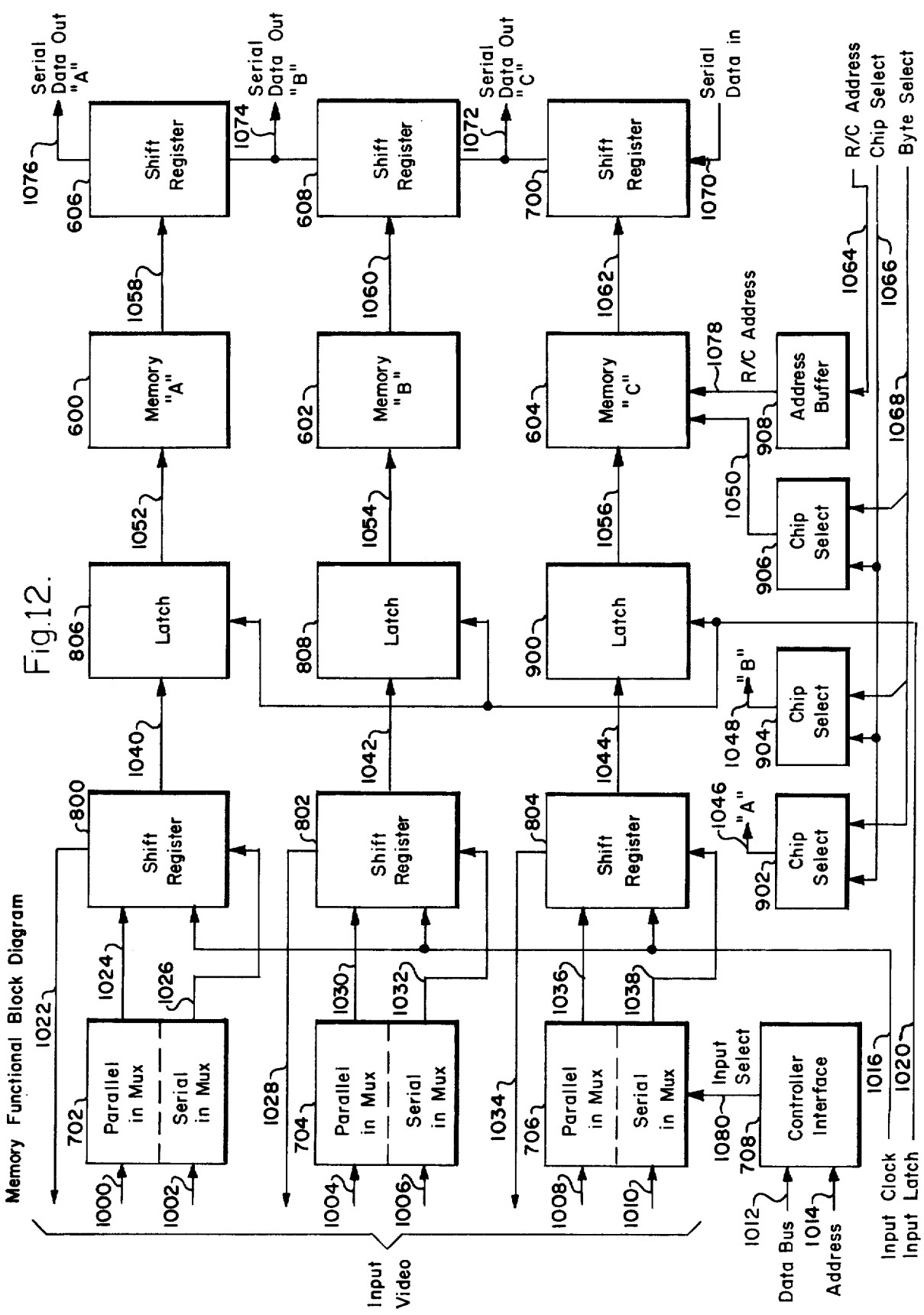
FIG. 12 is a functional block diagram of the memory module 52 of FIG. 3.

Referring now to FIG. 12, memory module 52 will be examined in greater detail. The main dynamic RAMs comprise Memory A, 600; Memory B, 602; and Memory C, 604; each including 8 integrated circuits manufactured by Fairchild as part number MK4096P. The address buffer 908 is an integrated circuit manufactured by Texas Instruments as part number SN54365J and it functions primarily to provide a high drive capability for the rest of the memory to drive, that is, all 24 MK4096P integrated circuits. The chip select functions, 902, 904 and 906 are each manufactured by Signetic as part number S82S123F. In operation, data are input to three multiplexers 702, 704 and 706 having input video data furnished to parallel input channels by means of leads 1000, 1004 and 1008 respectively and input video data furnished to serial input channels by means of leads 1002, 1006 and 1010 respectively. Data from input multiplexer 702 are furnished to shift register 800 over leads 1024 and 1026; data from input multiplexer 704 are furnished to shift register 802 over leads 1030 and 1032; and data from input multiplexer 706 are furnished to shift register 804 over leads 1036 and 1038. Data are then shifted in parallel to three latches 806, 808 and 900 by means of leads 1040, 1042 and 1044 respectively. Input latch signals are received by the three latches 806, 808 and 900 on lead 1020. The latch data are furnished directly to memory; 806 latch data to Memory A, 600 by means of lead 1052; 808 latch data to Memory B, 602, by means of lead 1054 and 900 latch data to Memory C, 604, by means of lead 1056. Input multiplexers 702, 704 and 706 are each an integrated circuit manufactured by Texas Instruments as part number SN54S153J. Shift registers 800, 802 and 804 each comprise two integrated circuits manufactured by Texas Instruments as part number SN54S195J. The three latches 806, 808 and 900 comprise four integrated circuits manufactured by Texas Instruments as part number SN54S174J. Shift registers 800, 802 and 804 receive input clock signal over a lead 1016 and may output their contents by means of leads 1022, 1028 and 1034 respectively. The controller interface 708, comprising an integrated circuit manufactured by Signetics as part number S8273F, receives signal input from the data bus by means of lead 1012 and address information by means of lead 1014. Controller interface 708 provides input select signal to the multiplexers 702, 704 and 706 by means of lead 1080. Chip select functions 902, 904 and 906 perform selection of Memory A, 600; B, 602; or C, 604, by means of signals appearing on leads 1046, 1048 or 1050 respectively. Shift registers 606, 608 and 700, each an integrated circuit manufactured by Texas Instruments as part number SN54166J, receive signal input respectively from Memory A, 600; Memory B, 602; and Memory C, 604 by means of respective leads 1058, 1060 and 1062. Input serial data are received by shift register 700 on a lead 1070. Serial data are output respectively from shift register 606, 608 and 700 by means of respective leads 1076, 1074 and 1072. Address buffers 908 receive row/-column address information on lead 1064. Chip select functions 902, 904 and 906 receive chip select information and byte select information by means of leads 1066 and 1068 respectively.

Figure 13:
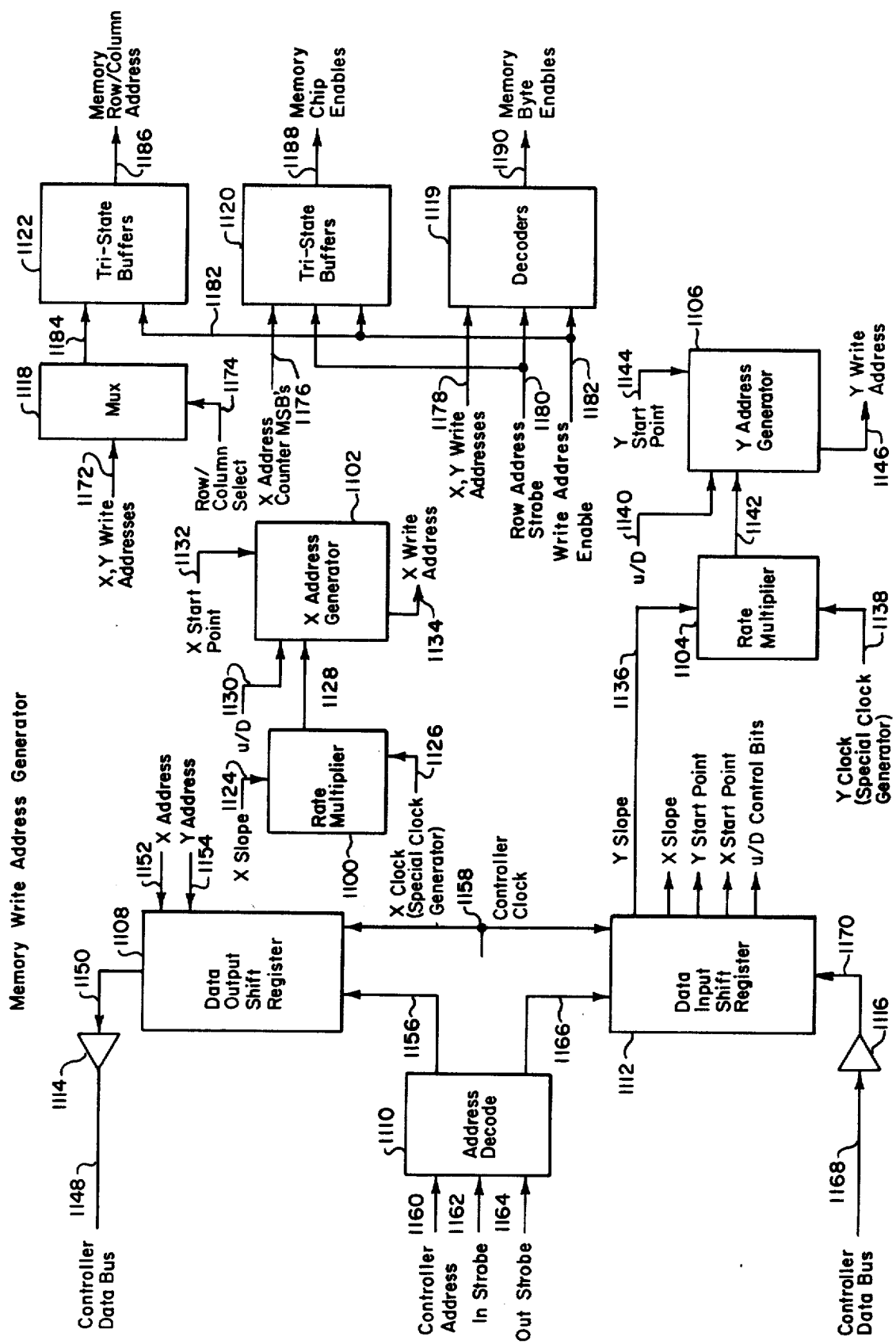
FIG. 13 is a functional block diagram of the memory write address generator 54 of FIG. 3.

Referring now to FIG. 13, the memory write address module 54 of FIG. 3 will be examined in greater detail. Rate multiplier 1100, comprising two integrated circuits manufactured by Texas Instruments as part number SN5497J, receives X slope input signal by means of lead 1124 and an X clock signal from the special clock generator by means of lead 1126. Signal output from the rate multiplier 1100 is furnished as input signal by means of lead 1128 to X address generator 1102 which comprises three integrated circuits manufactured by Texas Instruments as part number SN54193J. An X start point signal is received by X address generator 1102 on a lead 1132 and an up/down counter signal on a lead 1130. X write address information is output from X address generator 1102 on a lead 1134. Similarly, rate multiplier 1104, comprising two integrated circuits manufactured by Texas Instruments as part number SN5497J, receives Y slope input by means of lead 1136 and a Y clock signal from the special clock generator by means of lead 1138. Signal output from the rate multiplier 1104 is furnished as input signal by means of lead 1142 to Y address generator 1106 which comprises three integrated circuits manufactured by Texas Instruments as part number SN54193J. A Y start point signal is received by Y address generator 1106 on a lead 1144 and an up/down counter signal on a lead 1140. Y write address information is output from Y address generator 1106 on a lead 1146. X and Y write address signals are furnished on lead 1172 to multiplexer 1118 comprising two integrated circuits manufactured by Texas Instruments as part number SN54LS157J. Multiplexer 1118 also receives a row/column select signal from the output clock generator by means of lead 1174. X and Y write addresses are input to decoder 1119 comprising two integrated circuits manufactured by Texas Instruments as part number SN54S138J by means of lead 1178. A row address strobe signal developed in the output clock generator is applied by means of lead 1180 to decoder 1119 and to tri-state buffer 1120 which is an integrated circuit manufactured by Texas Instruments as part number SN54365J. A write address enable signal, also developed in the output clock generator is applied by means of a lead 1182 to decoder 1119, tri-state buffer 1120 and tri-state buffer 1122 which is also an integrated circuit manufactured by Texas Instruments as part number SN54365J, and which also receives signal input from multiplexer 1118 by means of lead 1184. Decoder 1119 furnishes memory byte enable signals on lead 1190; tri-state buffer 1120 furnishes memory chip enable signals on lead 1188; and tri-state buffer 1122 furnishes memory row/column address signals on lead 1186.

Address decoder 1110, comprising an integrated circuit, part number SN54155J and an integrated circuit, part number SN54LS20J, receives address information signal on a lead 1160, an input strobe signal on a lead 1162 and an output strobe signal on a lead 1164. Output signal from address decoder 1110 is furnished to data input shift register 1112 comprising six integrated circuits manufactured by Signetics as part number S8273F by means of lead 1166; and to data output shift register 1108 comprising four integrated circuits manufactured by Texas Instruments as part number SN54165J by means of lead 1156. Controller clock signals are furnished to both shift registers, 1108 and 1112, on a lead 1158. The controller data bus communicates with data input shift register 1112 by means of lead 1170 which contains the controller data bus signal on a lead 1168 amplified by amplifier 1116. The data input shift register 1112 furnish as signal output, Y slope, X slope, Y start point, X start point and up/down counter control bits, signals already discussed supra. The data output shift register 1108 receives X address and Y address signals on leads 1152 and 1154 respectively. The data output shift register 1108 communicates with the controller data bus by means of a lead 1148 via lead 1150 and amplifier 1114.

Figure 14:
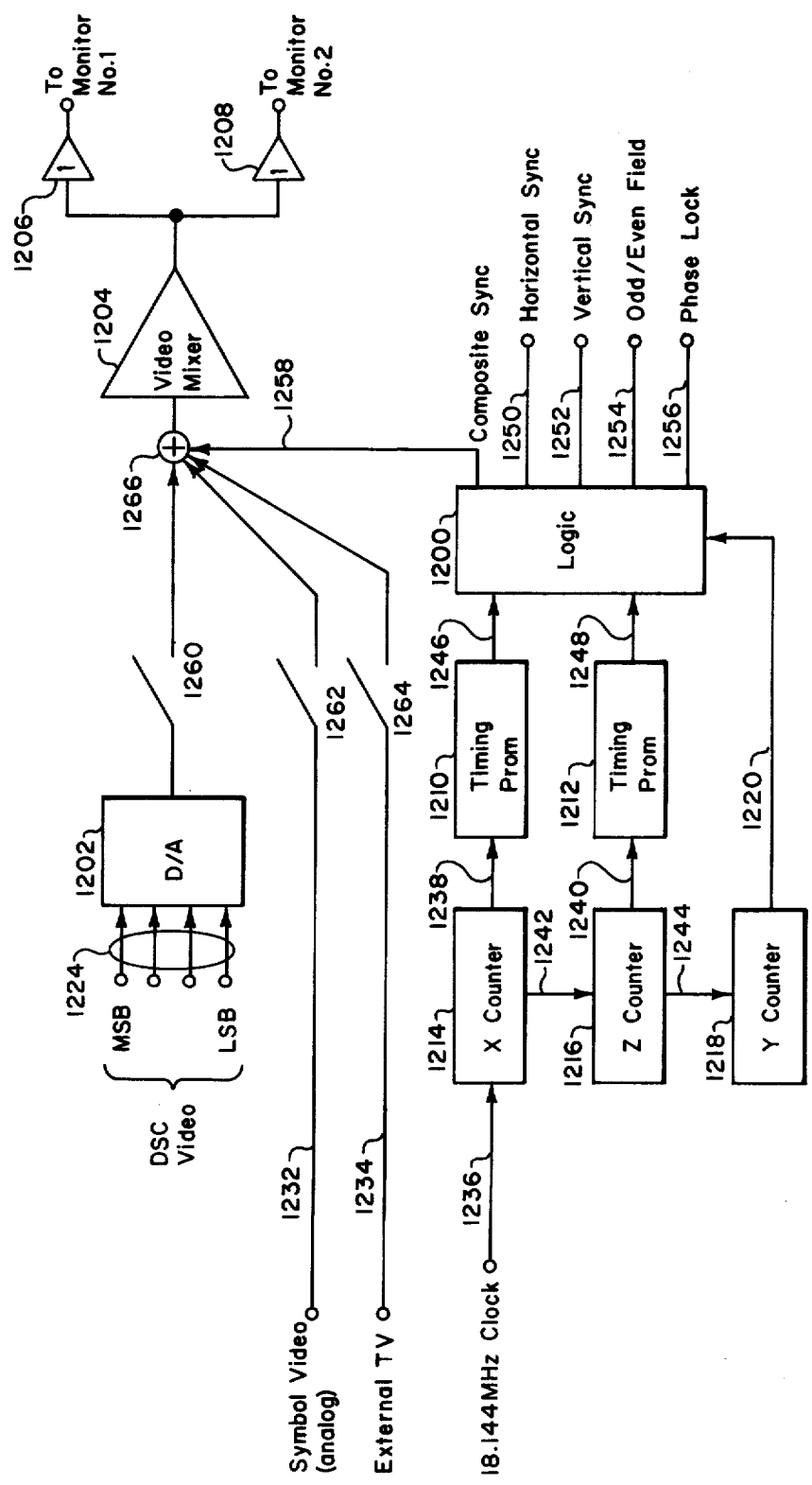
FIG. 14 is a functional block diagram of the composite sync generator and video mixer 58 of FIG. 3.

Referring now to FIG. 14, the composite sync generator and video mixer 58 of FIG. 3 will be examined in greater detail. A symbol video analog signal is supplied by means of lead 1232 through logic switch 1262 and adding resistive network 1266 to video mixer 1204. Video mixer 1204, comprising two integrated circuits manufactured by National Semiconductor as part number LH0024R, also receives external TV signal input by means of logic switch 1264 on a lead 1234. An X counter 1214 comprising an integrated circuit manufactured by Texas Instruments as part number SN54S157J and three integrated circuits manufactured by Fairchild as 9316DM receives an 18 MHz clock signal from a crystal oscillator manufactured by Q-TEK Corporation as part number QT4T by means of a lead 1236. X counter 1214 provides signal output to timing from 1210 on integrated circuit manufactured by Signetics as part number S8223F by means of a lead 1238 and also to Z counter 1216 which comprises three integrated circuits manufactured by Fairchild as part number 9316DM by means of lead 1242. Z counter 1216 in turn furnishes signal input to timing PROM 1212, an integrated circuit manufactured by Signetics as part number S8223F by means of lead 1240 and also to Y counter 1218 comprising three integrated circuits manufactured by Texas Instruments as part number SN54193J by means of lead 1244. Logic circuit 1200, more fully described hereinafter at FIG. 15 receives signal inputs from timing PROM 1210, timing PROM 1212 and Y counter 1218 by means of leads 1246, 1248 and 1220 respectively. Output signal from logic circuit 1200 is supplied to video mixer 1204 by means of lead 1258 carrying a composite sync signal. A horizontal sync signal, a vertical sync signal, an odd-/even field signal and a phase lock signal are supplied by means of leads 1250, 1252, 1254 and 1256 respectively. Composite lead 1224 supplies digital video signal to digital-to-analog converter 1202 comprising an integrated circuit manufactured by Texas Instruments as part number SN54S174J and an integrated circuit also manufactured by Texas Instruments as part number SN5406J. Digital-to-analog converter 1202 supplies signal input to combining network 1266 by means of logic switch 1260 and thence to video mixer 1204. The output signal from video mixer 1204 is supplied to monitors for example, number 1 and number 2 by means of isolation amplifiers 1206 and 1208.

Figure 15:
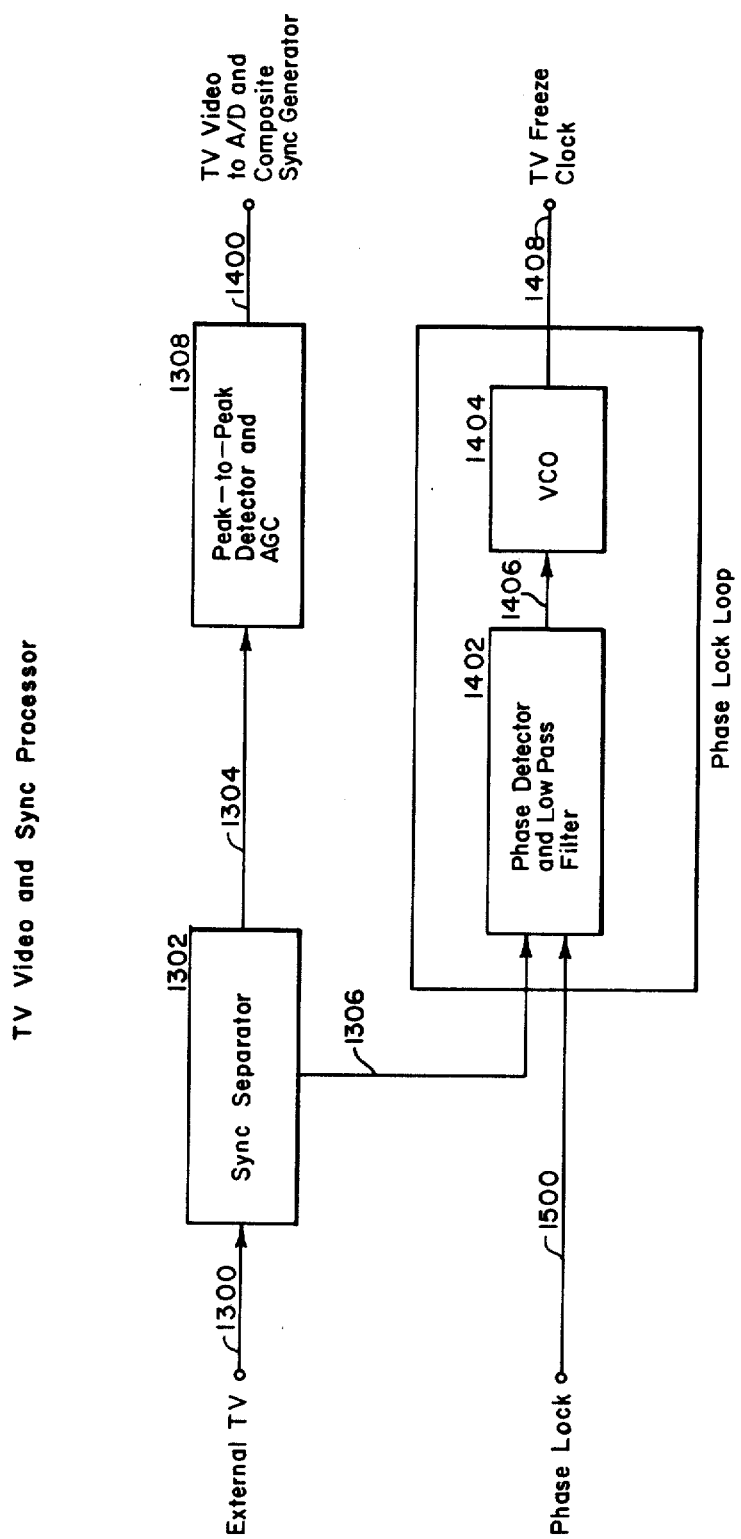
FIG. 15 is a functional block diagram of the TV video and sync processor 62 of FIG. 3.

Referring now to FIG. 15, the TV video and sync processor, 62 of FIG. 3, will now be examined in greater detail. Sync separator 1302 comprising two integrated circuits manufactured by Texas Instruments as respective part numbers SN5400J and SN54109J, an integrated circuit manufactured by National Semiconductor as part number LM119D and an integrated circuit manufactured by Fairchild as part number 9316DM, may receive an external television signal by way of lead 1300. Sync separator 1302 provides its output signal by means of lead 1304 to peak-to-peak detector and automatic gain control circuit 1308 comprising four integrated circuits manufactured by National Semiconductor as part number LH0002H, one integrated circuit manufactured by National Semiconductor as part number LH0032G and two additional integrated circuits also manufactured by National Semiconductor as part number DM7800; and also by means of lead 1306 to phase detector and low pass filter 1402. Phase detector and low pass filter 1402 furnishes its signal output to voltage controlled oscillator 1404 by means of lead 1406. Voltage control oscillator 1404 furnishes a TV freeze signal by means of lead 1408 to the composite TV and sync generator module which, in turn, furnishes a phase lock signal of 15,750 Hz by means of lead 1500 to phase detector and low pass filter 1402. Phase detector and low pass filter 1402 and voltage controlled oscillator 1404 thus make up a phase lock loop in conjunction with composite TV sync generator module.

The synchronization function is performed by extracting the horizontal sync pulses from the external signal and using it as the reference signal for a phase detector. The output of the VCO is sent to the composite sync generator where a 15,750 Hz phase lock system is generated and compared to the external TV sync. When the system is locked, these two signals will be in phase. The AGC circuit detects the maximum video and minimum video occurring in a TV field and adjusts its gains so that the detected signal range is amplified to approximately 80 percent of the maximum gain with a time constant of 16 milliseconds in the preferred embodiment.

Figure 16:
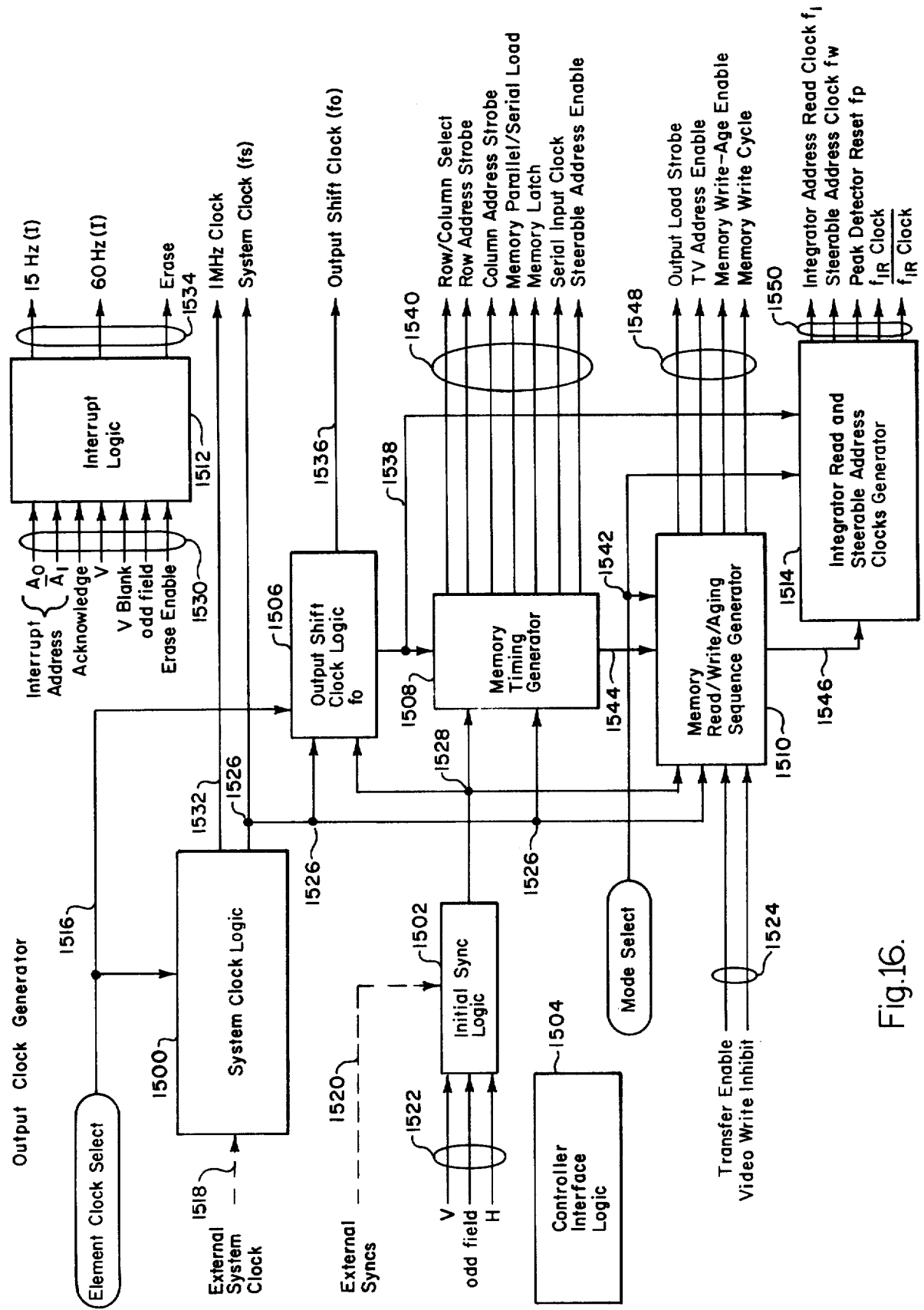
FIG. 16 is a functional block diagram of the output clock generator 56 of FIG. 3.

Referrring now to FIG. 16, the Output Clock Generator 56 of FIG. 3, will be examined in greater detail. Interrupt logic circuits 1512, comprising seven integrated circuits all manufactured by Texas Instruments, two as part number SN5404J; one SN 5402J; one SN54109J; one SN5474J; one SN5410J; and one SN54S00J, received interrupt address true and false signals, vertical sync, vertical blanking, odd field and erase enable signals by means of composite lead 1530 and outputs on composite lead 1534, 60 Hz and 15 Hz interrupt signals and an interrupt erase signal. System clock logic function 1500 receives an external system clock signal by means of lead 1518 and a programmable element clock select signal by means of a lead 1516. System clock logic function 1500 comprises two integrated circuits, part number MC10125L manufactured by Motorola and SN54S74J manufactured by Texas Instruments. System clock logic function 1500 outputs a 1MHz clock signal on a lead 1532 and a system clock signal on a lead 1526. This system clock signal is also input to output shift clock logic 1506, memory timing generator 1508 and Memory Read/Write Aging sequence generator 1510. Output shift clock logic 1506, comprising two integrated circuits manufactured by Texas Instruments as part numbers SN54163J and SN54S151J, also receives an element clock select signal under program control by means of a lead 1516, and a signal from initial sync logic circuit 1502 comprising an integrated circuit manufactured by Texas Instruments as part number SN5474J by means of a lead 1528. Initial sync logic circuit 1502, receiving as input signals, external sync signals by means of a lead 1520 and internal sync and odd-field signals by means of composite lead 1522, also outputs a signal to memory timing generator 1508 and memory read/write/aging sequence generator 1510 by means of lead 1528. Memory timing generator 1508 comprising eight integrated circuits all manufactured by Texas Instruments, two as part number SN54S138J; two as part number SN54S74J; and one each as part numbers SN54S00J; SN54S112J; SN54S04J; and SN5432J, also receives signal input from output shift clock logic circuit 1506 by means of a lead 1528 which also supplies an input signal to integrator read and steerable address clock generator 1514. Memory read/write/aging sequence generator 1510, comprising twelve integrated circuits all manufactured by Texas Instruments, three as part number SN5404J; two as part number SN54163J and one each as part numbers, SN54S00J, SN5402J, SN5420J, SN5474J, SN54S74, SN54S37 and SN54S04, also receives signal input from memory timing generator 1508 by means of a lead 1544, a programmable mode select signal by means of a lead 1542 which also supplies input signal to integrator read and steerable address clocks generator 1514, and transfer enable and video write inhibit signals by means of a composite lead 1524. Integrator read and steerable address clocks generator 1514, comprising seventeen integrated circuits all manufactured by Texas Instruments, three as part number SN54S00J, two as SN54S04J, two as SN5402J, two as SN5432J, two as SN547J, and one each as part numbers SN54163J, SN54S151J, SN54S37J, SN54109J, SN54S153J and SN5420J, receives additional signal input from memory read/write/aging sequence generator 1510 by means of lead 1546.

Output shift clock logic function 1506 outputs the output shift clock signal to the system by means of lead 1536. Memory timing generator 1508 output signal identified as row/column select, row address strobe, column address strobe, memory parallel/serial load, memory latch, serial input clock and steerable address enable by means of composite lead 1540. Memory read/write/aging sequence generator 1510 outputs signal identified as output load strobe, TB address enable, memory write-age enable and memory write cycle by means of composite lead 1548. Integrator read and steerable address clocks generator 1514 outputs signal identified as integrator read address clock, steerable address clock, peak detector reset, free running clock true and free running clock false by means of composite lead 1550.

Figure 17:
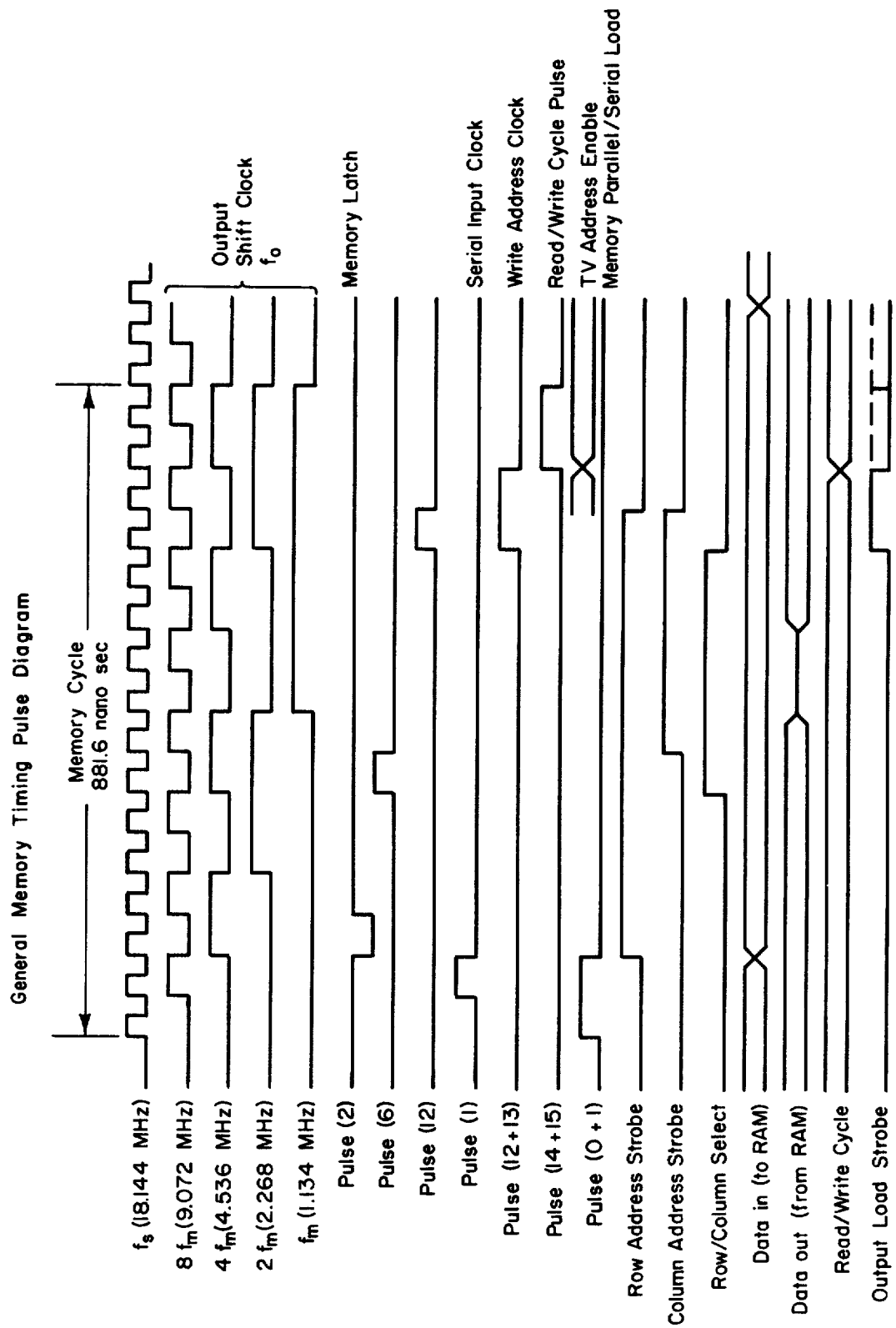
FIG. 17 is a timing pulse diagram helpful in understanding the operation of the system.

Referring now to FIG. 17, timing waveforms of the signal outputs from the output clock generator are presented. The system memory cycle is an interval $881.6 \times 10^{-9}$ sec. (881.6 nanoseconds) long. This time interval is divided into 16 parts to form the system clock signal $f$, of frequency 18.144 MHz, of period $T_s = 55 \cdot 10^{-9}$ seconds. The frequency $f_s$ is in turn divided by 16 to obtain $f_s/16 = f_m = 1.134 = 10^6 \text{ sec}^{-1}$, that is 1.134 MHz having period $T_{fm} = 881.6 \times 10^{-9}$ seconds, forming the fundamental frequency for the output shift clock signals $f_o$ are:

$f_m = 1.134$ MHz; $T_{fm} = 881.6$ nanosec.
$2f_m = 2.268$ MHz; $T_{2fm} = 440.8$ nanosec.
$4f_m = 4.536$ MHz; $T_{4fm} = 220.4$ nanosec.
$8f_m = 9.072$ MHz $T_{8fm} = 110.2$ nanosec.

Signals comprising output from the memory timing generator 1508 are likewise derived from the 16 basic divisions of the memory cycle of 881.6 nanoseconds. The row/column select pulse begins with the sixth basic 55 nanosecond pulse and ends with the twelfth basic 55 nanosecond pulse as shown. The row address strobe and the column address strobe begin at basic pulse 2 and 7 respectively and both end at basic 55 nanosecond pulse 13. A memory parallel/serial load pulse (0+1) begins at basic pulse 0 and ends at basic pulse 2. A negative going memory latch pulse (2), begins at basic pulse 2 and ends at basic pulse 3. The serial input clock pulse $f_d$ begins at basic pulse 1 and ends at basic pulse 2. Signals comprising output from memory Read/Write/Aging sequence generator 1510 are also derived from the 16 basic divisions of the memory cycle. The output load strobe signal pulse begins at basic pulse 12 and ends at basic pulse 14. Additional required timing pulses and intervals are furnished to the system such as pulse (6) starting at basic pulse 6 and ending at basic pulse 7; pulse (12) starting at basic pulse 12 and ending at basic pulse 13; pulse (12 + 13), the write address clock pulse $f_w$ effective at various times for different modes as hereinafter more fully explained, starting at basic pulse 12 and ending at basic pulse 14; the read/write cycle pulse comprising basic pulses 14 and 15 in each memory cycle and the intervals identified as TV Address Enable; Data in (to RAM); Data out (from RAM) and Read/Write cycle interval; all effective according to system mode.

Figure 18:
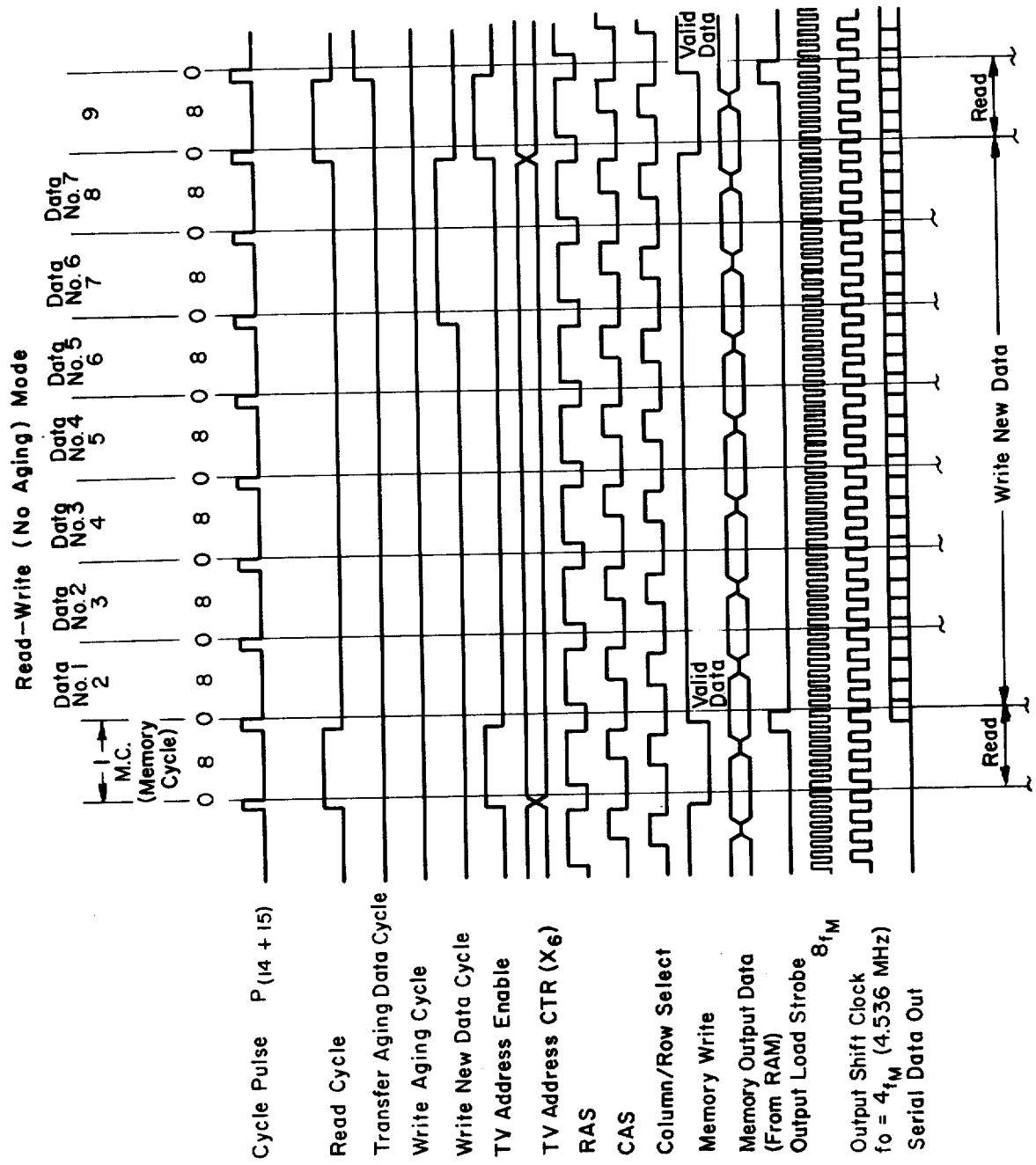
FIGS. 18, 18a, 19, 19a, 20, 20a are timing pulse diagrams helpful in understanding system modes.
Figure 18A:
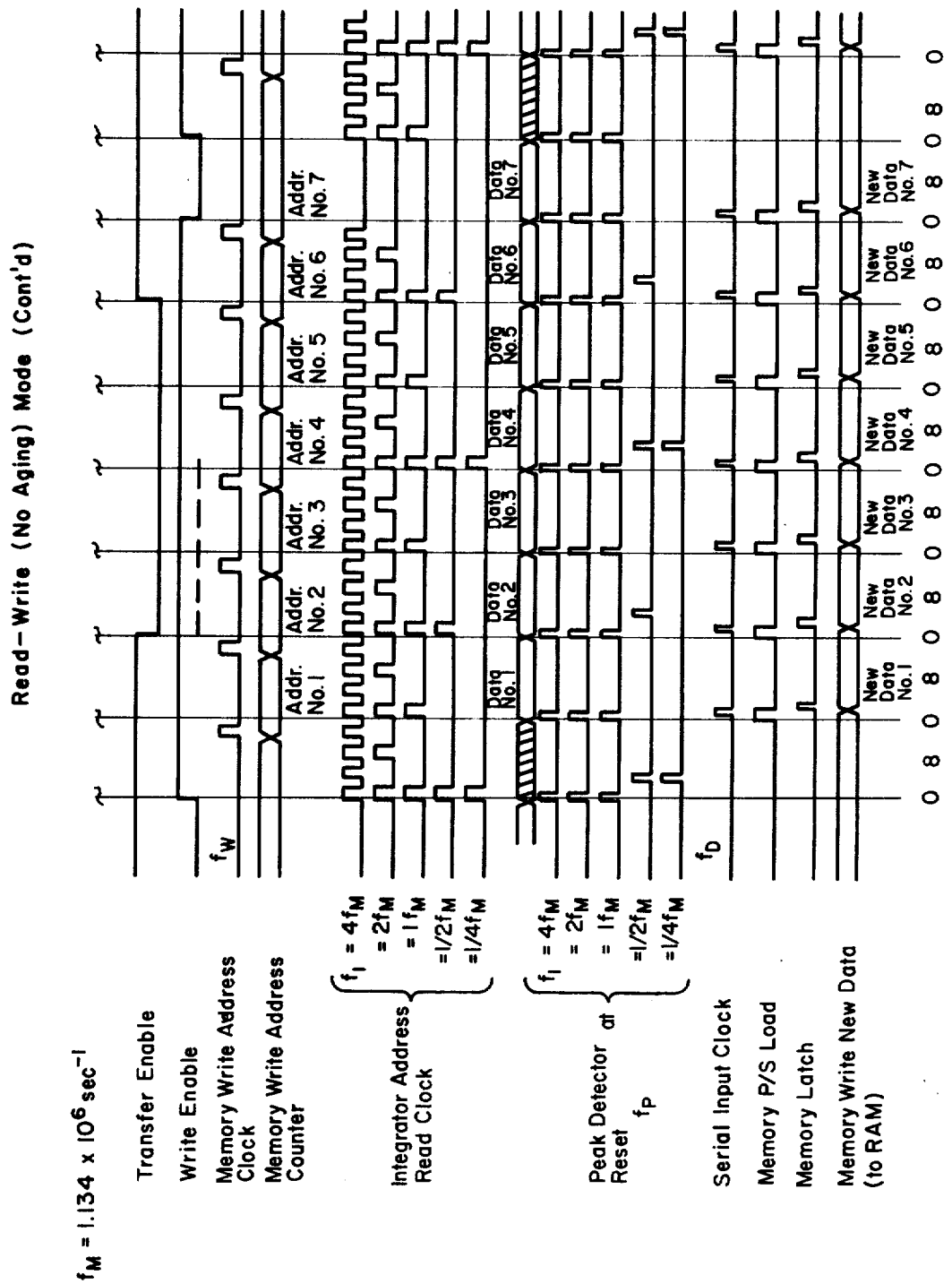

Referring now to FIG. 18, the interdependence of the timing relationships in the system may be more clearly understood. Nine complete memory cycles, necessary to illustrate the Read/Write (No Aging) mode, are shown. The memory cycle numbered 1 is a Read cycle while the cycles numbered 2 through 8 are a Write New Data interval, following which is another Read cycle numbered 9. The cycle pulse (14 + 15) of FIG. 18 is shown for each memory cycle. The Read cycle pulse is high for the interval beginning in the prior memory cycle at basic pulse 14 and goes low at basic pulse 14 of the Read cycle at memory cycle 1, remaining low until basic pulse 14 of memory cycle 8, there beginning another Read cycle. In this mode, the Transfer Aging Data cycle signal remains low until the fourteenth basic pulse of memory cycle 9, an event more fully explained in reference to FIG. 20. The Write Aging cycle signal remains low in this mode. Write New Data cycle remains low until basic pulse 14 in memory cycle 6 at which time it goes high and remains high until basic pulse 14 of memory cycle 8. The TV Address Enable signal goes high at basic pulse 14 of the memory cycle prior to memory cycle 1 and remains high until basic pulse 14 of memory cycle 1 thus furnishing a TV Address Enable signal; a Write Address Enable signal results when this signal goes low at basic pulse 14 of memory cycle 1 and remains low until basic pulse 14 of memory cycle 8 whence the signal again assumes the high state thus furnishing again a TV Address Enable signal. The TV Address Counter interval is seen to be effective during the time span including basic pulse 14 of the memory cycle prior to memory cycle 1 and extending to basic pulse 14 of memory cycle 8. The Row Address Stroke (RAS), Column Address Stroke (CAS) and Column/Row Select (C/RS) signals, already discussed in consideration of FIG. 18, are illustrated to further illustrate overall relationships between the timing signals and intervals. The Memory Write Signal, low from basic pulse 14 of the memory cycle prior to memory cycle 1 to basic pulse 14 of memory cycle 1, furnishes a Memory Read Condition when low and a Memory Write Condition from basic pulse 14 of memory cycle 1 to basic pulse 14 of memory cycle 8 when it is in the high condition. It should be noted that the Memory Write timing signal is the inverse of the Read cycle signal. Also illustrated are the intervals wherein Memory Output Data from the random access memory (RAM) are valid. As indicated, during any memory cycle, these data are valid over the interval extending from basis pulse 10 of the prior memory cycle to basic pulse 8 of the instant memory cycle. Data occurring other than during these intervals are invalid. The Output Stroke pulse, mentioned already in connection with examination of FIG. 18, is shown as occurring during basic pulses 12 to 14 of each Read cycle. Output Shift Clock timing pulses have been discussed in connection with FIG. 17 and are included in FIG. 18 to maintain perspective and also to illustrate the relationship existing with the Serial Data Out, shown over the interval from basic pulse 14 of memory cycle 1 to basic pulse 14 of memory cycle 9 and then repeating. A Transfer Enable signal is shown as being high during memory cycles 1 and 2 then low for memory cycles 3 through 6 and then high. The Write Enable Signal is shown high over memory cycles 1 through 7 then going low for memory cycle 8 and again high for memory cycle 9. The Memory Write Address clock signal $f_W$ is shown to maintain perspective and to show the intervals over which the Memory Write Address Counter is activated, for example, address #1 occurs over the interval extending from basic pulse 12 of memory cycle 1 through basic pulse 12 of memory cycle 2 and so on. The Intergrator Address Read Clock signals comprise multiples and submultiples of the Output Shift Clock signal $f_m = 1.134$ MHz as shown, as is also applicable for the Peak Detector Reset signals. The Serial Input Clock signal $f_D$; Memory Parallel/Serial Load; memory latch signals and the Memory Write New Data to RAM have been discussed and are included in FIG. 18 for purposes of clarity.

Figure 19:
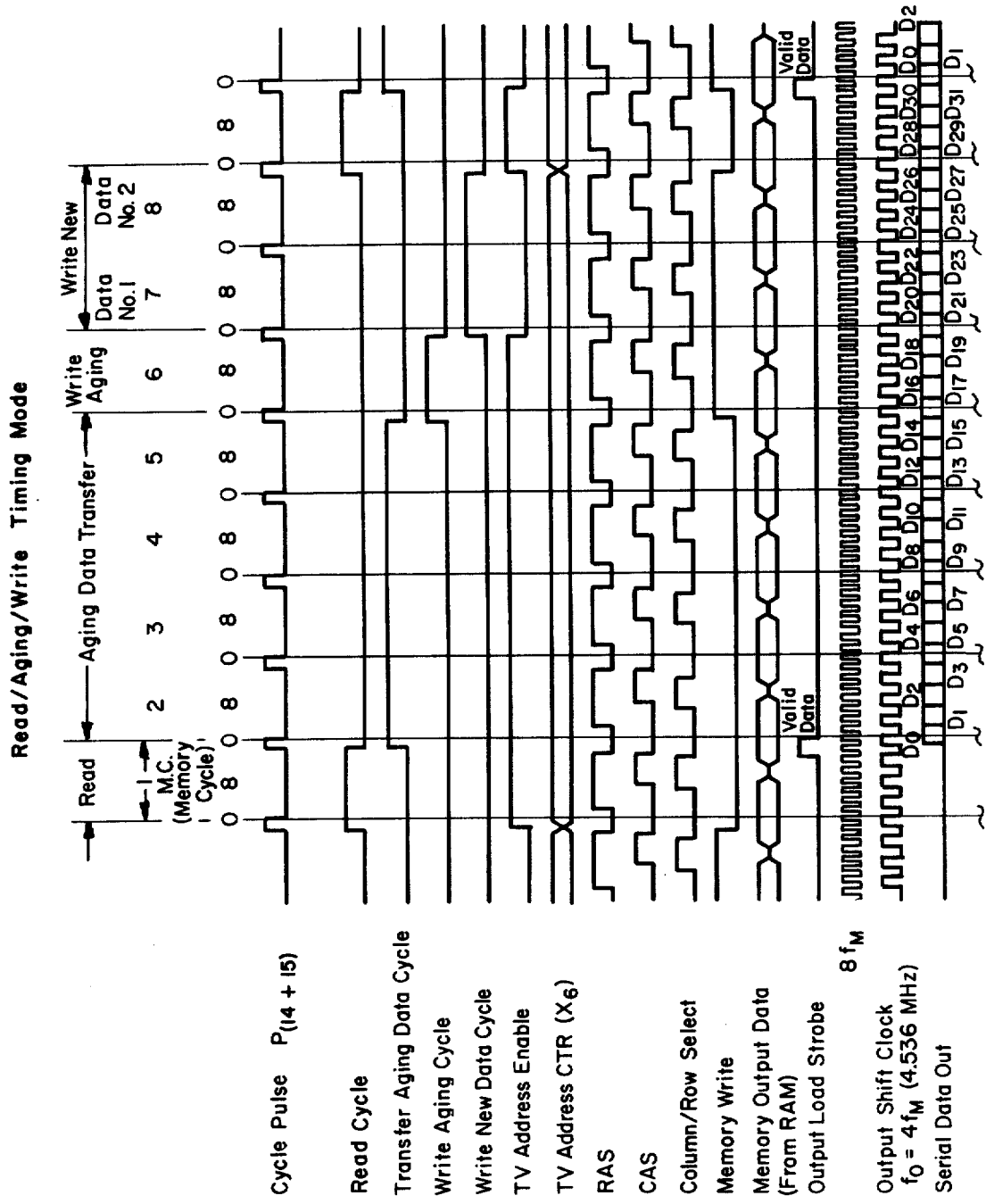
Figure 19A:
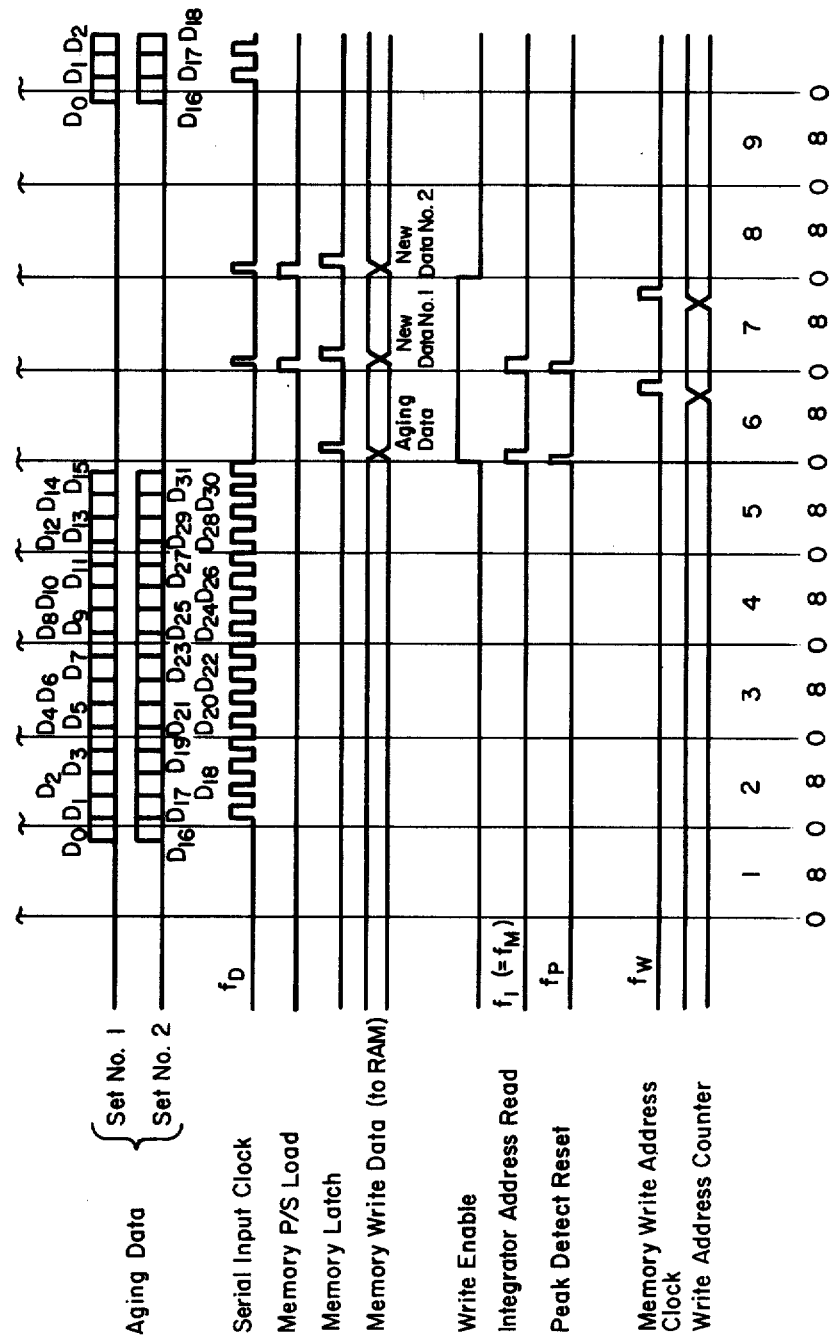

Referring now to FIG. 19, the timing relationships in the Read/Aging/Write Timing mode may be explored. The instant mode includes a Read cycle in the interval of the first memory cycle; an Aging Data Transfer cycle during the interval of the succeeding four memory cycles; a Write Aging cycle during the sixth memory cycle and a Write New Data #1 and Data #2 cycle during the seventh and eighth memory cycles. In the mode under discussion the following listed timing pulses, sequences and intervals have not changed and hence will not be further discussed;

Cycle Pulse (14 + 15)
Read Cycle
Write New Data Cycle
TV Address Counter
RAS
CAS C/R Select
Memory Output Data (from RAM)
Output Load Strobe
$8f_M$
Output Shift Clock $f_o$
Serial Data Out.

The following timing pulses, sequences and intervals represent changes with respect to the Read/Write (No Aging) mode or new signals altogether.

The transfer aging data cycle which remained in the low state for the previous mode, goes high at basic pulse 14 of memory cycle 1 and remains high until base pulse 14 of memory cycle 5 remaining low throughout memory cycle 8. The write aging cycle which also remained low in the previous mode, goes high at basic pulse 14 of memory cycle 5 remaining thus until basic pulse 14 of memory cycle 6 and remaining low throughout memory cycle 8. The TV address enable signal goes high at basic pulse 14 of the memory cycle prior to memory cycle 1 and remains high until basic pulse 14 of memory cycle 6 when it goes low and remains thus until basic pulse 14 of memory cycle 8 when it again goes high. The high state represent the TV address enable state while the low state represents the write address enable state. The memory write signal goes low at basic pulse 14 of the memory cycle prior to memory cycle 1 and remains thus, indicating a read interval, until basic pulse 14 of memory cycle 5 when it goes high to define a write interval until basic pulse 14 of memory cycle 8. Aging data set #1 comprising D0 through D15, and aging data set #2 comprising D16 through D31 occur during the interval from basic pulse 14 of memory cycle 1 to basic pulse 14 of memory cycle 5. Serial input clock signal $f_D$ comprises four pulses each in memory cycles 2, 3, 4 and 4 as indicated and a pulse as indicated in each of memory cycles 7 and 9. Memory parallel/serial load signal remains low indicating a serial interval over memory cycles 1 through 6 going high for two basic pulses each in memory cycles 7 and 8 as shown indicating a parallel interval during the high condition of the signal. The memory latch signal goes high beginning at basic pulse 2 and ending at basic pulse 3 in each of memory cycles 6, 7 and 8. The memory write data (to RAM) changes from the previous mode so as to write aging data from basic pulse 2 of memory cycle 6 to basic pulse 2 of memory cycle 7 and then to write new data #1 and new data #2 as indicated. The write enable signal remains low until memory cycle 6 when it goes high and remains thus throughout memory cycle 7 after which it returns to the low state. The integrator address read clock signal $f_I$ remains low until memory cycle 6 where it goes high until basic pulse 2 when it goes low again until memory cycle 7, again going high until basic pulse 2 after which it remains low throughout memory cycle 8. The peak detector reset signal $f_p$ goes high at the same instants indicated for the integrator address read clock $f_I$ but only remains high for half as long as indicated. The memory write address clock is high only for the intervals beginning at basic pulse 12 and ending at basic pulse 14 of both memory cycles 6 and 7. During this mode the write address counter intervals are as indicated.

Figure 20:
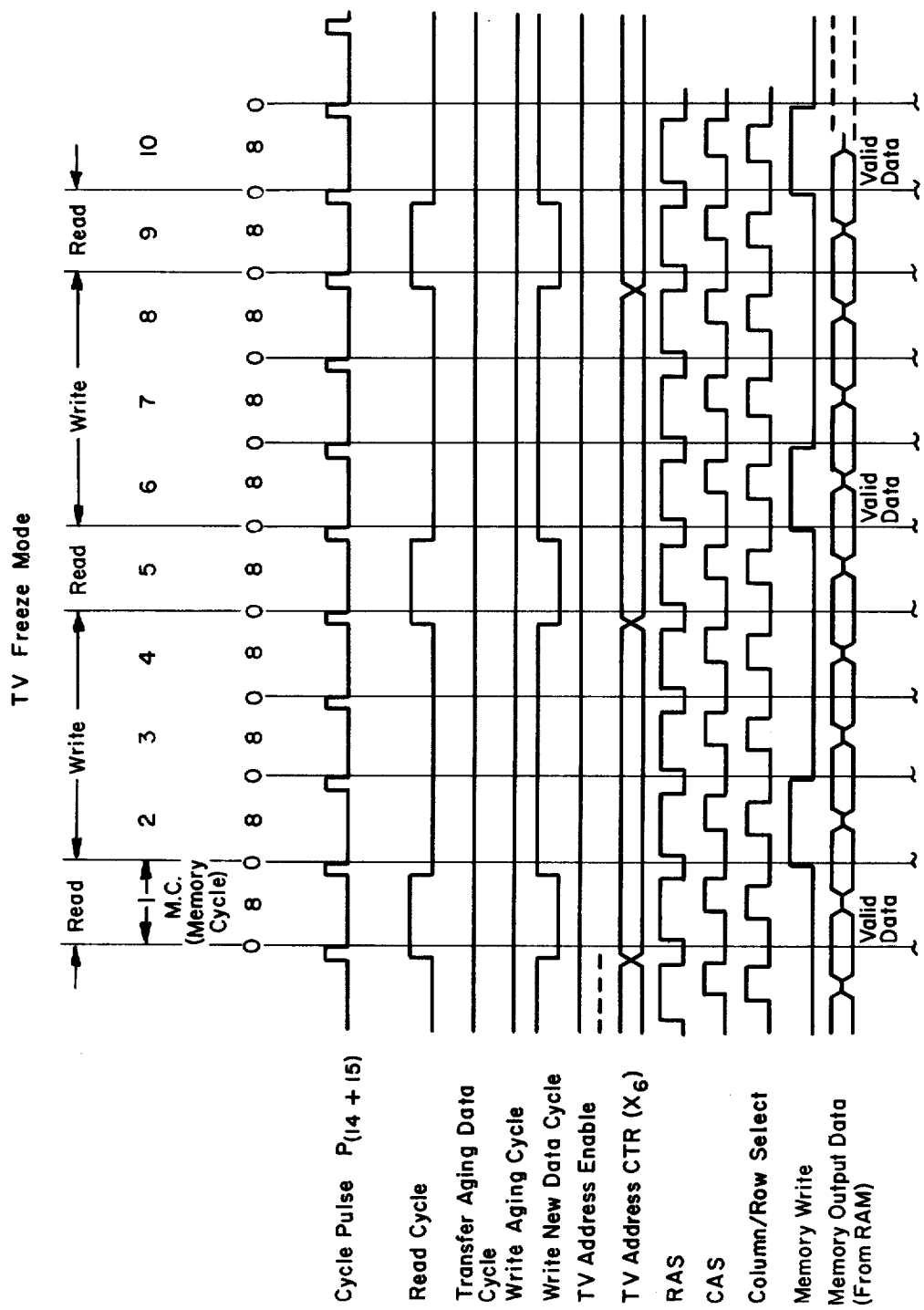
Figure 20A:
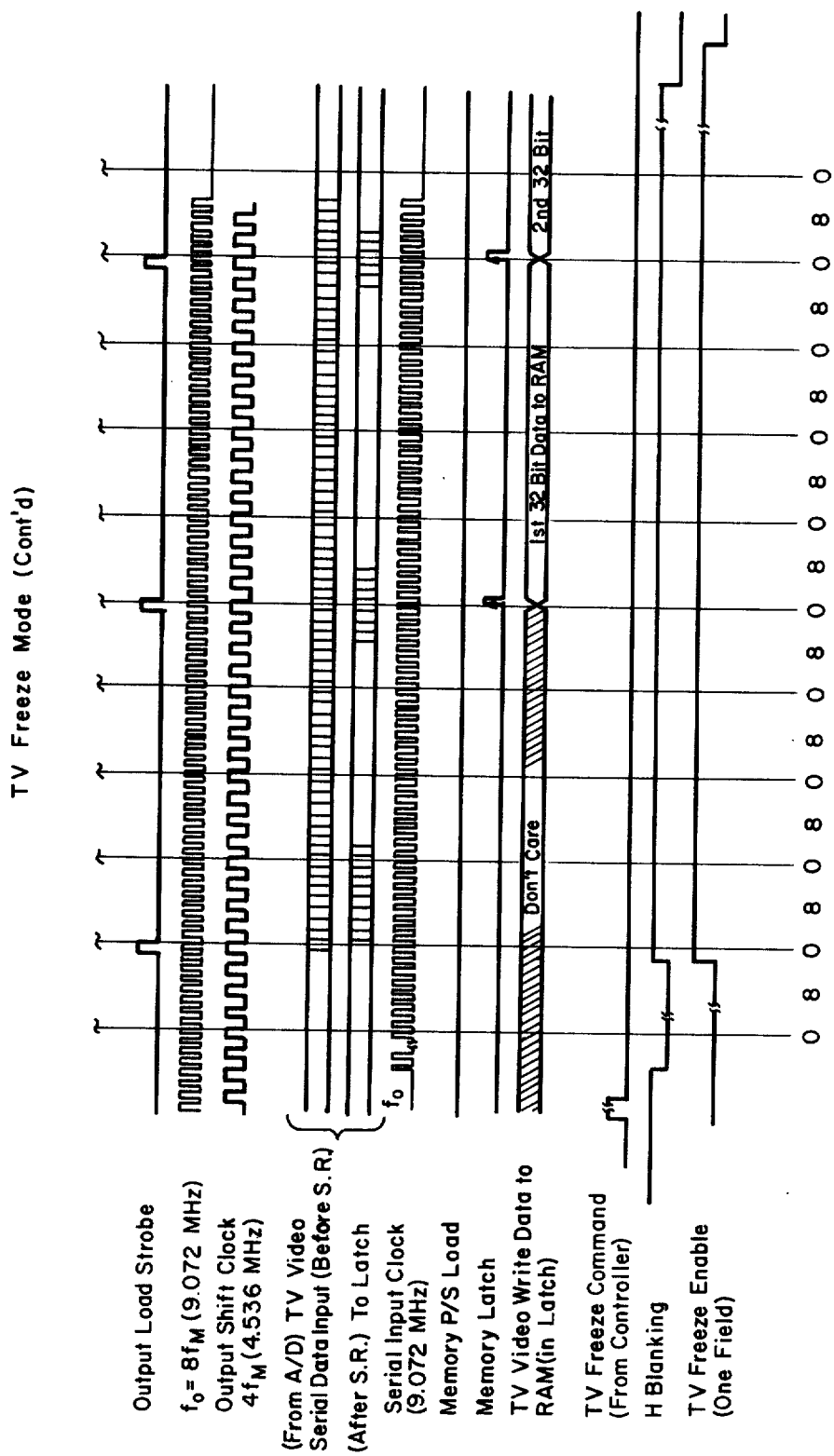

Referring now to FIG. 20, the timing sequence of the TV freeze mode is illustrated. The mode includes alternate read and write cycles with the read cycles occupying one memory cycle and the write cycles occupying an interval of three memory cycles. The cycle pulse (14 + 15) is again shown for each memory cycle. The read cycle signal defining each read cycle is high for the interval beginning in the memory cycle prior to memory cycle 1 at basic pulse 14 and ending at basic pulse 14 of memory cycle 1 when the read cycle signal goes low until basic pulse 14 of memory cycle 4 there going high to define the second read memory cycle and remaining in the high state until basic pulse 14 of memory cycle 5 then going low remaining in the low state until basic pulse 14 of memory cycle 8 where the signal again goes high until basic pulse 14 of memory cycle 9 where the signal again goes low. The transfer aging data cycle and the write aging cycle signals both remain low throughout this mode. The write new data cycle signal goes low at basic pulse 14 of the memory cycle prior to memory cycle 1 and remains low until basic pulse 14 of memory cycle 1 at which time the signal goes high. It may be observed that this signal is the inverse of the read cycle signal. The TV address enable signal remains high for this mode. The TV address counter interval may be seen to be effective beginning at basic pulse 14 of the memory cycle prior to memory cycle 1 and continuing in that state until basic pulse 14 of memory cycle 4 at which time the signal changes state and remains in the new state until basic pulse 14 of memory cycle 8 and so forth. The row address select (RAS), column address select (CAS) and column/row select (C/RS) signals, are the same in all three modes. The memory write signal is high for the first memory cycle in each write cycle in this mode and low for the remainder of the time. The memory output data (from RAM) interval is the same in all three modes. The output load strobe signal occurs at the end of each read cycle and is high beginning at pulse 14 of that read cycle and ending at the end of that read cycle. Again, the output shift clock signals are the same for all three modes. Next is illustrated the loading of data from the analog to digital converted TV video data indicated as serial data input (before SR) and (after SR) to latch. The 9.072 MHz input wave illustrating the serial input clock signal is shown. The memory parallel/serial load signal remains low throughout this mode. The memory latch signal goes high only for one basic pulse period of memory cycle 6 and of memory cycle 10. During the period from memory cycle 1 through memory cycle 5, the TV video write data to RAM (in latch) is immaterial. During the period beginning at memory cycle 6 and continuing through memory cycle 9, the first thirty-two bits of data are written to RAM. Beginning at memory cycle 10 the second 32 bits of data are started. The TV freeze command from the controller is illustrated as being initiated before the first memory cycle of this mode. A horizontal blanking signal goes low during the first memory cycle of the TV freeze mode and then goes high at pulse 14 of memory cycle 1, remaining high throughout this mode. The TV freeze enable signal goes high at basic pulse 14 of memory cycle 1 and remains high throughout the TV freeze mode.

Figure 21:
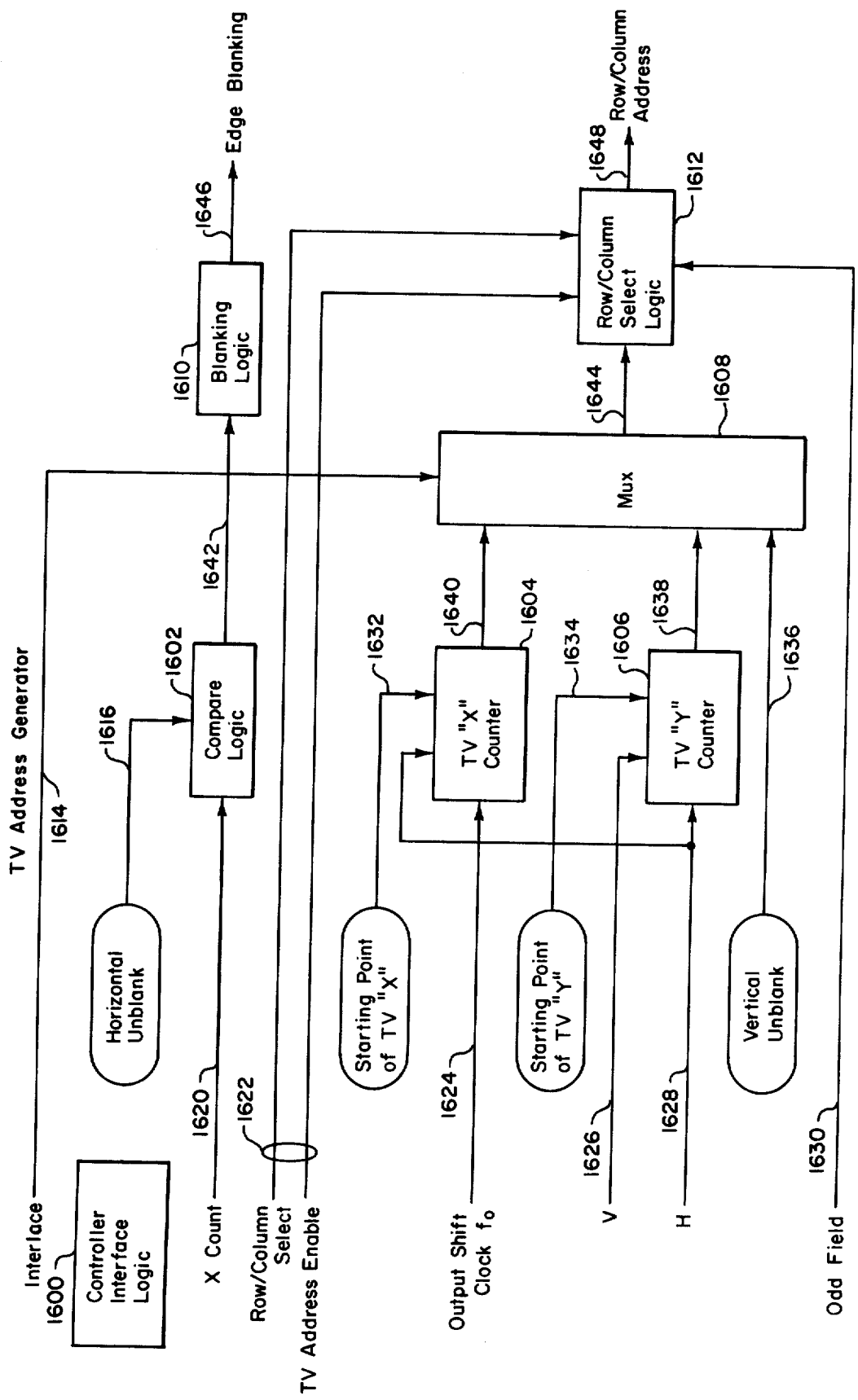
FIG. 21 is a functional block diagram of the TV address generator 60 of FIG. 3.

Referring now to FIG. 21, the TV address generator will be described in greater detail. Controller interface logic 1600 comprises 14 integrated circuits, four manufactured by Signetics as part number S8273F; one manufactured by Fairchild as part number DM7093; the remainder manufactured by Texas Instruments, two as part number SN54LS138J, two as part number SN5400J, two as part number SN54165J, and one each as part number SN54LS151J, SN5420J, SN5404J, and SN54LS00J. The compare logic function 1602 receives an X count signal by means of lead 1620 and a horizontal unblank signal under program control by means of lead 1616. The compare logic subsystem includes four integrated circuits manufactured by Fairchild under part number DM7160. Output from compare logic subsystem 1602 is furnished by means of lead 1642 blanking logic subsystem 1610 comprising nine integrated circuits, all manufactured by Texas Instruments, six as part number SN54LS195J, and one each as part number SN54LS74J, SN5404J and SN54LS00J. An edge blanking signal is supplied to the system from blanking logic subsystem 1610 by means of lead 1646. TV X counter 1604 receives the output shift clock signal $F_0$ by means of lead 1624, a horizontal signal by means of lead 1628, and a starting point of TV "X" signal under program control by means of lead 1632. TV Y counter 1606 receives horizontal signal input on lead 1628, a vertical input on lead 1626, and a starting point of TV "Y" signal under program control by means of lead 1634. TV X counter 1604 comprises six integrated circuits all manufactured by Texas Instruments, four as part number SN54163J, and one each as part numbers SN54S153J, and SN5474J. TV Y counter comprises five integrated circuits also all manufactured by Texas Instruments four as part number SN54163J and one as part number SN54S151J. Output signal is furnished from TV X counter and TV Y counter by means of leads 1640 and 1638 respectively to multiplexer 1608 which also receives an interface signal by means of lead 1614, and a vertical unblanking signal under program control by means of lead 1636. Multiplexer 1608 comprises three integrated circuits manufactured by Texas Instruments as part numbers SN54S138J, SN5400J, and SN54LS153J. Output signal from multiplexer 1608 is supplied to Row/column select logic function 1612 by means of lead 1644. Row/column select logic function 1612 also receives an odd field signal by means of lead 1630, a row/column select and a TV address enable signal by means of composite lead 1622. Row/column select logic function 1612 furnishes a row/column address signal to the system by means of lead 1648.

Figure 22:
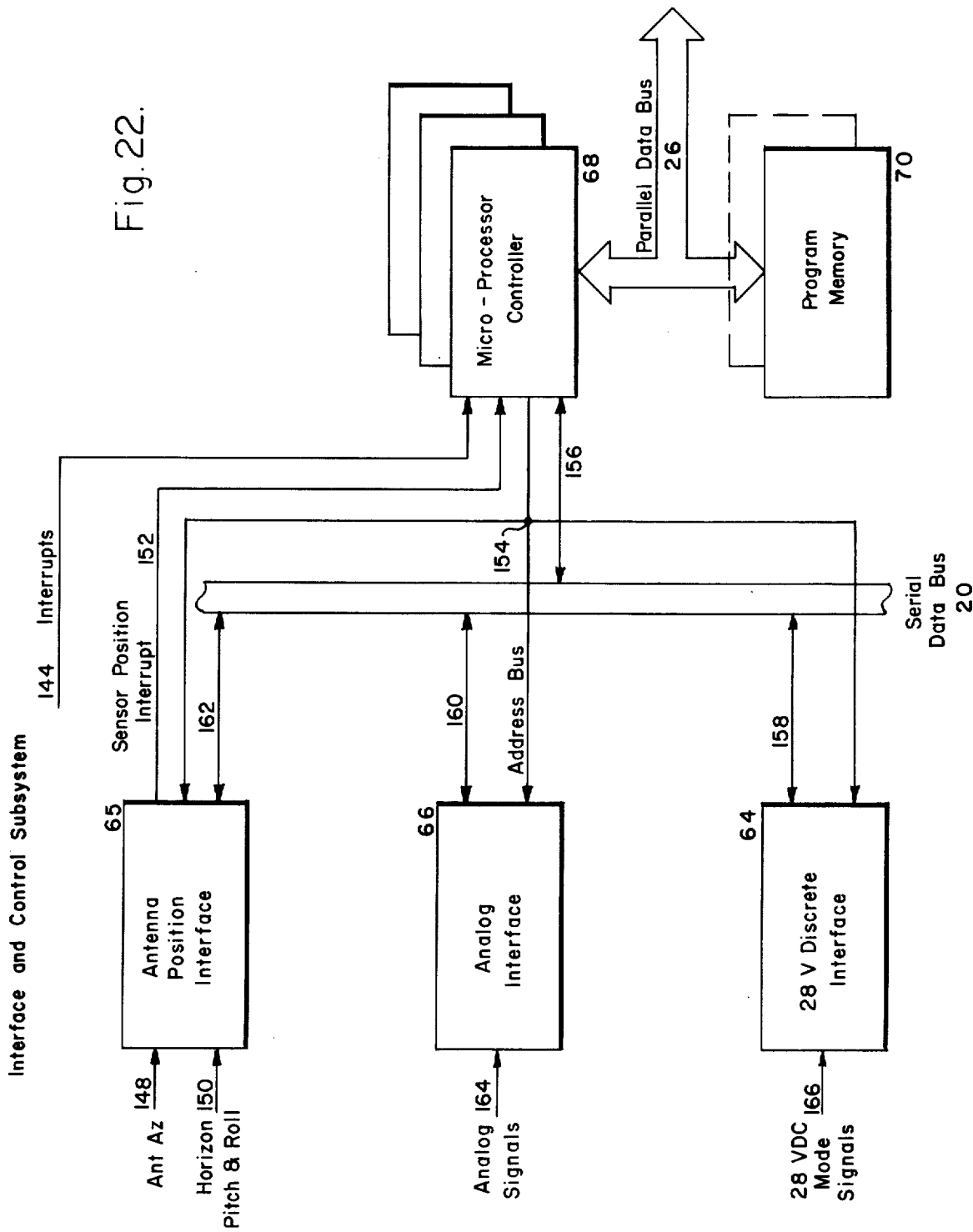
FIG. 22 is a functional block diagram of the interface and control subsystem.

Referring now to FIG. 22, the interface and control subsystem will be considered in greater detail.

The antenna position interface module 65 receives antenna azimuth input signal by means of lead 148 and horizontal pitch and roll signal by means of lead 150. Input signal from micro processor controller 68 is also supplied to antenna position interface 65 by means of lead 154. Required signal exchange function is effected between serial data bus 20 and antenna position interface 65 by means of lead 162. Analog interface module 66 receives input analog signals by means of lead 164 and micro processor controller input signal by means of lead 154. Signal exchange is effected between serial bus 20 and analog interface module 56 by means of lead 160. 28 volt discrete interface module 64 receives 28 volt DC mode signals by means of input lead 166 and microprocessor controller signal by means of lead 154. Required signal exchange is effected between serial data bus 20 and 28 volt discrete interface 64 by means of lead 158. Micro-processer controller 68 receives interrupt signal information by means of lead 144 and sensor position interrupt information by means of lead 152. Exchange of information between serial data bus 20 and micro-processor controller 68 is effected by means of lead 156. Micro-processor controller 68 also exchanges information with program memory module 70 by means of parallel data bus 26, these parallel data are also made available to the system by means of parallel data bus 26.

Figure 23:
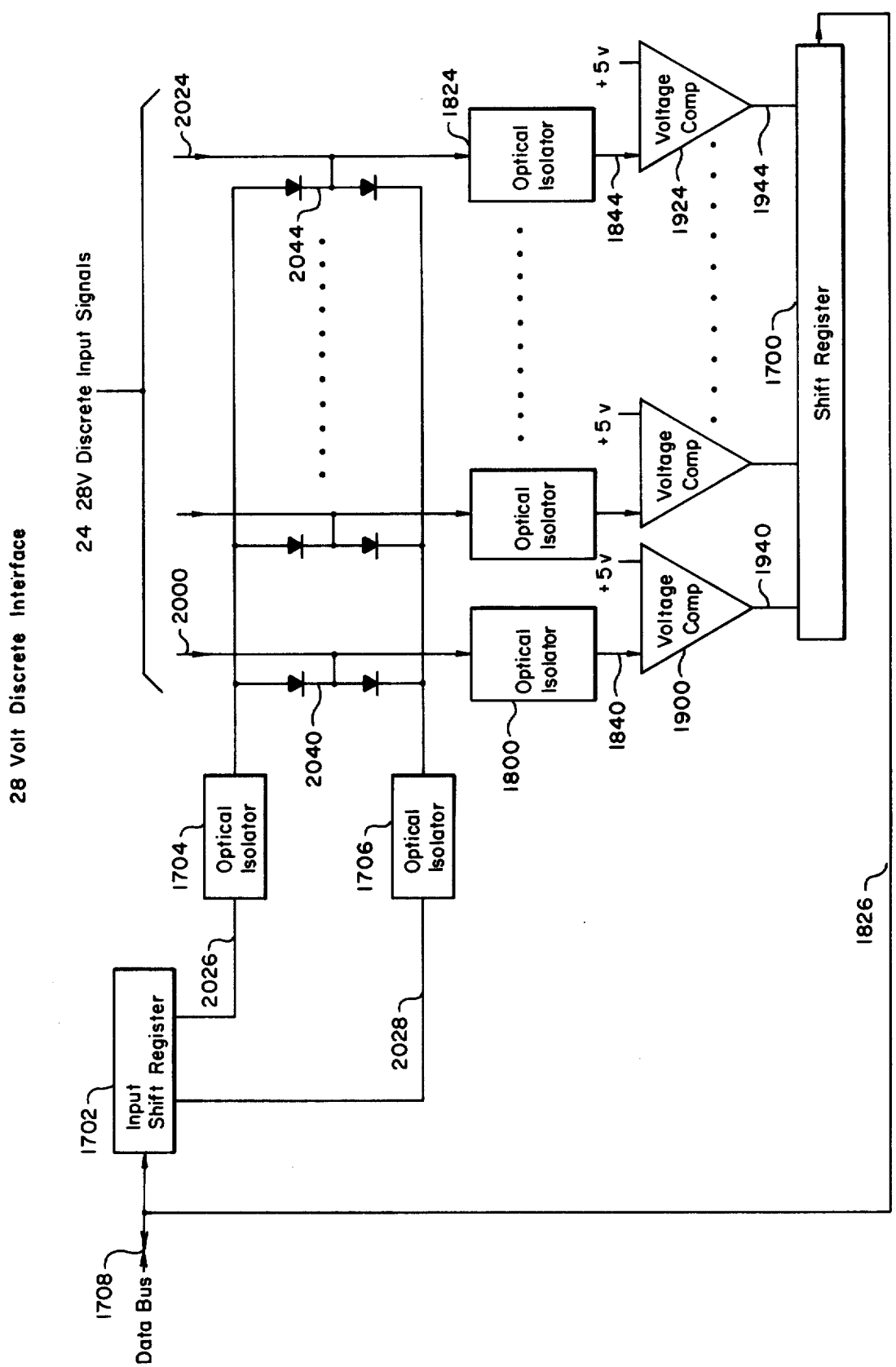
FIG. 23 is a functional block diagram of the 28 volt discrete interface 64 of FIG. 3.

Referring now to FIG. 23, the 28 volt discrete interface module is designed to accept 24 discrete inputs whose voltage levels for a high level must be in the range plus 18 volts to plus 200 volts with momentary surges up to plus 600 volts and whose voltage levels for a low level must be in the range −22 volts to +3.5 volts. These signals must be converted to TTL levels for transfer to the controller.

In the preferred embodiment each input channel drives an optical isolator which in turn drives a voltage input to a voltage comparator which decides whether the input signal was a high level or a low level. The output of the comparator is then loaded into the output shift register.

An input shift register is loaded with built in test (BIT) information which determines if the card is in (BIT) mode and if so whether to test the high (+28 volt) level or the low (ground) level. The high or low test information drives one of two optical isolators to force all inputs either high or low respectively.

Referring still in FIG. 23, the 28 volt discrete interface subsystem receives input by means of lead 1708 from the data bus into shift register 1702 which is an integrated circuit manufactured by Signetics as part number S8273F. Output signal from shift register 1702 is supplied by means of leads 2026 and 2028 to optical isolators 1704 and 1706, both manufactured by Monsanto as part number NCT-6. Output from optical isolators 1704 and 1706 is supplied to diode arrays 2040 through 2044 as shown, each being applied to the 24, 28 volt discrete input signals being supplied by means of lead 2000 through 2024. Leads 2000 through 2024 furnish input signal to optical isolators 1800 through 1824, these being optical isolators manufactured by Monsanto as part number MCT-6. Signal output from these optical isolators is furnished to voltage comparators 1900 through 1924 by means of lead 1840 through 1844. Voltage comparators 1900 through 1924 comprise six units of four each voltage comparators manufactured by National Semiconductor as part number LM139AD. Each of these voltage comparators receives also a +5 volt reference input. Output signal from voltage comparators 1900 through 1924 is supplied by means of leads 1940 through 1944 to output shift register 1700 which comprises four integrated circuits manufactured by Texas Instruments as part number SN54165J. A feedback signal is supplied by means of lead 1826 to input shift register 1702 from output shift register 1700.

ANALOG MULTIPLEXER AND ANALOG TO DIGITAL CONVERTER INTERFACE

The analog multiplexer and analog-to-digital interface module 66 is designed to accept 16 analog voltages in the −300 +300 volts range, low-pass filter them and convert them to 12 bit words in the preferred embodiment. The module is also designed to accept up to 8 analog voltages in the −5 to +5 volt range and convert them without filtering to 12 bit words.

For each high voltage filtered channel the input is attenuated in the scalar and passed through an integrater to an analog multiplexer.

Each low voltage channel inputs to the multiplexer directly depending on which of the 24 input channels is desired by the controller. A 5 bit address is sent to the input shift register which then enables the desired input to pass through the analog multiplexer and into the analog-to-digital converter. The output of the analog-to-digital converter is loaded into the shift register to be transferred to the controller on the serial data bus. Also transferred to the input shift register with the multiplexer address is 1 bit determining whether the card is in built-in-test (BIT) mode and 4 bits representing the analog voltage to be applied to the input during the built-in-test mode.

Figure 24:
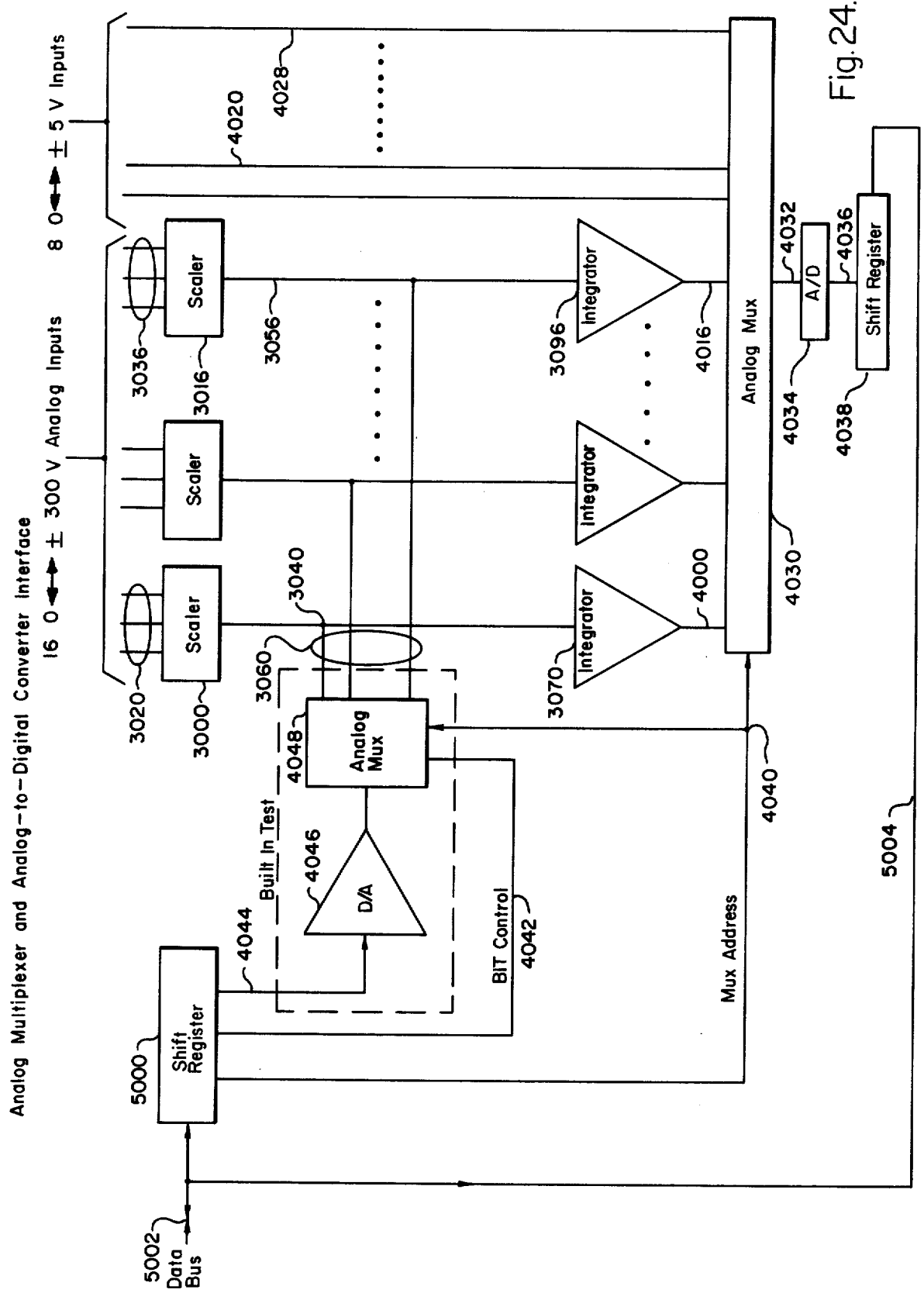
FIG. 24 is a functional block diagram of the analog multiplexer and analog-to-digital converter interface 66 of FIG. 3.

Referring now to FIG. 24, analog multiplexer and analog-to-digital converter interface 66 of FIG. 3 receives signal input from the data bus by means of lead 5002 into shift register 5000, an integrated circuit manufactured by Signetics as part number S8273F. Shift register 5000 outputs a signal to digital-to-analog converter 4046, an integrated circuit manufactured by Motorola as part number MC1506L by means of a lead 4044. Digital-to-analog converter 4046 outputs its signal to analog multiplexer 4048, which includes two integrated circuits manufactured by National Semiconductor as part number AM3705D. Analog multiplexer 4048 also receives signal input from shift register 5000 by means of lead 4042 and lead 4040. Signal outputs from analog multiplexer 4048 are applied by means of composite lead 3060 to each of leads 3040 through 3056. Scalars 3000 through 3036 receive 16 analog inputs in the range of 0 through ± 300 volts by means of composite leads 3020 through 3036. Signal output from scalars 3000 through 3016 are supplied to integrators 3070 through 3086 by means of leads 3040 through 3056. Integrators 3070 through 3086 are integrated circuits manufactured by National Semiconductor as part number LM124D as also are scalars 3000 through 3016. Output signals from integrators 3070 through 3086 are supplied by means of leads 4000 through 4016 to analog multiplexer 4030 comprising three integrated circuits manufactured by National Semiconductor as part number AM3705D. Analog multiplexer 4030 also receives eight inputs in the range of 0 to ±5 volts by means of leads 4020 through 4028. Output signal from analog multiplexer 4030 is furnished to analog-to-digital converter 4034 an integrated circuit manufactured by Motorola as part number MN5211 by means of lead 4032. Output signal from analog-to-digital converter 4034 is in turn applied to shift register 4038, two integrated circuits manufactured by Texas Instruments as part number SN54165J, by means of lead 4036. An output signal is fed back to shift register 5000 from shift register 4038 by means of lead 5004.

4K CONTROLLER RAM — MAIN MEMORY

Figure 25:
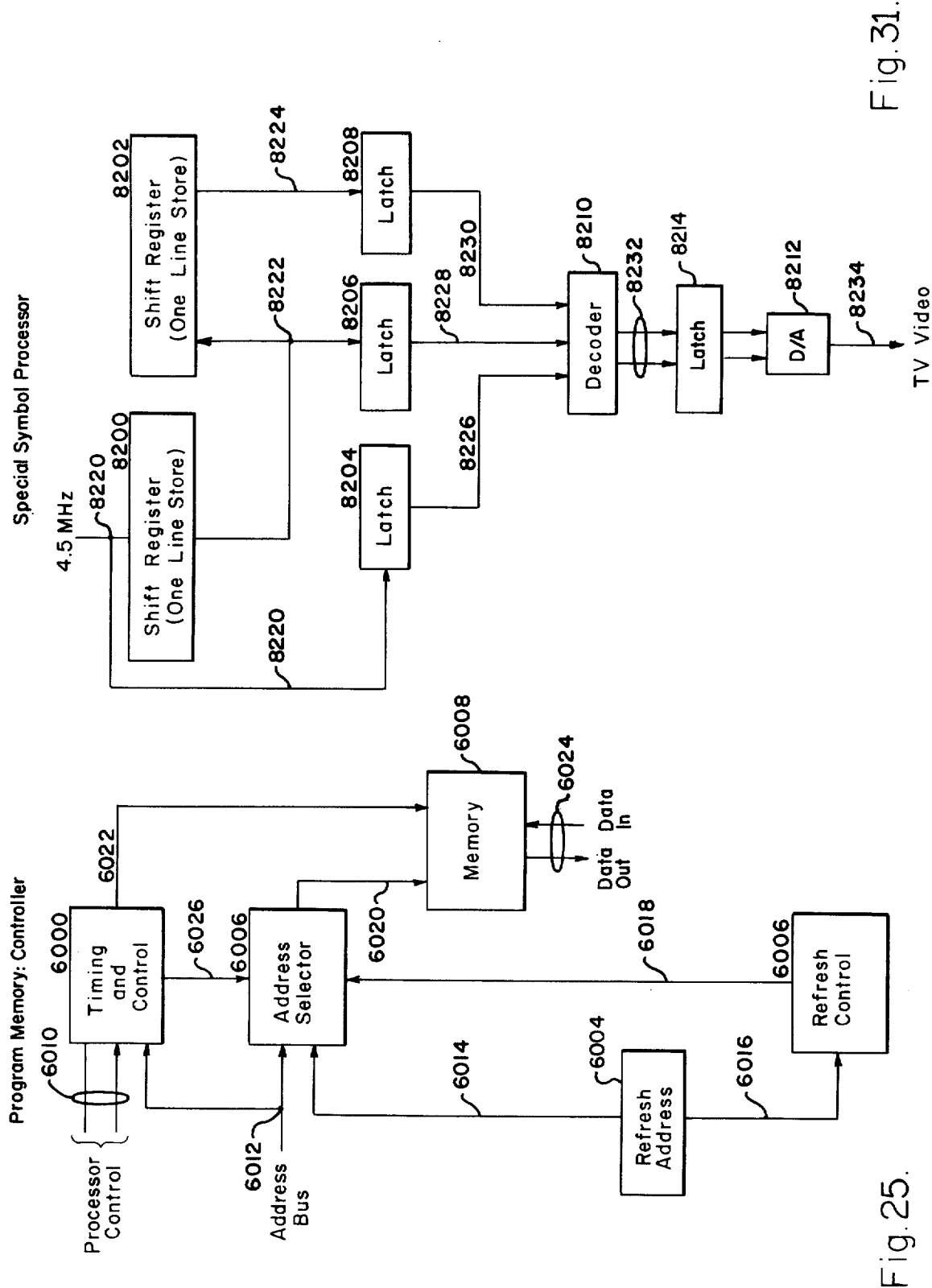
FIG. 25 is a functional block diagram of the program memory module 70 of FIG. 3.

Referring now to FIG. 25, the micro-processor's main memory consists of 4096 16-bit words that can be used for data or instructions. The heart of the memory is a chip configured into a 4096 × 1 bit array contained in a 16 pin pack. The memory cycle time is 600 nanoseconds. The memory is volatile which requires a refresh cycle every two milliseconds. In order to fit this configuration into a 16 pin pack, the 12 bit address lines are multiplexed into the pack 6 bits at a time. The least significant 6 bits enter the new address latches first then the most significant 6 bits are enabled into the column address latches 200 nanoseconds later. The 600 nanosecond cycle is divided into three 200 nanosecond time slots. The memory operation starts with a read or write request from the processor. The address is multiplexed in during the first 400 nanoseconds; if the command is a write, data must be available during the second 200 nanosecond time slot. If the command is a read, data will be available during the last 200 nanosecond time slot. The transfer of data back to the processor is enabled by a data request line from the processor. The refresh control consist of a refresh counter that times out the two millisecond refresh cycle and a refresh address counter that sequences through the 64 row addresses necessary for the refreshing of the memory. During the refresh cycle, all memory requests from the processor are inhibited. The refresh cycle takes approximately 40 microseconds to complete.

Referring still to FIG. 25, processor control information is received and output by means of composite lead 6010 to and from timing and control subsystem 6000, which also receives address plus information by means of a lead 6012. Address selector 6002 receives address bus information by way of lead 6012 and refresh address information by means of lead 6014, in addition to refresh control information from refresh control subsystem 6006 by means of lead 6018. Refresh control subsystem 6006 also receives refresh address information from refresh address subsystem 6004 by means of lead 6016. Memory unit 6008 receives signal information from timing and control subsystem 6000 by means of lead 6022 and address selector information from address selector subsystem 6002 by means of lead 6020. Timing and control subsystem 6000 also furnishes signal input by means of lead 6026 to address selector subsystem 6002. Memory unit 6008 accepts and outputs data by means of composite lead 6024.

The micro-processor controller (MPC) is designed as a general purpose high speed micro-processor. The processor and digital input/output requires approximately 70 LSI and MSI packages.

The MPC instruction set in the preferred embodiment has 50 instructions which were chosen on the basis of systems experience and application studies to enhance its use as a high speed computing and control unit. A list of these instructions and their formats is given in Table III. Seven addressing modes provide flexible addressing of up to 65,536 words of memory. The MPC has eight registers for efficient programming, organized as two index registers, four accumulators, stack pointer, and program counter.

TABLE III

MPC INSTRUCTION SET

Memory Reference

| OP | AI | DISP |
|---|---|---|
| 6 | 2 | 8 |

0                                              15

| MNEMONIC | INSTRUCTIONS |
|---|---|
| *LD | Load |
| *ST | Store |
| ADD | Add |
| SUB | Subtract |
| MULT | Multiply |
| DIV | Divide |
| CMPR | Compare |
| AND | Logical AND |
| OR | Logical OR |
| DADD | Double Prec. Add |
| SKAZ | Skip If AND Is Zero |
| LOCK | Lock |
| LIM | Limit |

Branch

| OP | DISP |
|---|---|
| 8 | 8 |

0                                              15

| JMP | Jump |
| BP | Branch Positive |
| BN | Branch Negative |
| BZ | Branch Zero |
| BNZ | Branch Not Zero |
| JSR | Jump to Subroutine |
| RTI | Return From Interrupt |

TABLE III-continued
MPC INSTRUCTION SET

```
         OP      X      OP      X
      ┌───┬───┬───┬───┬───┬───┐
      │ 6 │ 2 │ 4 │ 4 │
      └───┴───┴───┴───┴───┘
      0                       15
         RTS          Return From Subroutine
              OP       Ra         DISP
      ┌───┬───┬───┐
      │ 5 │ 3 │ 8 │
      └───┴───┴───┘
      0                       15
         BINC         Increment and Branch If
                      Not Zero
```

Input/Output

```
         OP      Ra     OP     I/O ADDR.
      ┌───┬───┬───┬───┐
      │ 5 │ 3 │ 4 │ 4 │
      └───┴───┴───┴───┘
      0                       15
```

| MNEMONIC | INSTRUCTIONS |
|---|---|
| SIN | Serial Input |
| SOUT | Serial Output |

```
         OP             Ra     OP   I/O ADDRESS
      ┌───┬───┬───┬───┬───┐
      │ 4 │ 1 │ 3 │ 4 │ 4 │
      └───┴───┴───┴───┴───┘
      0                       15
         PIN           Parallel Input
         POUT          Parallel Output OP      X      OP     I/O ADDRESS
      ┌───┬───┬───┬───┬───┐
      │ 5 │ 2 │ 1 │ 4 │ 4 │
      └───┴───┴───┴───┴───┘
      0                       15
         IOCP          Pulse Out
         SKR           Skip If I/O Ready
              OP        DISP
      ┌───────┬───────┐
      │   8   │   8   │
      └───────┴───────┘
      0                       15
         BLOC          Initiate Block Transfer
```

Immediate

```
         OP      Ra        VALUE
      ┌───┬───┬───────┐
      │ 5 │ 3 │   8   │
      └───┴───┴───────┘
      0                       15
```

| | |
|---|---|
| LI | Load Immediate |
| ADI | Add Immediate |
| CPI | Compare Immediate |

Interrupt

```
         OP      X      INTERRUPT
      ┌───┬───┬───┐
      │ 8 │ 4 │ 4 │
      └───┴───┴───┘
      0                       15
         IMSK          Interrupt Mask
```

Register to Register

```
         OP      Ra     OP     X     Rb
      ┌───┬───┬───┬───┬───┐
      │ 5 │ 3 │ 4 │ 1 │ 3 │
      └───┴───┴───┴───┴───┘
      0                       15
```

| MNEMONIC | INSTRUCTIONS |
|---|---|
| RMOV | Reg. Move |
| RADD | Reg. Add |
| RSUB | Reg. Subtract |
| RCMP | Reg. Compare |
| RAND | Reg. And |
| ROR | Reg. Or |
| RABS | Absolute Value |
| RNEG | Reg. Negate |
| RNOT | Reg. Ones Complement |
| PUSH | Push Stack |
| POP | Pop Stack |

```
         OP      Ra     OP     SHIFT
      ┌───┬───┬───┬───┐
      │ 5 │ 3 │ 4 │ 4 │
      └───┴───┴───┴───┘
      0                       15
```

| | |
|---|---|
| SHL | Shift Left |
| SHR | Shift Right |
| SHRA | Shift Right Arith. |
| ROT | Rotate |
| DSHL | Double Prec. Left |
| DSHR | Double Prec. Right |

*These instructions can address all 8 registers using multiple op codes
X = Not Used Instructions are included to perform register-register, immediate and memory-register arithmetic. Arithmetic instructions include the normal Add, Subtract, AND, OR as well as some esoteric instructions such as Fast Multiply, Divide, Arithmetic Shifts, and Absolute Value. Double precision instructions are also included. Stack manipulation, Return from Subroutine and Return from Interrupt instructions simplify the programming of executive control routines. A carefully chosen set of branch, loop control and shift instructions facilitate programming in real time control environments. A special instruction (LOCK) has been included to provide coordination of multiple microprocessors sharing common resources (e.g. memory).

The MPC I/O is designed to minimize total system hardware by providing micro-programmed timing and control signals necessary to interface a microprocessor into a system. System hardware for decoding of control signals and generation of timing is greatly reduced.

The MPC has four methods of performing I/O: parallel, serial, discrete and block. All I/O is performed on an asynchronous basis allowing the MPC to be easily utilized in systems with different I/O response times. All I/O operations result in the transfer of data, a channel address, decoded control signals and an I/O clock. Parallel and serial I/O can be performed to/from any of the eight addressable CPU registers. Thirty-two input and 32 output channels are available for parallel I/O. An additional 16 input and 16 ouput channels are available for serial I/O. Provisions for 128 discrete I/Os are implemented in the MPC. Using internal micro-programmed control sequences and registers which hold the block address and block length, the MPC provides the necessary hardware to fully support any one of 256 channels of block transfers on a cycle stealing basis.

Interrupts

The MPC has a 6 priority level interrupt structure which can be disabled or enabled under software control. Two of these levels are dedicated to the External Instruction Interrupt (a control panel function) and the Power Fail Interrupt. The Current Machine Status consisting of the current interrupt level, program counter and condition codes is automatically stored in the memory stack upon receipt of an enabled interrupt request. Restoration of machine status after processing an interrupt is through a Return from Interrupt instruction.

| Representative Instruction Execution Times | |
|---|---|
| Instruction | Execution ($\mu$sec) |
| Add | 1.5 |
| Conditional Branches | 2.0 |
| DADD | 2.5 |
| Jump | 1.7 |
| Load | 1.5 |
| Multiply | 10.2 |
| Store | 2.0 |

Figure 26:
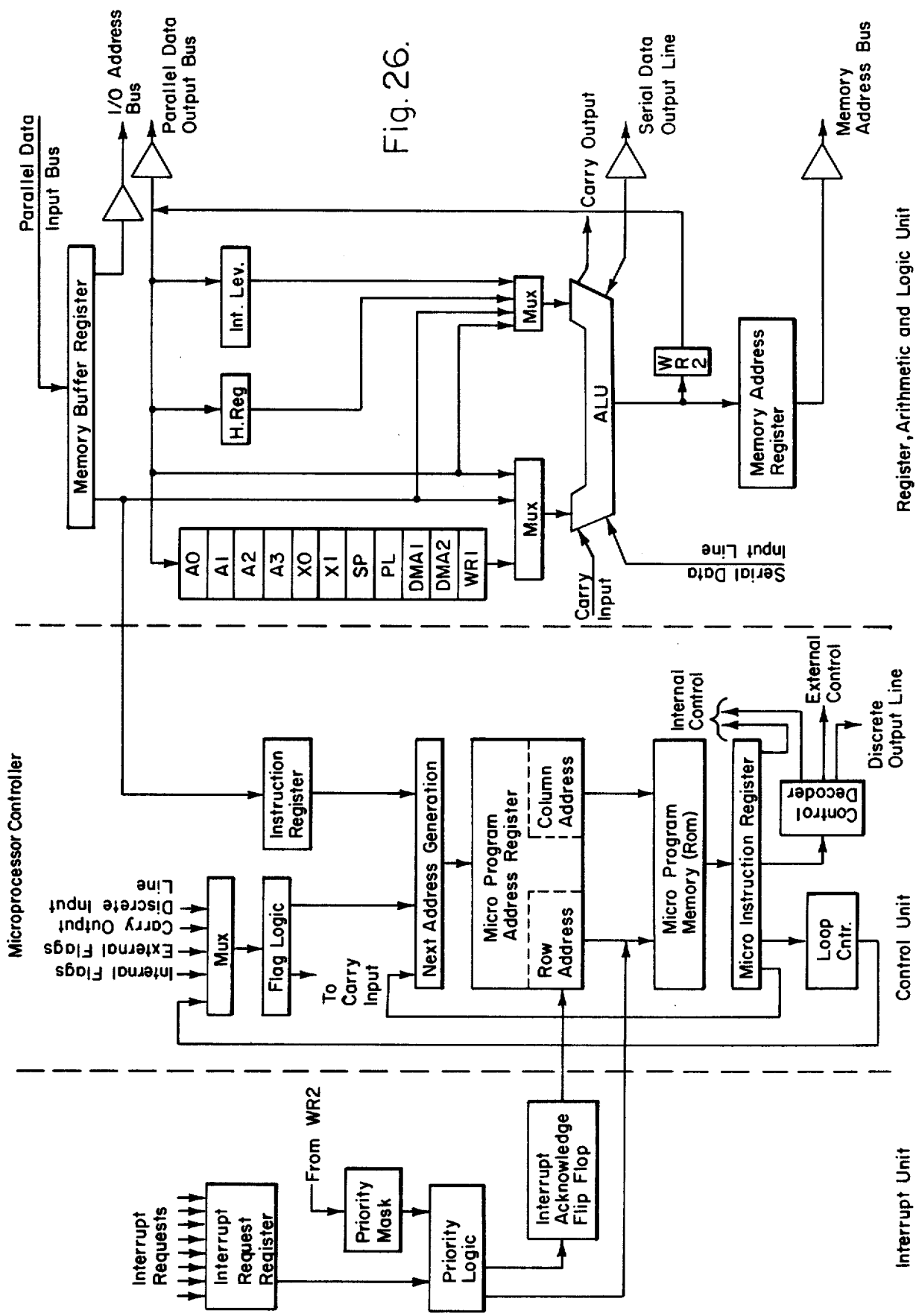
FIG. 26 is a functional block diagram of the microprocessor controller 68 of FIG. 3.

In FIG. 26 the Interrupt Unit (IU) receives eight interrupt request signals into its Interrupt Request Register from which it generates a 3 bit, prioritized output by means of a priority mask controlled by WR2 and priority logic as indicated. Interrupt request status is furnished by means of an Interrupt Acknowledge flip-flop. The information thus derived is used to modify the micro-program address.

The Control Unit (CU) decodes the micro instruction OP code, the address control field from the micro instruction, and the flag input to generate micro program addresses. The multiplexer receives Internal Flags, External Flags, Carry Output from the Arithmetic and Logic Unit, and other discrete inputs and superimposes these inputs in a Flag Logic unit as illustrated. Information thus derived is combined with information from the instructions Register and information from the Micro Instruction Register to form Next Address information. This information in turn is supplied to the Micro Program Address Register as shown and then modified, if required by the Interrupt Unit to be furnished to the Micro Program Memory (PROM). In the preferred embodiment, a 512 word by 32 bit PROM contains the micro program which it generates from the address furnished.

The Micro Instruction Register (MIR) in the preferred embodiment, is a 32 bit wide register on the output of the PROM. The function of the MIR is to divide the critical data paths thus allowing greater operating speeds. The instruction decode logic, control decoder, decodes portions of the micro instruction to generate control signals used for both internal and external control and the discrete output line signal. The Loop Counter is a 4 bit binary counter used to count the shift cycles during multiply, divide, and serial I/O.

In the Register, Arithmetic and Logic Unit, (RAL) the Memory Buffer Register (MBR) is used to buffer data and addresses received from the data bus to the Central Processing Array. Data in the Memory Buffer Register are available to the Instruction Register in the Control Unit, to multiplexers in the RAL and to the Input/Output address bus as shown. Data from the Arithmetic and Logic Unit (ALU) is furnished by way of the WR2 to the H Register, the Interrupt Level Register and to the multiplexers as shown. The multiplexed data are then furnished to the ALU along with carry input information from the CU and serial data. Data from the ALU are available to a Memory Address Register and carry output to a multiplexer in the CU and serial data by means of a serial data output line.

Figure 27:
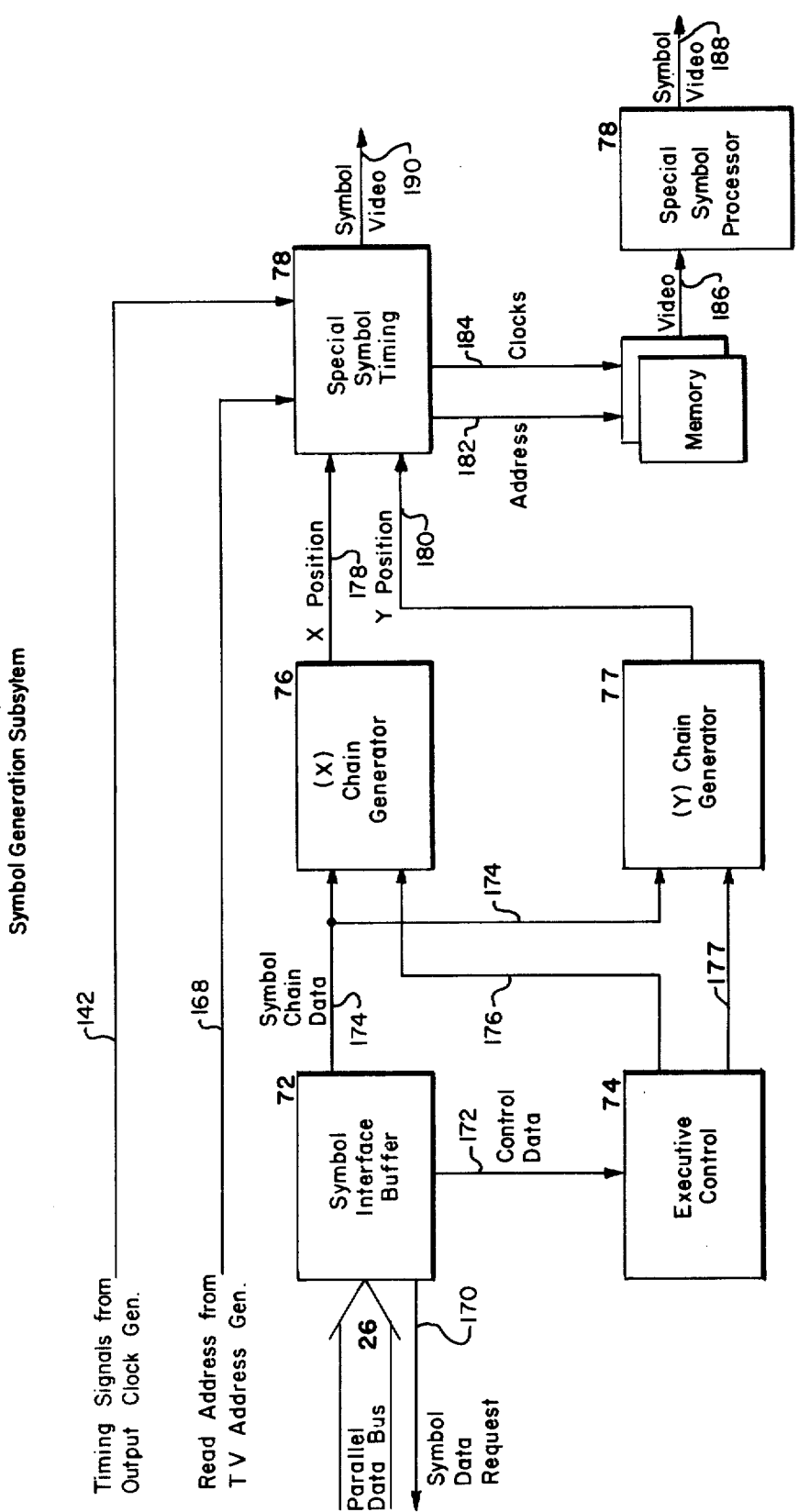
FIG. 27 is a functional block diagram of the symbol generation subsystem.
Figure 30:
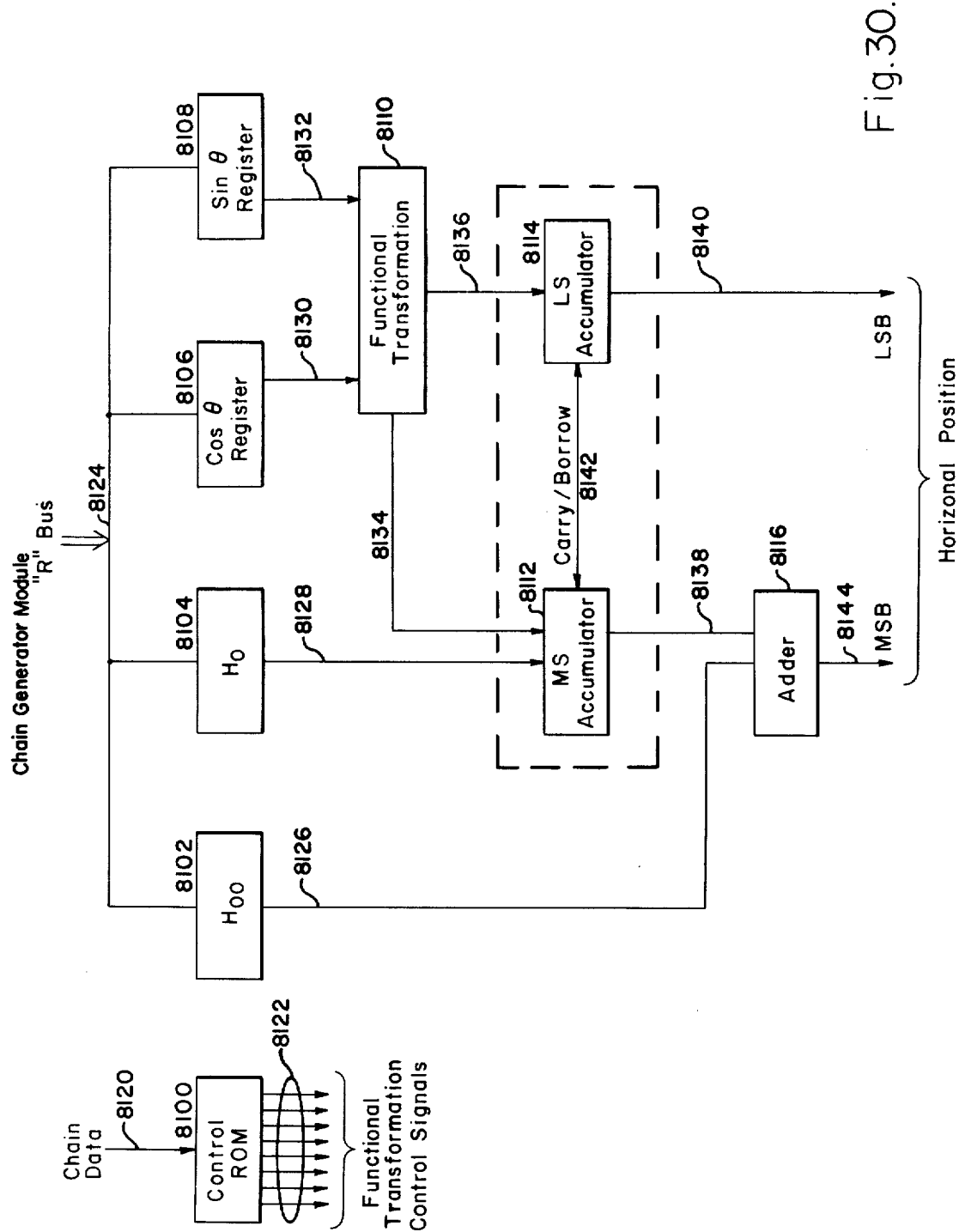
FIG. 30 is a functional block diagram of the chain generator module 76 of FIG. 3.

Referring now to FIG. 27 the symbol generation subsystem will be examined in more detail.

Symbol interface buffer 72 accepts parallel information from parallel data bus 26. Symbol interface buffer 72 provides symbol data request by means of lead 170; control data to executive control 74 by means of lead 172; and symbol chain data to X chain generator 76 and Y chain generator 77 by means of lead 174. Executive control module 74 also provides input signal to Y chain generator 77 by means of lead 177 and signal input to X chain generator 76 by means of lead 176. Special symbol timing module 78 excepts Y position information from Y chain generator 77 by means of lead 180; X position information from X chain generator 17 by means of lead 178 and timing signals from output clock generator by means of lead 142 and read address information from TV address generator by means of lead 168. Special symbol timing module 78 outputs address and clock information to memory by means of lead 182 and 184 respectively and symbol video output by means of lead 190. Memory outputs information to special symbol processor 79 by means of lead 186. Special symbol processor outputs symbol video by means of lead 188.

Referring now to FIG. 28, the symbol interface buffer module, 72 of FIG. 3, requests data from the parallel data bus by way of simple data request signal on a lead 7040. The 16 bit parallel data word is received from the bus on a lead 7042 by inverter 7000, which comprises three integrated circuits manufactured by Texas Instruments, part number SN5314J. These data are inverted and then loaded into the first in/first out storage register (FIFO) by means of a lead 7046. The FIFO comprises four integrated circuits manufactured by Texas Instruments as part number AM2841DM. The FIFO stores up to 64 16-bit words. These stored data are then made available to the R register on a need basis by means of lead 7048 as requested. The symbol data request signal is transmitted to the controller whenever the FIFO is less than full, that is, contains less than 64 words. The R register 7004 is a 16-bit buffer for the incoming word and all data and instructions stored in the FIFO pass through this R register which comprises four integrated circuits manufactured by Texas Instruments as part number FN54194J. The data in the R register are distributed to the chain generator modules and executive modules by way of the R bus on composite lead 7050; and, after being inverted, to the various appropriate registers contained on the symbol interface buffer module. The 16-bit R data are passed through inverter number 2, two integrated circuits manufactured by Texas Instruments as part number SN5404J, which converts the data from conventional binary to one's complement. The one's complement data, on command from the executive module, are loaded into either the segment register 7010, video pattern register 7012, segment counter 7014, or the brightness unit 7016. Only the required field data are sent to each of the registers. Chain data are sent from the R register to the data converter 7008, comprising seven integrated circuits; two manufactured by National Semiconductor as part number IM5610MDE, and two manufactured by Texas Instruments as part number FN54LS109J, and one each manufactured by Texas Instruments as part numbers AM25LS07DM, SN54LS157J, SN54283J, and SN54LS157J, four bits at a time by means of lead 7050. Data converter 7008 converts relative data to absolute data format and into addresses required by the chain generator module. After conversion, the data are stored in the A register 7020, an integrated circuit manufactured by Texas Instruments as part number SN54194J, by means of lead 7056 and transmitted out to the chain generator as required by means of composite lead 7070. Data converter 7008 operates on the chain segment "next to be displayed". Segment length register, 7010, two integrated circuits manufactured by Texas Instruments as part number AM25LS07DM, stores a 10-bit code which defines the length of a line segment which is to be chained to form the required symbology. The stroke length can be as small as one part in 1024 or as large as 1024 parts in 1024. The segment length is parallel loaded from segment length register 7010 into segment length counter 7022 comprising three integrated circuits manufactured by Fairchild as part number 9316DM, by means of lead 7058, where it is decremented (counted down) by the clock. When the stroke length has been decremented to zero, a signal is transmitted to the executive module by means of lead 7072 which permits reloading of the segment length into segment counter 7022 and the process is repeated. Video pattern register 7012, an integrated circuit manufactured by Texas Instruments as part number SN54166J is loaded by way of lead 7050 with an 8-bit code which defines a repetition video pattern which is to be displayed. The data in this register are the instantaneous segment video, and are supplied to the system by means of lead 7060. Segment counter 7014, three integrated circuits manufactured by Fairchild as part number 9316DM, is loaded also by way of lead 7050 with 10 bits which define the number of segments in the chain data. The contents of this register, decremented by one as each segment is utilized, keep track of the number of remaining segments. When the number of remaining segments (N) equals one, a signal is transmitted to the executive module. When $N = 0$, a second signal is transmitted to the executive module and the chain is terminated. These signals are transmitted respectively by leads 7064 and 7062. Brightness function 7016, an integrated circuit manufactured by Texas Instruments as part number SN54174J, receives input signal from inverter number two by means of lead 7052 and outputs a brightness signal to the system by means of lead 7066.

Referring now to FIG. 29, executive control module, 74 of FIG. 3, performs executive control of all the modules comprising the symbol generator and defines the status of operations at every step. The instruction codes together with the memory states from the state register defines 63 Q states, each Q state performing a specified set of control operations. The instruction codes and segment counter status are received from the symbol interface buffer module by way of leads, 8010 and 8012, and are then sent to function code converter 8000 which is a set of programmable read only memories manufactured by Fairchild as part numbers IM5610MDE and IM5600MDE. The instruction codes are reformatted to provide control signals to address instruction decoder 80012 which comprises six integrated circuits manufactured by Fairchild as part number IM5610MDE, by means of lead 8014. The segment counter status signals modify the address control signals to the decoder. Instruction decoder 8002 performs the function of converting the instruction codes to each of the 63 Q states. The outputs of the instruction decoders are, in fact, the control signals to each of the functional blocks and registers comprising the symbol generator by means of lead 8016. Instruction decoder 8002 output is also supplied by means of lead 8020 to state register 8004, an integrated circuit manufactured by Texas Instruments as part number SN54194J, whose output signal, by means of lead 8022, is fed back to function code converter 8000. Edge blanking function 8008, an integrated circuit manufactured by Fairchild as part number IM5610MDE, is not utilized for an in raster symbol generation application. It has been included for use in a calligraphic or stroke symbol generation application to prevent an attempt to write symbology off of the display area.

The circuit detects the position of the CRT beam, less than 0 or greater than 1024, and outputs a strobe signal to the digital to analog converter to blank the video.

SYMBOL CHAIN GENERATOR

Two identical chain generator modules indicated as 76 of FIG. 3, are included in the symbol generator, one for vertical positioning and one for horizontal positioning. For the purpose of functionally describing the operation of these modules, only the horizontal chain generator module will be described by reference to FIG. 31.

10 bit field data are received on composite lead 8124 by the chain generator module by way of the R bus and made available to the 4 storage registers: HOO, HO, cos $\theta$ and sin $\theta$. Load commands received from the executive module determine which of the 4 registers is loaded with the R bus data.

Chain data are also received by control ROM 8100, an integrated circuit manufactured by National Semiconductor as part number IM5610MDE, on a lead 8120.

Eight functional transformation control signals are output from control ROM 8100 on composite lead 8122.

HOO register 8102, two integrated circuits manufactured by Texas Instruments as part number AM25-LSO7DM, stores a 10-bit, two's complement position code which acts to bias the entire display in the horizontal direction. The 10 bits enables the display to be biased by as little one part in 1024 or 1024 elements which is the maximum display width. HO register 8104, also two integrated circuits manufactured by Texas Instruments as part number AM25LSO7DM, stores a 10-bit 2's complement position code which is, in fact, a coordinate transformed display position. These data are used for positioning just prior to writing a symbol. Sin $\theta$ and cos $\theta$ registers 8108 and 8106 respectively, again each comprising two integrated circuits manufactured by Texas Instruments as part number AM25LSO7DM, each store a 10-bit code which defines an angle $\theta$ by which a chain is rotated.

To rotate a chain by an angle $\theta$, a coordinate transformation is performed. This transformation must have the form:

$$X_i' = X_i \cos \theta - Y_i \sin \theta.$$

For the Y or vertical chain generator the form would be:

$$Y_i' = Y_i \cos \theta + X_i \sin \theta.$$

The cos $\theta$ and sin $\theta$ register data are input respectively by means of leads 8130 and 8132 into functional transformation block 8110, comprising nine integrated circuits, one manufactured by Fairchild as part number 9322 DM, the rest manufactured by Texas Instruments; two as part number SN54LS157J, three as part number SN4H87J, and three as part number SN54LS181J, where the coordinate transformation is accomplished under control of the micro programmed control ROM 8100. A chain incremental vector is produced and generation is accomplished by accumulating $\pm \cos \theta$, $\pm \sin \theta$, or 0 to produce $X_i'^0$. A 20-bit accumulator is composed of a low order least-significant-bit (LSB) accumulator 8114, comprising four integrated circuits manufactured by Texas Instruments, two as part number SN54174J and two as part number SN54283J, and a high order most-significant-bit (MSB) accumulator 8112, comprising five integrated circuits manufactured by Texas Instruments, three as part number SN54283J and two as part number SN54LS174J, receiving functional transformation input signal from functional transformation block 8110 respectively on leads 8136 and 8134. MSB accumulator 8112 also receives input signal from HO Register 8104 by way of lead 8128. The LSB accumulator 8114 accumulates $X_i'$, and borrows from or carries to the MSB accumulator by way of lead 8142. Address chain generation is accomplished by the MSB accumulator 8112 accumulating the LSB carries or borrows over a period of time. The starting point of the chain is established by clearing both accumulators and adding HO by means of lead 8128 to the MSB accumulator. At the output of the chain generator the horizontal bias HOO is added to the value of the MSB accumulator by means of lead 8126. Thus after K clock periods the horizontal position of the beam is:

$$H_k = HOO + HO + \sum_{i=1}^{K} K_i$$

Similarly the vertical position of the beam is:

$$V_K = VOO + VO + \sum_{i=1}^{k} r_i$$

Adder 8116, three integrated circuits manufactured by Texas Instruments as part number SN54283J, forms the 10-bit MSB output by combining HOO by way of lead 8126 and the MSB accumulator 8112 output, received by way of lead 8138, on a lead 8144. The 3-bit LSB output is furnished by LSB accumulator 8114 on a lead 8140. The chain generator control signals provide logic to decide which operations are to occur at each clock time.

The control ROM 8100 receives chain data, 3 bits at a time from the A register located on the symbol interface buffer module and provides signal output that controls the chain generators. After each segment is drawn, the chain data on the interface buffer card are shifted 4 places to the left, input to the A register where the video bit is stripped away, and the resulting next 3 bits of chain data sent to the control ROM 8100.

Symbol in-raster processor 78 of FIG. 3 will now be described in great detail. Referring to FIG. 31, special processor module provides the required signal conditioning and interface between the symbol generator and display. It performs two primary functions; (1) video decoding, and (2) digital-to-analog video conversion.

Symbolic data are transmitted on a lead 8220 from the memory to the processor as a 3-bit code, 1 display line at a time. To provide proper smoothing, 3 display lines at a time must be processed and decoded simultaneously. To accomplish this, first assume the shift registers and latches contain no data, a line of incoming data is stored in the first shift register 8200 and latch 8204. Shift register 8200 and latch 8204 now contain the first line of data. As the second line of display data is received it is again stored in the first shift register 8200 and latch 8204, and the first line of display data is shifted out by means of lead 8222 and stored in the second shift register 8202 and latch 8206. Shift register 8200 and latch 8204 now contain the second line of data and shift register 8202 and latch 8206 contain the first line of data. When the third line of data is read into shift register 8200 and latch 8204, the second line of data is shifted into latch 8206 and register 8202 by lead 8222 and the first line of data is shifted out of shift register 8202 into latch 8208 on lead 8224. Latch 8204 now contains the third line of data, latch 8206 the second line of data and latch 8208 the first line of data. The three latches, 8204, 8206 and 8208 are read out in parallel by means of leads 8226, 8228 and 8230, therefore, providing simultaneous access to three display lines by decoder 8210. Decoder 8210 furnishes its output signal to latch 8214 on composite lead 8232 which is read into digital-to-analog converter 8212 as the system requires so as to furnish a TV video signal on lead 8234. Each latch holds three adjacent 3-bit video codes thereby providing look-ahead and look-behind along a display line. The three 3-bit codes from each latch are made available to the decoder in parallel as required. The combinational logic decoder circuit operates on the 27 inputs and provides two outputs in time sequence corresponding to the two display cells within the respective memory cell. Only off and fullon intensity signals are produced for square edge symbols. Also exactly four display cells are turned on for each 3-bit memory word containing a square edge symbol code. The decode circuits actually have six outputs corresponding to an intensity weight of 2. and six outputs corresponding to a weight of 1. More than one of each output may occur at any instant allowing many combinations of the 12 outputs.

Shift registers 8200 and 8202 are identical configurations comprising an integrated circuit manufactured by National Semiconductor as part number MH0026CN, a resistance network manufactured by Beckman as part number 898-1-R3. 3K and an integrated circuit manufactured by Intel as part number 1402A. Latches 8204, 8206, and 8208 are also identical configurations each comprising three integrated circuits manufactured by Texas Instruments as part number SN54LS195J. Decoder 8210 comprises seven integrated circuits all manufactured by Texas Instruments, two as part number SN54S157J, three as part number SN54S153J, and two as part number SN54S139J. Latch 8214 comprises three integrated circuits manufactured by Texas Instruments as part number SN54S175J. Digital-to-analog converter 8212 comprises four diode networks manufactured by Beckman as part number 899-60, and two resistance networks both manufactured also by Beckman, one as part number 898-3-R3. 3K and the other as part number 898-3-R1. 3K.

The entire refresh memory is read out once for each field. Depending on which field the display monitor is in, the decoding circuit logic produces different outputs from the same memory input codes to provide vertical smoothing as well as horizontal smoothing of symbology which is displayed at an angle other than 0° or 90° to the TV raster. The timing and control block controls the clocking of the shift registers and latches. The output of decoder 8210 is sent to digital-to-analog converter 8212 by way of latch 8214 which converts the digital video to TV video.

Figure 32:
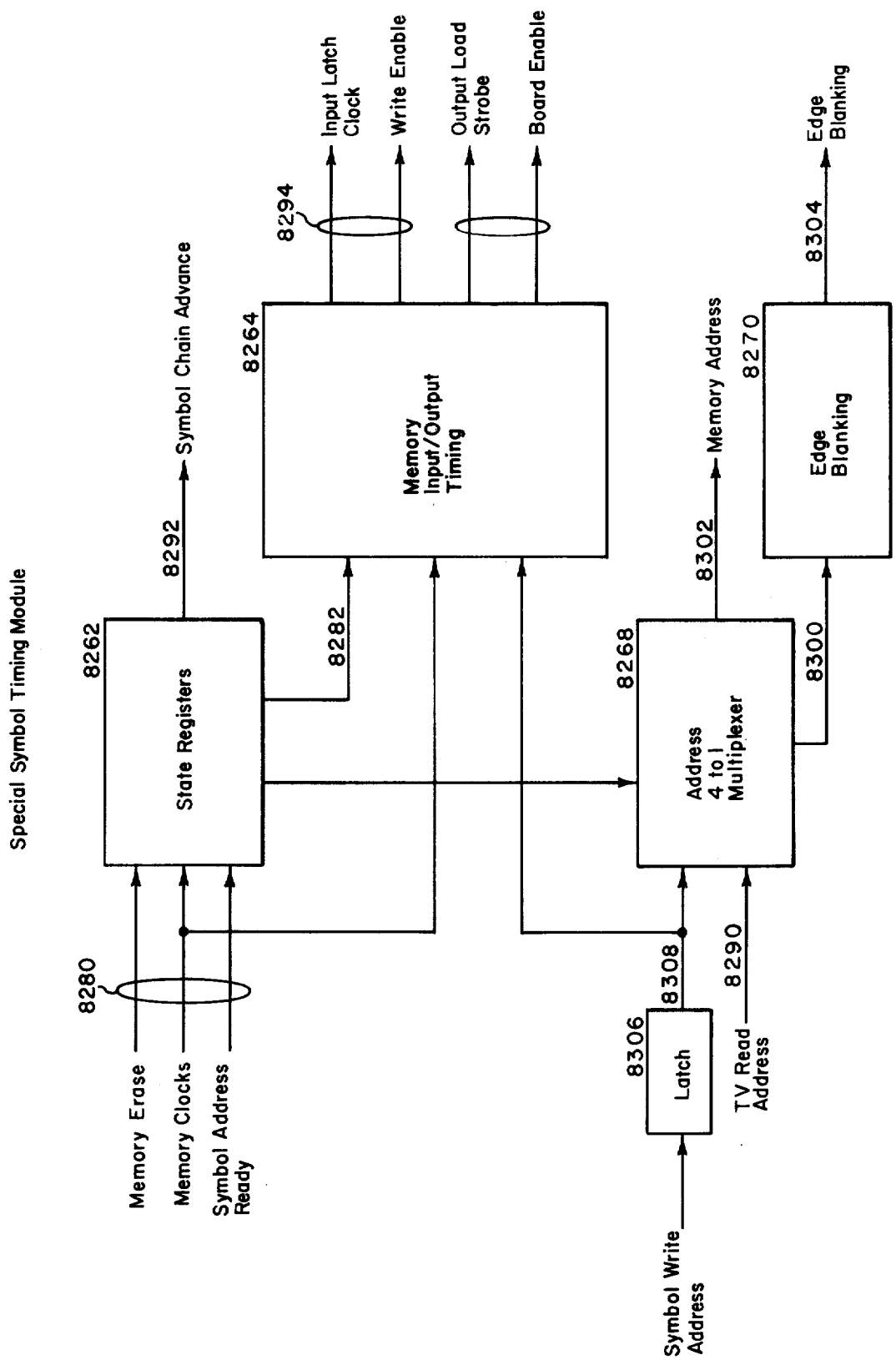
FIG. 32 is a functional block diagram of the special symbol timing module, also in 78 of FIG. 3.

Referring now to FIG. 32, the special symbol timing subsystem will be considered in greater detail. State registers 8262, comprising eleven integrated circuits all manufactured by Texas Instruments, two as part number SN5474J, three as part number SN5400J, one as part number SN5410J and five as part number SN5404J, receive, by means of composite lead 8280, memory erase, memory clock and symbol address ready signals. The memory clock signal is also supplied to memory input/output timing subsystem 8264; comprising eight integrated circuits manufactured by Texas Instruments, four as part number SN54161J, one as part number SN54LS138J and two as part number SN5474J, and one as part number SN5410J. Memory input/output timing subsystem 8264 receives additional input from state registers 8262 by means of lead 8282. Address four to one multiplexer 8268 comprising four integrated circuits manufactured by Texas Instruments, three as part number SN54LS153J and one as part number SN54157J, receives signal input from latch 8306 comprising four integrated circuits manufactured by Texas Instruments as part number SN5474J, by means of lead 8308. Latch 8306 also furnishes its signal output to memory input/output timing subsystem 8264. Address 421 multiplexer 8268 receives a TV read address signal by means of lead 8290. Address 420 multiplexer 8268 outputs its signal by means of lead 8300 to edge blanking subsystem 8270 comprising eight integrated circuits manufactured by Fairchild as part number 9324DM. A symbol chain advance signal is supplied to the system from state registers 8262 by means of lead 8292; input latch clock, wire enable, output load strobe, and board enable signals are supplied to the system from memory input/output timing subsystem 8264 by means of composite lead 8294. A memory address signal is supplied by means of lead 8302 from address four-to-one multiplexer 8268; and an edge blanking signal is supplied by means of lead 8304 from edge blanking subsystem 8270.

Figure 33:
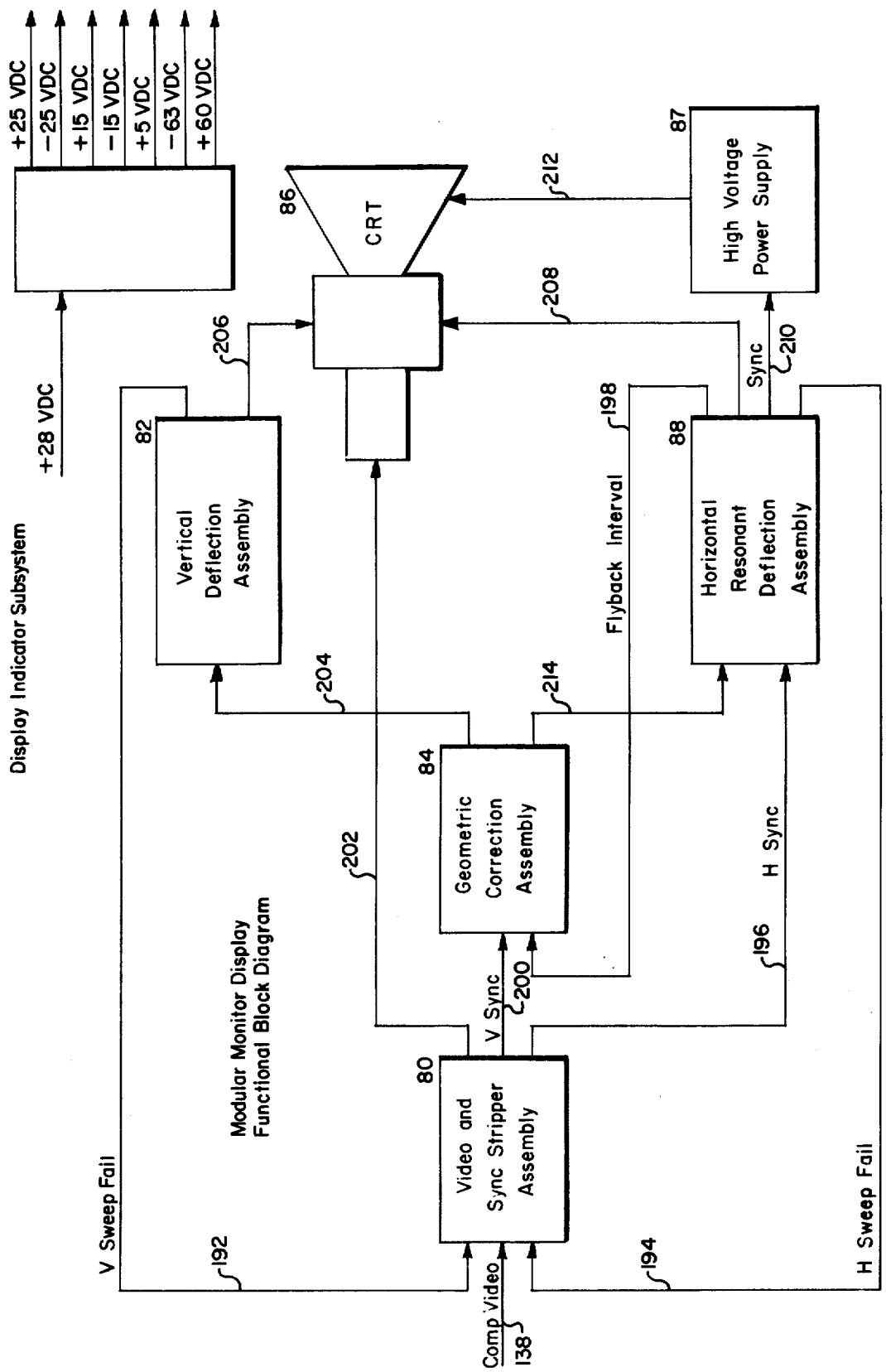
FIG. 33 is a functional block diagram of the display indicator sybsystem of FIG. 3.

Referring now to FIG. 33 the display indicator subsystem will now be examined in more detail.

The video and sync stripper assembly 80 accepts composite video signal by means of lead 138; horizontal sweep fail information from horizontal resonant deflection assembly 88 by means of lead 194 and vertical sweep fail signal from vertical deflection assembly 82 by means of lead 192. Output from video and sync stripper assembly 80 consists of signal output to CRT 86 by means of lead 202; vertical sync signal by means of lead 200 to geometric correction assembly 84 and a horizontal sync signal to horizontal resonant deflection assembly 88 by means of lead 196. Output signal from geometric correction assembly 84 is fed to vertical deflection assembly 82 by means of lead 204 and horizontal resonant deflection assembly 88 by means of lead 214. Output from vertical deflection assembly 82 is fed to CRT 86 by means of lead 206. Output from horizontal resonant deflection assembly 88 is fed to geometric correction assembly 84 by means of lead 198 this signal is called the fly-back interval signal. A sync signal is fed to the high voltage power supply by means of lead 210 and signal from horizontal resonant deflection assembly 88 is fed to CRT 86 by means of lead 208. CRT 86 receives its required high voltage power from high voltage power supply 87 by means of composite lead 212.

HORIZONTAL RESONANT DEFLECTION ASSEMBLY

The horizontal resonant assembly consists of a conventional TV resonant deflection circuit, phase locked loop, voltage regulator with automatic width control amplifier and minus R (negative resistance) circuit. The phase locked loop provides noise immunity, and accurate phase lock with incoming and horizontal drive for the resonant deflection circuit.

The resonant deflection assembly is very conventional in operation with the exception that it is driven through and S shaping capacitor by a negative resistance circuit which is actually a power operational amplifier. The current in the conventional deflection yoke is sampled through a conventional current transformer at the input of the negative resistance circuit and amplified with a gain and polarity such that it tends to cancel the effects of real circuit losses in the resonant circuit. Thus its behavior resembles that of a pure LC circuit. This mode of operation closely approximates on-axis linearity correction to which off-axis correction is added by summing the ideally corrected ramp from the geometric correction module with the sampled yoke current waveform such that any error between the two inputs is nulled by the amplifier by way of a correction voltage applied to the resonant circuit. Since retrace constitutes a 180° portion of a sine wave which is outside the effective limits of the geometric correction module, off-axis correction is gated on only during active sweep time and the circuit is purely resonant during retrace.

The voltage regulator controls the DC potential applied to the resonant circuit which determines raster width. This regulator is driven through an automatic size control amplifier by a line rate reference voltage from the horizontal ramp generator. As line rate increases producing a shorter active sweep time, the increased magnitude of the line rate reference increases the DC potential applied to the resonant circuit thus keeping raster width constant.

Referring now to FIG. 36 through FIG. 51 the program routines of the modular programmable digital scan converter may be examined.

Figure 36:
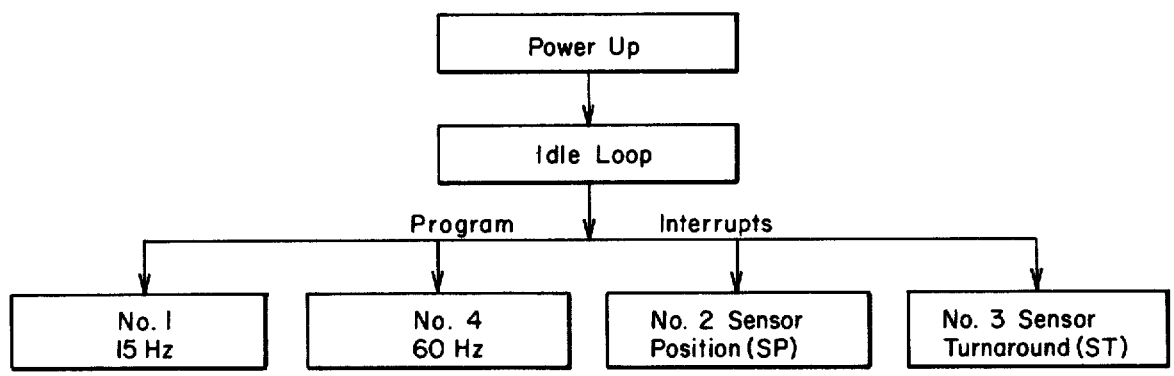
FIG. 36 is a functional flow chart helpful in understanding the interrupt priority system used in the invention.

Referring first to FIG. 36 the program itself may be seen to consist of five principal parts. A power up routine initializes all internal software variables, initializes the hardware modules and then enters an idle loop. The remainder of the program is controlled by an interrupt scheme. The four interrupt levels, whose priorities are indicated by the numbers are: of fourth priority, the 15 Hz. interrupt; of third priority, the sensor position (SP) interrupt; of second priority, the sensor turnaround (ST) interrupt; and of first priority, the 60 Hz. interrupt.

Figure 37:
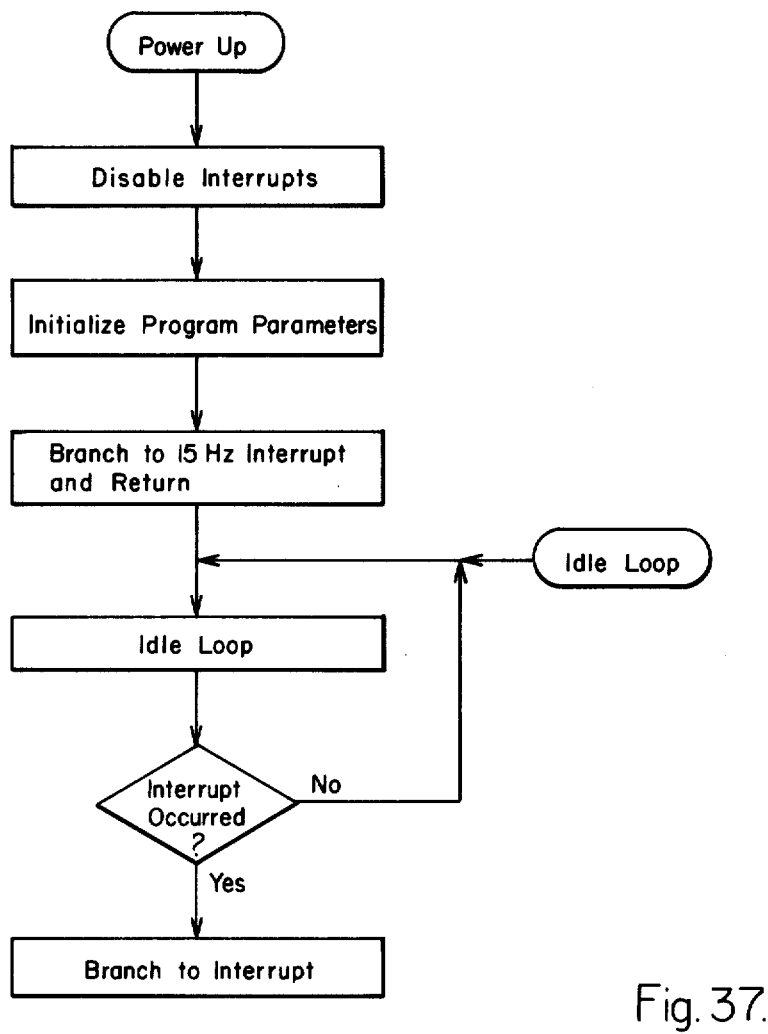
FIG. 37 is a functional flow chart, more detailed than FIG. 36, directed toward an understanding of the interrupt system used in the invention.

Referring now to FIG. 37, the power up routine may be examined in greater detail. Upon entering the power up routine the first task to be accomplished is to disable all interrupts. Next, program parameters must be initialized, for example, these parameters may include a stack pointer, a watchdog timer loop, routine addresses and display constants. It is in this segment of the program that the power up flag must be set to ON, certain transfers accomplished from one part of memory to another and the creation of various tables such as a sine/cosine table must be effectuated in the random access memory. The program then enters an idle loop in whose decision block it is determined whether or not an interrupt command has occured. If no such command has occurred, the program repeats the question over and over again until the occurrence of an interrupt command at which time the program will branch to that interrupt commanded.

Figures 38, 41:
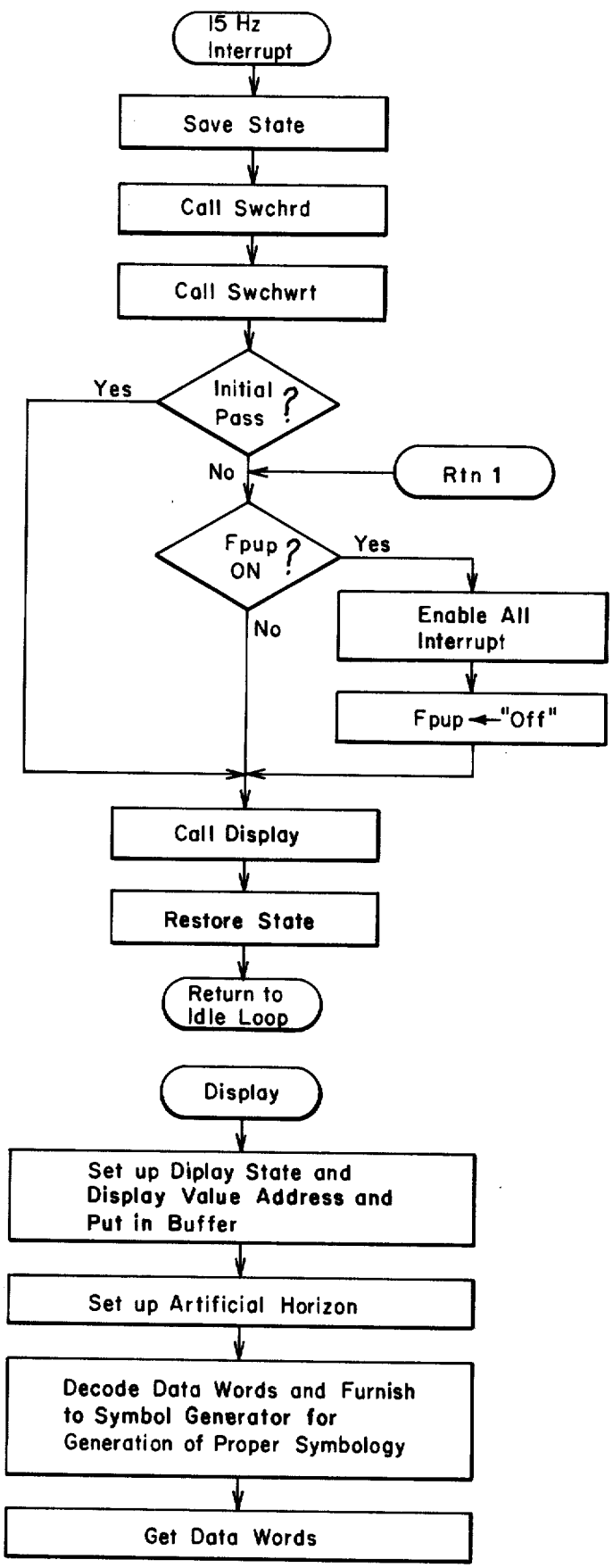
FIG. 38 is a functional flow chart for an interrupt system as contemplated by the invention.
FIG. 41 is a high level functional flow chart of a subroutine as might be used in the interrupt system shown in FIG. 38.

Referring now to FIG. 38, the 15 Hz interrupt may be examined in greater detail. The first task to be accomplished, as with any interrupt scheme, is to save the state of the registers in order that the program may be reentered at the same point at which it was interrupted. Next, two subprograms switch read (SWCHRD) and switch write (SWCHWRT) are called. It is then determined whether or not this constitutes an initial pass through the program. If this pass through the program is an initial pass, a third subroutine "display" is called, the state of the registers is restored and the program returned to the idle loop. If this pass through the program does not constitute an initial pass, it must next be determined if the power up flag, FPUP, is ON. If the power up flag is ON, the next task to be accomplished is to enable all interrupts then turn the power up flag to OFF, call the subroutine "display", restore the state of the registers and return to the idle loop. If it was determined that the power up flag was OFF, the program directly calls the subroutine "display", restores the state of the registers and returns to the idle loop.

Figure 39:
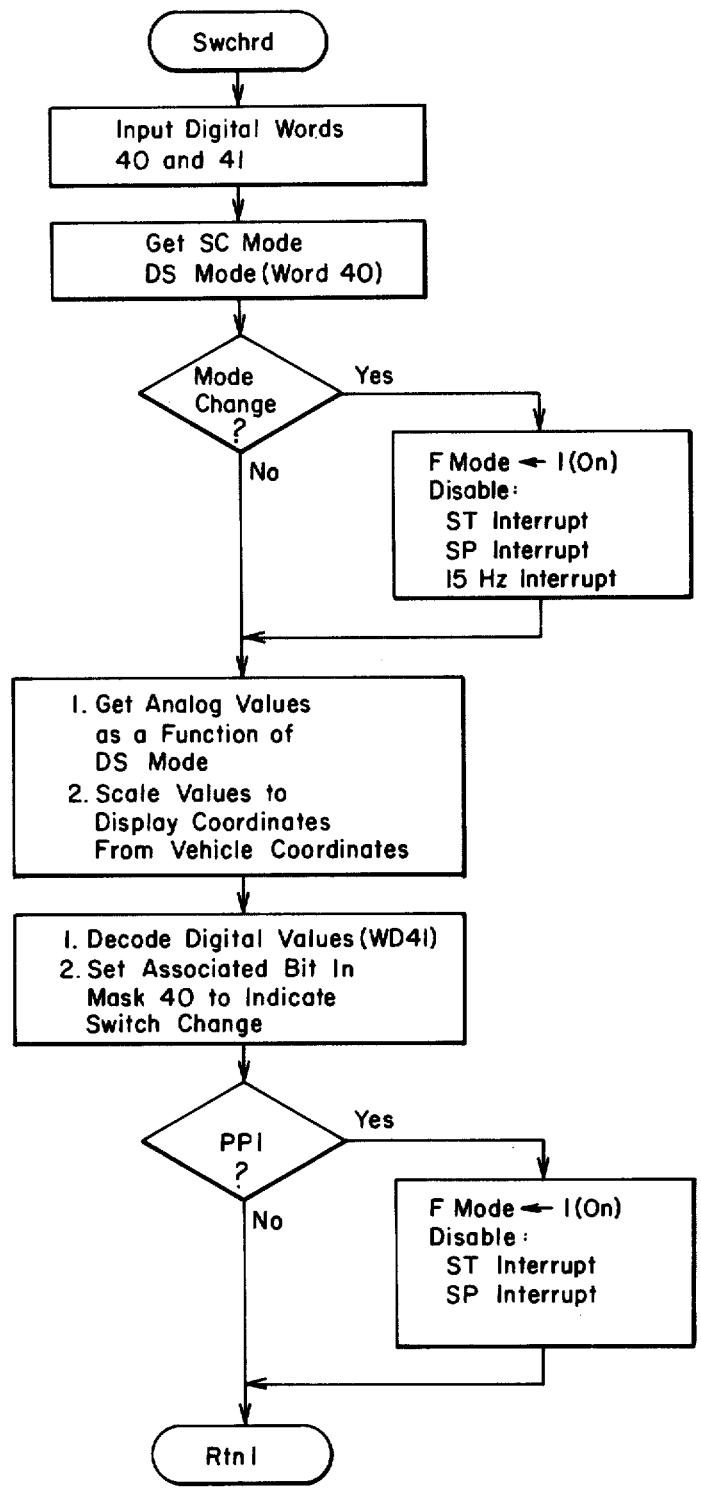
FIG. 39 is a functional flow chart of a subroutine for the interrupt system shown in FIG. 38.

Referring to FIG. 39, the subroutine SWCHRD may be examined in detail. When this subroutine has been called by the 15 Hz. interrupt program, the first task to be accomplished is to input program digital code words. For the sake of example we may indicate these words as words 40 and 41. The word 40 as used here is a mode sensor word, that is, it sets up what mode we are in and what sensor we are examining. Word 41 will contain code bits identifying discrete variables such as range, scale, and so forth. Next, word 40 is examined to determine the scan converter mode and the digital scan mode. If there has been a mode change, then the mode flag is set to 1, sensor position, sensor turnaround and 15 Hz. interrupts are disabled before continuing. If there has been no mode change, the program goes directly to the next segment of the program in which analog values as a function of digital scan mode are examined and scaled to display coordinates from vehicle coordinates. Next, the digital values occuring in word 41 are examined and the appropriate bits are set in a mask to indicate a switch change. It will next be determined if the plan position indicator (PPI) scheme of display is being utilized. If so, the mode flag, FMODE, is set to ON and the sensor turnaround, sensor position, and 15 Hz. interrupts are disabled. The program then returns to RTN1 at the position indicated in FIG. 38. If the PPI mode of display is not being utilized, the program returns directly to RTN1.

Figure 40:
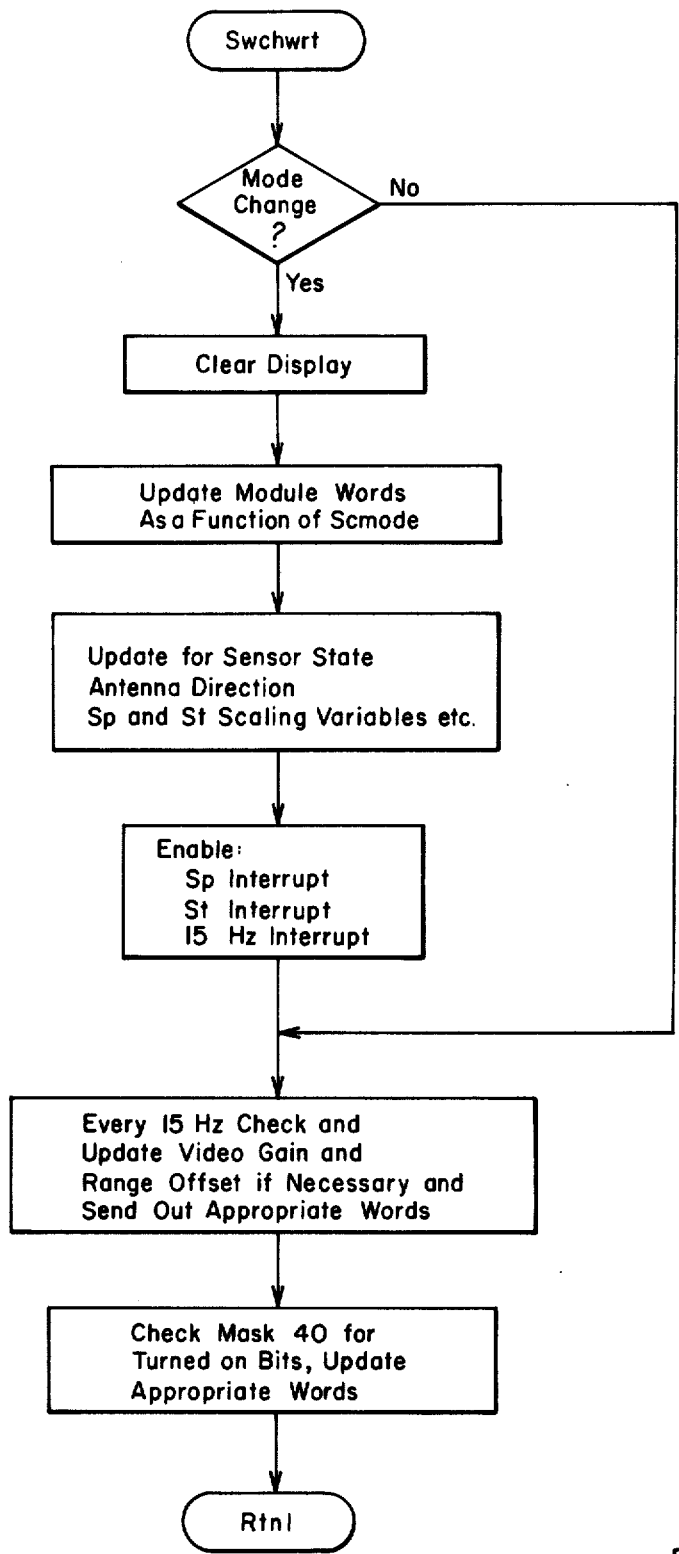
FIG. 40 is a functional flow chart showing another subroutine that might be used in the interrupt system shown in FIG. 38.

Referring to FIG. 40, the subroutine SWCHWRT may be examined in detail. As before it must be determined whether there has been a mode change. If there has been, the first task is to clear the display. Next, the words that control the modules must be updated as a function of the new scan converter mode. The program must now update itself for sensor state, antenna direction, sensor position and sensor scaling variables, and so forth, after which the sensor position, sensor turnaround and 15 Hz. interrupts must be enabled. If there has been no mode change, we reach this point in the program directly. Every 15 Hz. the program checks and updates video gain and range offset if necessary and sends out the appropriate data words. After checking mask 40 for turned-on bits and updating the appropriate words the program returns to RTN1.

Referring to FIG. 41, the subroutine DISPLAY may now be examined. The first task is to set up the display stack and display value addresses and put them in the display buffer. The program then sets up an artifical horizon after which it decodes data words and furnishes them to the symbol generator so that the proper symbols may be generated.

Figure 42A:
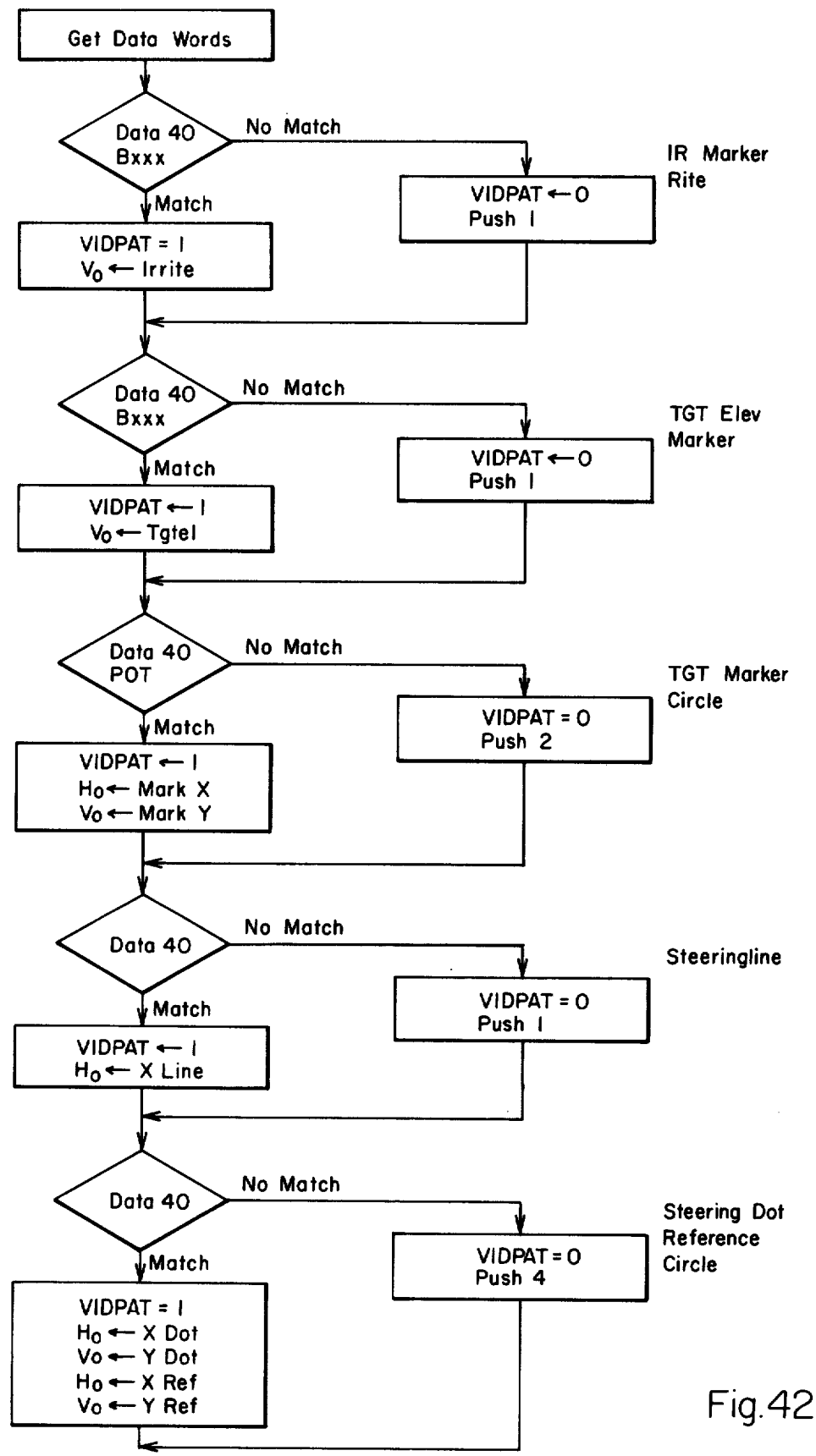
FIG. 42a is a detailed functional flow chart of a lower level subroutine as might be used with the subroutine shown in FIG. 41.
Figure 42B:
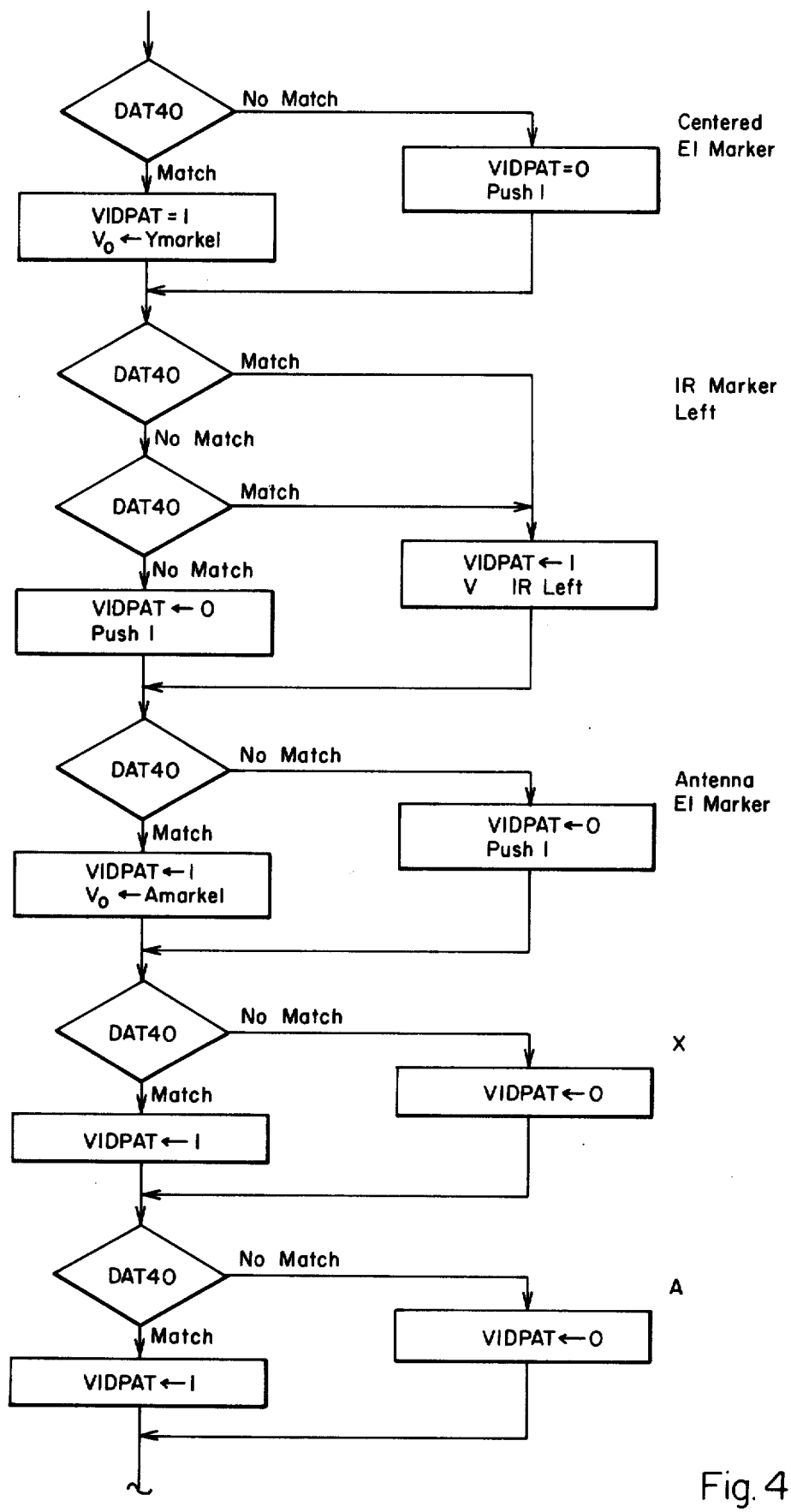
Figure 42C:
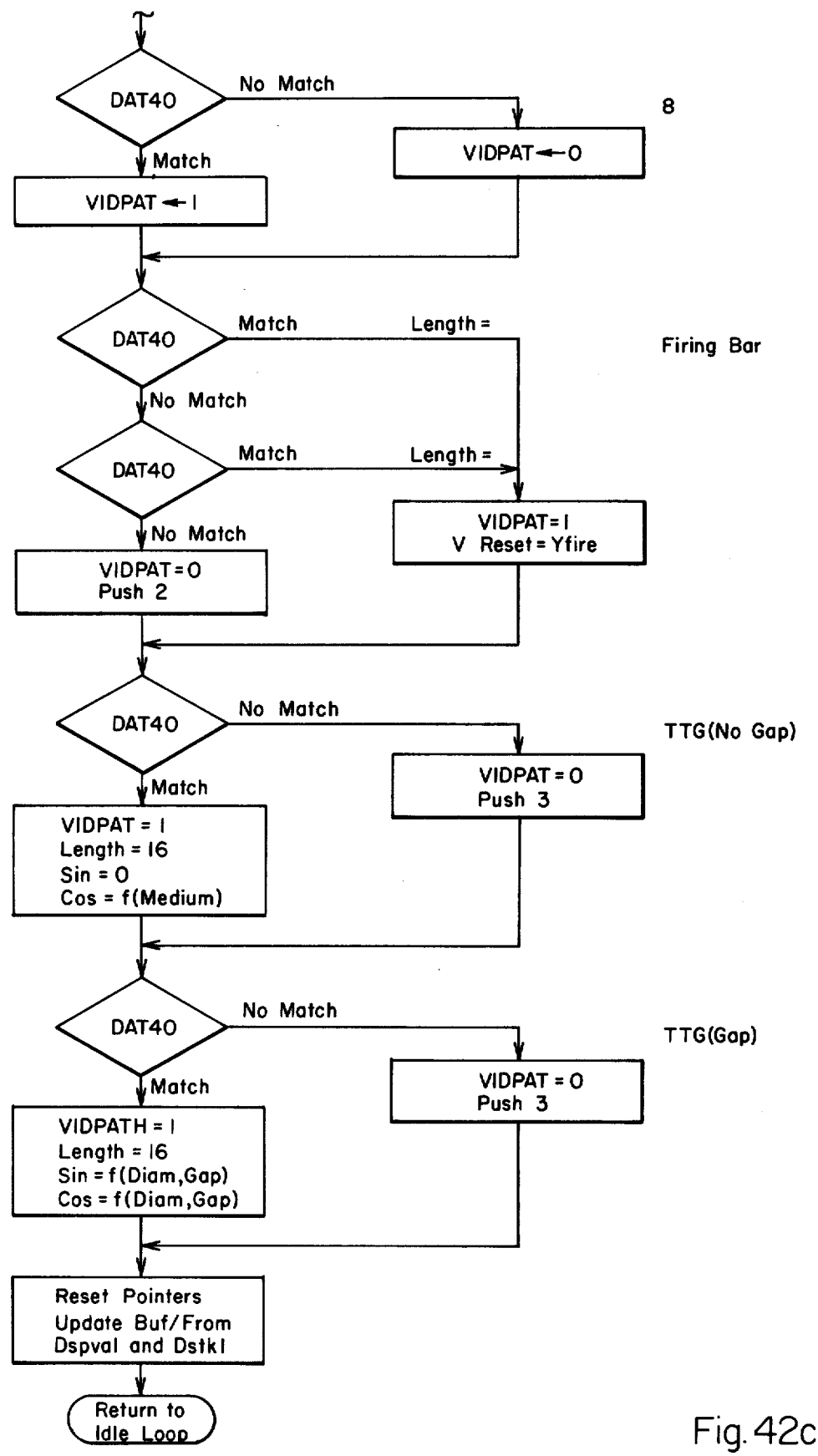
FIG. 42c is a continuation of FIG. 42a and FIG. 42b and shows the terminating return thereof.

Referring now to FIGS. 42a, 42b, and 42c an example of how a data word may be decoded is explained. After getting the data word it is determined if particular coded bits are set, which for the sake of convenience we will refer to as a match. In checking the data word for the code bits corresponding to the IR marker, RITE, if we find no match in the data word, we disable the video pattern storage word VIDPAT and push 1 indicating that we will now examine the next occurring set of bits, if however a match is found to exist, we enable VIDPAT and transfer the IR marker word IRRITE into the storage location $V_O$. The program goes through similar operations to effectuate decoding of the total word so as to obtain symbology as indicated, for example, target elevation marker, target marker circle, steering line, steering dot reference circle, centered elevation marker, and so forth through the entire code word or words.

Figure 43:
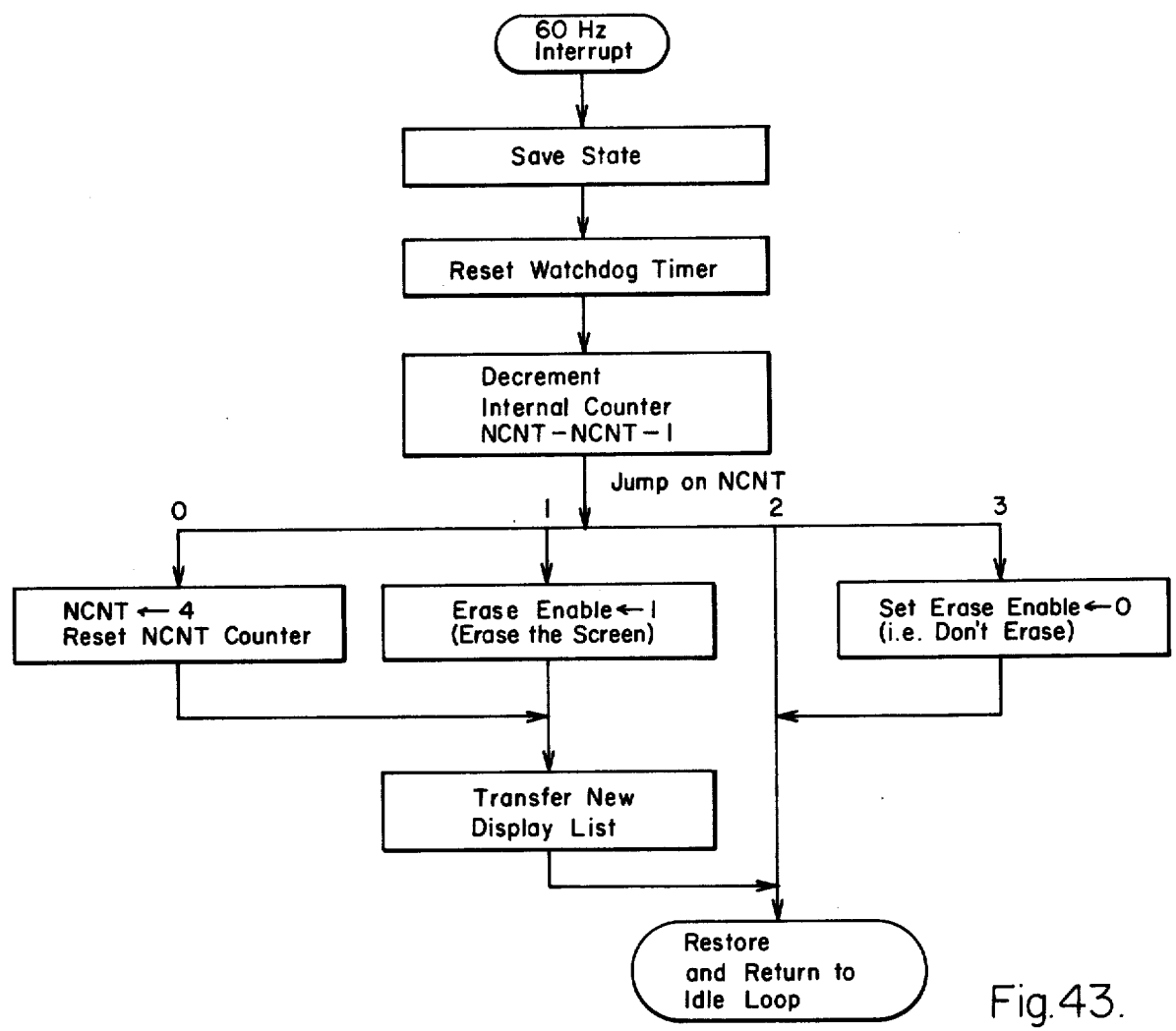
FIG. 43 is a functional flow chart of a routine that might be used as an interrupt system as shown in FIG. 36.

Referring now to FIG. 43, the 60 Hz. interrupt will be examined. As in the case of all interrupts, the first task to be accomplished is that of saving the state of the computer registers. The watchdog timer is reset next. This timer counts down in real time and whenever it counts to zero the program automatically branches back to the power up routine. Next the program decrements an internal counter NCNT and performs a jump in accordance with whatever number is in the counter NCNT. When a 4 is placed into the counter the next program step is to transfer the new display list, then restore the registers and return to the idle loop. When the counter contains a 1, as indicated, the erase enable routine is enabled, thus erasing the display screen and again the program transfers the new display list, restores the registers and returns to the idle loop. When the counter contains a 2 the program directly restores the registers and returns to the idle loop. When the counter contains a 3, the erase enable routine is disabled, that is, the screen is not erased and the program then restores the registers and returns to the idle loop.

Figure 44A:
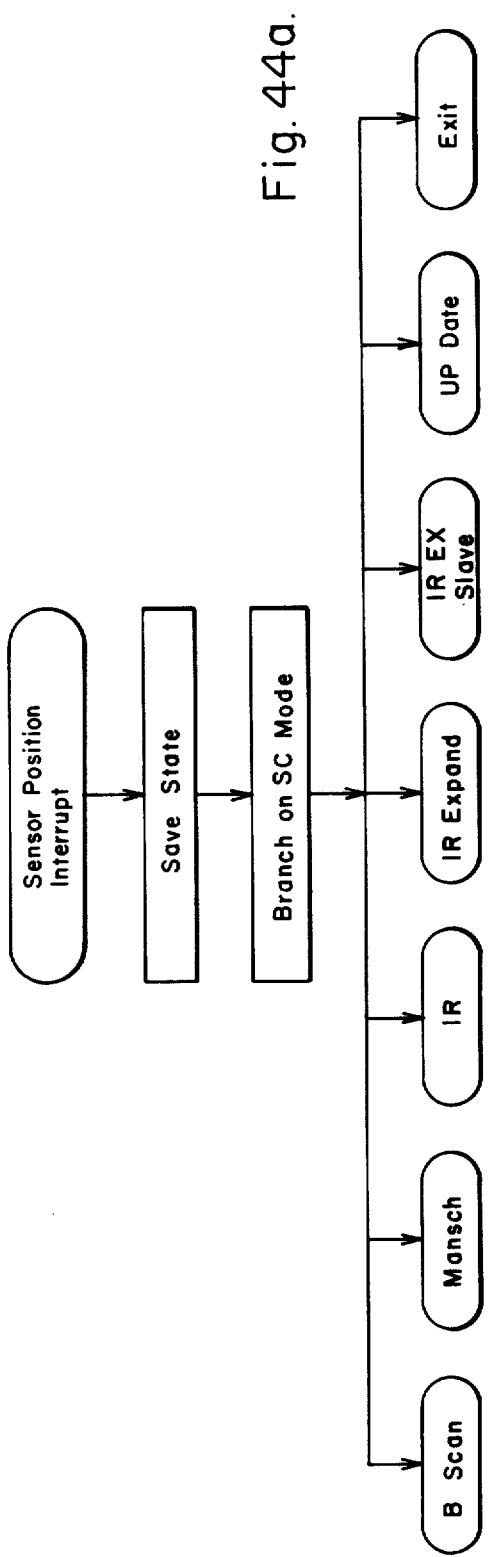
FIG. 44a is a functional flow chart of a routine that might be used as an interrupt system as shown in FIG. 36.

Referring now to FIG. 44a, the sensor position interrupt may be examined. As always the first task is to save the state of the computer registers. The next operation is a branch on scan converter mode operation. There are five branches including B scan, manual scan (MANSCH), infrared (IR), IR expand, IR expand slave, update, and exit.

Referring to FIG. 45, the update branch will be examined in greater detail. Upon entering the update branch the program first checks the direction of antenna scan and next updates the azimuth position of the antenna. The next task is to convert antenna coordinates to vehicle coordinates and then send out an azimuth reference signal. An exit entry point is passed through and then the state of the registers is restored before returning to the idle loop.

Referring to FIG. 46, the B scan branch first determines whether the program is in PPI mode or not. If the program is not in the PPI mode, the next program operation is to convert antenna azimuth coordinates to scan converter coordinates, send out an X position signal and a strobe signal and then go to the update subroutine just explained at FIG. 45. If the program is in the PPI mode, the first task to be accomplished is to send out sine and cosine values and then to send out a strobe signal. This last is accomplished through the routines comprising the sine/cosine look-up logic. The program now jumps to a CNVRT location indicated on FIG. 45.

Referring to FIG. 47, the manual scan (MANSCH) branch routine will be explained. The first task is to read the antenna position and convert antenna coordinates to scan converter coordinates and then to convert scan converter coordinates to vehicle coordinates. The program must next determine whether it is in a track mode or not. If the program is not in a track mode, that is in a search only mode, the next task is to send out an X position signal and return the program to the exit location shown on FIG. 45. If the program is in the track mode, then track logic must be accomplished before sending out the X position signal and returning to the exit position shown on FIG. 45.

Figure 48:
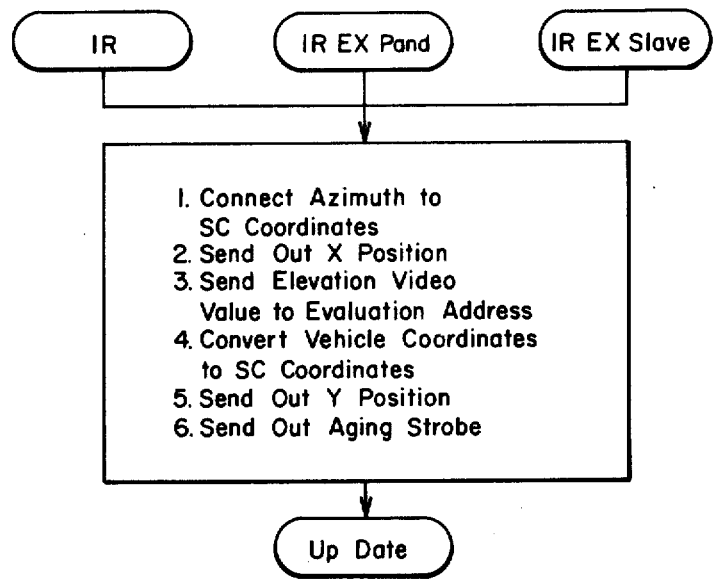
FIG. 48 is a functional flow chart showing entries and the exit to a subroutine that might be used in the routines shown in FIG. 44a and FIG. 44b.

Referring now to FIG. 48, it will be noted that the IR, IR expand, and the IR expand slave branch subroutines lead into a common computer logic block. The tasks to be accomplished are enumerated as: First, convert antenna azimuth coordinates to scan converter coordinates; second, send out X position signal; third, send elevation video value to elevation address; fourth, convert vehicle coordinates to scan converter coordinates; fifth, send out Y position signal; and sixth, send out aging strobe signal. The program now returns to the update routine of FIG. 45.

Figure 44B:
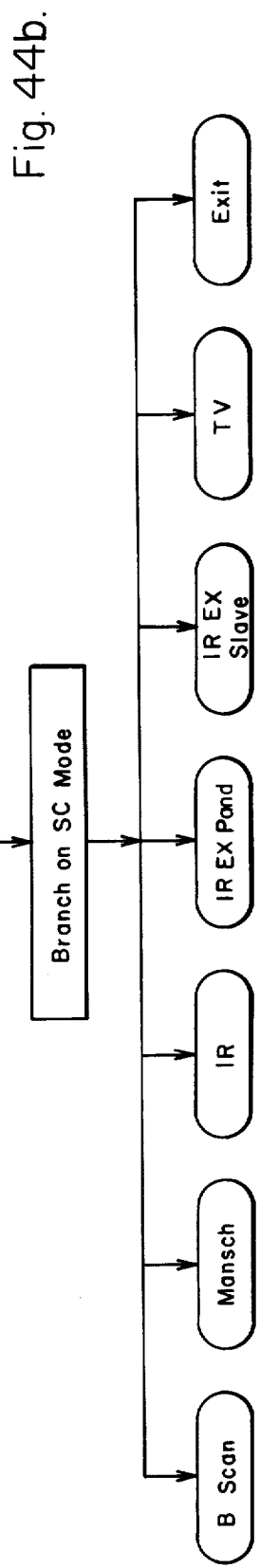
FIG. 44b is a functional flow chart of a routine that might be used as an interrupt system as shown in FIG. 36.

Referring now to FIG. 44b, the sensor turnaround interrupt will be examined. The first task to be accomplished is to save the state of the registers. Next the azimuth position of the antenna is read and next a branch on scan converter mode command is executed. Again we have B scan, manual scan (MANSCH), IR, IR expand, IR expand slave, TV, and exit branches. The only branches different in the sensor turnaround interrupt from those in the sensor position interrupt are B scan and TV.

Figure 49:
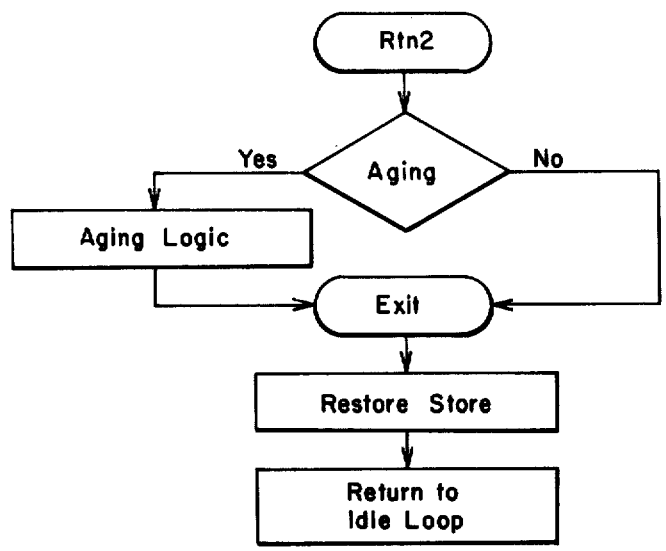
FIG. 49 is a functional flow chart helpful in understanding the operation of sequencing used in the invention.
Figure 50:
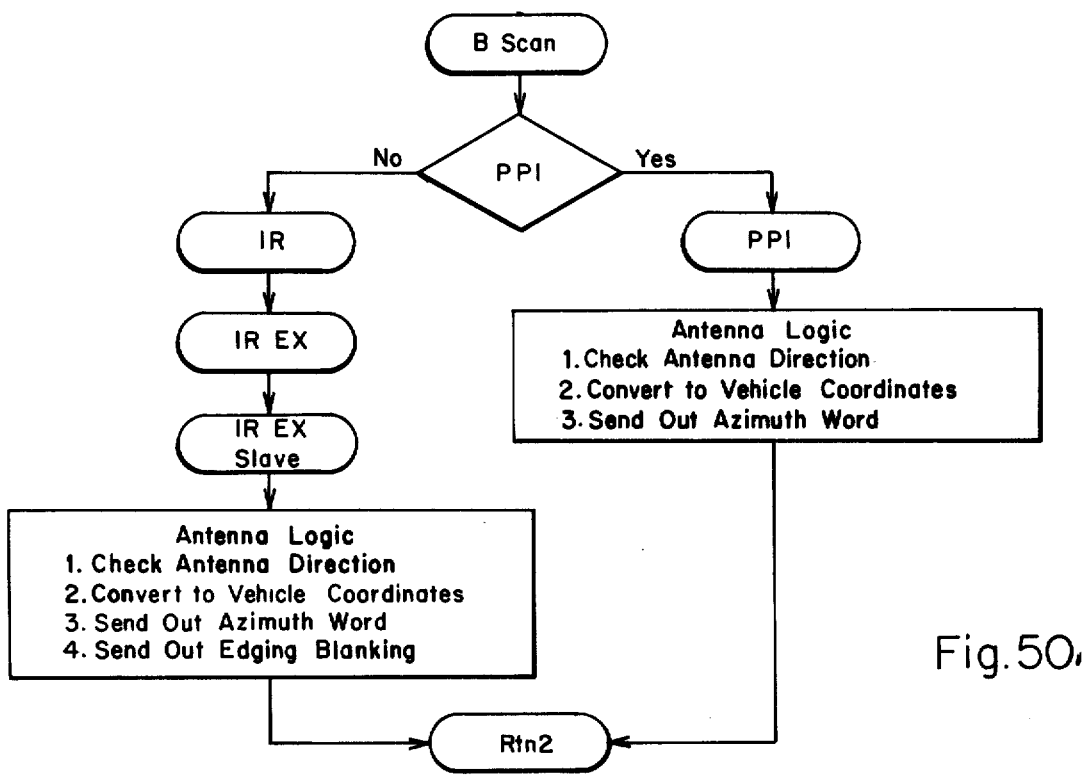
FIG. 50 is a functional flow chart of a subroutine that might be used in the routine shown in FIG. 44a and FIG. 44b.

Referring to FIG. 50, the B scan branch of the sensor turnaround interrupt will be examined. First it must be determined whether the program is in the PPI mode, if not, the appropriate software, IR, IR expand, or IR expand slave is read into the program, then an antenna logic routine first checks the direction of the antenna, then converts antenna coordinates to vehicle coordinates, sends out an azimuth word, and sends out edge blanking. Then the program goes to location RTN2. RTN2 is illustrated in FIG. 49. The first determination to be made is whether or not aging is required. If aging is not required, the program exits, restores the state of the registers, and returns to the idle loop. If aging is required, the program performs the required aging logic functions before going to the exit location.

Figure 51:
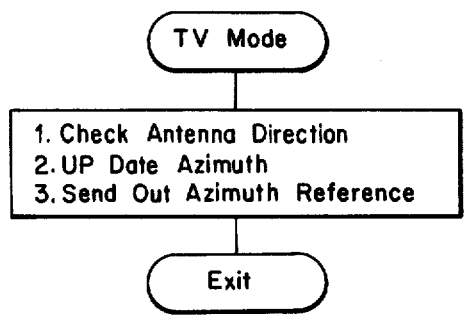
FIG. 51 is a functional flow chart of a subroutine that might be used in the routine shown in FIG. 44b.

Referring now to FIG. 51, the TV mode performs only three major functions before exiting. First, the TV mode checks the antenna direction, updates the azimuth information, and then sends out an azimuth reference signal after which the mode subroutine exits to the exit location shown in FIG. 50.

Thus, there has been described a modular programmable digital scan converter that will accept and display data from a variety of sensors having different data rates and formats on a common indicator. A standard building block implementation has been used in order to achieve great flexibility. All system timing and control functions are provided by a programmable microprocessor controller, thus providing software modification of all modes and formats through essential data bus control architecture. Great improvement in reliability, maintainability and flexibility have been provided through the all digital mechanization plus the capability to add additional memory modules, thus also effecting a significantly reduced cost of ownership.

It is pointed out that although the present invention has been shown and described with reference to particular embodiment, nevertheless various changes and modifications obvious to one skilled in the art to which the invention pertains are deemed to lie within the purview of the invention.

What is claimed is:

1. A modular programmable digital scan converter adapted for responding to applied control signals and to sensor data of various formats so as to provide display data, said scan converter comprising:

input video processing means for converting the sensor data into digital signals and for integrating and detecting said digital signals to produce processed output digital signals, said input video processing means comprising a plurality of modules which have means for responding to applied digital set-up and address words so as to implement processing parameters for the converting, integrating and detecting operations;

memory and output processing means for storing said output digital signals and for reading out and processing said stored data so as to provide display data, said memory and output processing means comprising a plurality of modules which contain means for responding to applied digital set-up and address words such that the format and data rates for storing and reading out said output digital signals are selected in response to the set-up and address words; and interface and control means, responsive to the control signals, for applying the digital set-up and address words to the modules of said input video processing means and to the modules of said memory and output processing means, said interface and control means including a programmable controller which is programmed to provide a selected relationship between the control signals and the digital set-up and address words; whereby the specific processing parameters implemented by the input video processing means, and the storage and read out rates and formats of said memory and output processing means are determined by said programmed controller.

2. The scan converter of claim 1 wherein said input video processing means includes means for providing line to line integration of said digital signals such that the feedback constant of said integration operation is selected in response to a digital set-up word applied from said interface and control means.

3. The scan converter of claim 1 wherein said input video processing means includes means for peak detecting said digital signals such that the detection threshold level is selected in response to a digital set-up word applied from said interface and control means.

4. The scan converter of claim 1 wherein said input video processing means includes means for analog-to-digital converting said sensor data such that the quantization levels for the conversion are selected in response to a digital set-up word applied from said interface and control means.

5. The scan converter of claim 1 wherein said input video processing means includes means for video clamping said digital signals such that the clamping level is selected in response to a digital set-up word applied from said interface and control means.

6. The scan converter of claim 1 wherein said input video processing means includes means for gain adjusting said digital signals such that the gain adjustment factor is determined in response to a digital set-up word applied from said interface and control means.

7. The scan converter of claim 1 wherein said memory and output processing means includes means for storing said digital signals in discrete memory locations determined by set-up words applied from said interface and control means.

8. The scan converter of claim 7 wherein said memory and output processing means includes means for reading out said stored data from discrete memory locations determined by set-up words applied from said interface and control means.

9. The scan converter of claim 1 further comprising symbol generation means for storing data indicative of a plurality of symbols and for reading out data indicative of specific symbols in response to address words applied from said interface and control means; and means for correlating said symbol data with the display data from said memory and output processing means.

10. The scan converter of claim 9 further comprising means for centroid positioning the symbol data with respect to the display data from said memory and output processing means.

* * * * *